(12) United States Patent
Zeviar

(10) Patent No.: US 9,070,144 B1
(45) Date of Patent: *Jun. 30, 2015

(54) ELECTRONIC COMPUTER ENGINES FOR ANALYTICAL MATCHING AND METHODS OF USE THEREOF

(71) Applicant: Whozagood, Inc., Calgary (CA)

(72) Inventor: Zale Zeviar, Calgary (CA)

(73) Assignee: Whozagood, Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,774

(22) Filed: Sep. 8, 2014

Related U.S. Application Data

(60) Provisional application No. 61/905,750, filed on Nov. 18, 2013, provisional application No. 61/905,765, filed on Nov. 18, 2013, provisional application No. 61/905,773, filed on Nov. 18, 2013, provisional application No. 61/905,782, filed on Nov. 18, 2013.

(51) Int. Cl.

| | | |
|---|---|---|
| *G06Q 30/02* | (2012.01) | |
| *G06Q 10/10* | (2012.01) | |
| *G06Q 10/06* | (2012.01) | |
| *G06Q 30/06* | (2012.01) | |
| *G06Q 10/08* | (2012.01) | |
| *G06F 17/30* | (2006.01) | |
| *G06Q 50/00* | (2012.01) | |

(52) U.S. Cl.
CPC ...... *G06Q 30/0282* (2013.01); *G06F 17/30867* (2013.01); *G06Q 50/01* (2013.01)

(58) Field of Classification Search
CPC .................................................. G06Q 30/0282
USPC .................................................... 705/1.1–912
See application file for complete search history.

(56) References Cited

U.S. PATENT DOCUMENTS

| | | | | |
|---|---|---|---|---|
| 7,110,983 | B2 * | 9/2006 | Shear et al. .................... 705/55 |
| 8,200,527 | B1 * | 6/2012 | Thompson et al. .......... 705/7.39 |
| 8,788,307 | B2 * | 7/2014 | Wright et al. ................ 705/7.11 |
| 2008/0140566 | A1 * | 6/2008 | Chowins ......................... 705/39 |
| 2010/0094863 | A1 * | 4/2010 | Kenton-Dau et al. ......... 707/722 |

(Continued)

OTHER PUBLICATIONS www.whozagood.com, WayBack archive screen capture, 20121103, pp. 1-2.*

(Continued)

*Primary Examiner* — Jonathan Ouellette
(74) *Attorney, Agent, or Firm* — Greenberg Traurig, LLP

(57) ABSTRACT

In some embodiments, the instant invention provides an improved computer system programmed for matching which includes at least the following components: a specialized computer machine having a processor for executing program code stored in memory, where the program code is configured to perform upon the execution: obtaining business information regarding a plurality of businesses and a plurality of offerings offered by the plurality of businesses; concurrently matching each consumer of a plurality of particular consumers with at least one business based on: business identifying matching parameter(s) obtained from each consumer, a geographic indication, a plurality of ranked filtering criteria, personal consumer profile information having responses to psychometric questions, business profile information having responses to psychometric questions, and at least one rating score filtering parameter; and causing to concurrently output, utilizing a graphical user interface, each matching result to each particular consumer.

22 Claims, 91 Drawing Sheets

(56) References Cited

U.S. PATENT DOCUMENTS

| | | | |
|---|---|---|---|
| 2012/0078807 A1* | 3/2012 | Cordeiro | 705/347 |
| 2012/0296780 A1* | 11/2012 | McEntire | 705/27.2 |
| 2012/0330854 A1* | 12/2012 | MacLaughlin | 705/319 |
| 2013/0030919 A1* | 1/2013 | Brinson et al. | 705/14.58 |
| 2014/0136443 A1* | 5/2014 | Kinsey et al. | 705/347 |
| 2014/0143133 A1* | 5/2014 | Benson et al. | 705/38 |
| 2014/0149251 A1* | 5/2014 | Stockwell | 705/26.35 |
| 2014/0222512 A1* | 8/2014 | Pace | 705/7.32 |
| 2014/0244351 A1* | 8/2014 | Symons | 705/7.29 |

OTHER PUBLICATIONS www.veripages.com, Terms of Service, Internet Archive Wayback Machine, www.archive.org, Dec. 14, 2007.*

* cited by examiner

| Managing Director (Franchisee) Revenue | | | | |
|---|---|---|---|---|
| Vertical | | | | |
| Subscriptions & Leads | | | | |
| ~ # of Service Providers | U.S. + Canada (+10%) | | | |
| | | Yr1 | Yr3 | Yr5 |
| % Register with WZG | FREE | | | |
| resultant # of WZG Service Providers | FREE | 0 | 0 | 0 |
| % of Registered that will Pay | | | | |
| % Paid Subscribers (Gold @ $29.97 / month) | $359.64 | | | |
| % Paid Subscribers (Platinum @ $89.97 / month) | $1,079.64 | | | |
| # Paid Subscribers | | 0 | 0 | 0 |
| Revenue from Paid Subscribers | | | | |
| Revenue from WZG Leads (@ $10 / lead / WZG Connect) | $10 | | | |
| WZG Annual Revenue | | | | |
| VD % (Annual) | | | | |
|     Accelerated payback | 25% | | | |
|     After payback | 10% | | | |
| Business Support Products (Pass through) | | | | |
| % of paid who will complete Integrity Certification | $495 | | | |
| % of paid who will use Personality Match (WhoZaBest4me) | $12.02 | | | |
| % of paid who will purchase employee assessments (2 / yr) | $98 | | | |
| % of paid who will purchase seminars & coaching ($ / yr) | $952 | | | |
| Average Revenue per transaction | | | | |
| Total Annual Revenue | | | | |
| WZG Annual Revenue (Pass through avg % of total) | 25% | | | |
| VD % (Annual) | | | | |
|     Standard payback | 10% | | | |
| Consumer Purchases | | | | |
| # of Annual Searches | | | | |
| | | Pessimistic | Expected | Optimistic |
| % WZG | | 1/10th Expected | | 2X Expected |
| resultant # of WZG site visits (annual) | | | 0 | |
| % who will do a Regional or National search (@ $1.99 / $2.99) | $2.24 | | | |
| % who will use WZG Connnect option | FREE | | | |
| % who will use Buyer Criteria match (@ $1.99) | $1.99 | | | |
| % who will use Personality match | $12.02 | | | |
| # of transactions | | 0 | 0 | 0 |
| Average Cost of Transaction | Projected Average Mix | | | |
| WZG Annual Revenue | | | | |
| VD % (Annual) | | | | |
|     Accelerated payback | 25% | | | |
|     After payback | 10% | | | |
| Total Projected VD Revenue (Annual) | | | | |
|     Accelerated payback | | | | |
|     After payback | 10% | | | |
| | % Consumer Purchases | | | |
| | % Subscriptions | | | |
| | % Support Products | | | |
| WZG Revenues per Vertical | | Pessimistic | Expected | Optimistic |
| | Consumer Purchases | | | |
| | Subscriptions | | | |
| | Support Products | | | |
| | Total | | | |

| Industry | Segment | Category | BDC Codes | Keywords | Vertical ID |
|---|---|---|---|---|---|
| Arts & Entertainment | Artists & Performers | Art Dealers | 12010000, 12010200, 12010223 | Art Galleries, Fine Arts | AE1 |
| Arts & Entertainment | Artists & Performers | Artists | 22010300, 22010312, 22010313, 11137208 | Commercial Artists, Sculptors, Muralists, Taxidermist, Taxidermy | AE1 |
| Arts & Entertainment | Artists & Performers | Dance Studios | 12010500, 12010501, 12010502, 12010503 | Dance Schools, Dance Companies, Dance Intructors, Ballet Schools, Ballroom, Square Dancing, Tango | AE1 |
| Arts & Entertainment | Artists & Performers | Disc Jockeys | 22070300 | DJs, MCs, Emcees | AE1 |
| Arts & Entertainment | Artists & Performers | Entertainers | 22030801, 22030200, 22030700, 22030100, 22030300, 22030101, 12010600, 12010601, 12060602, 12060603 | Performers, Comedians, Magicians, Actors, Dancers, Clowns, Singers, Child Entertainment, Family Entertainment, Mimes | AE1 |
| Arts & Entertainment | Artists & Performers | Musicians & Bands | 25061300, 25061304, 25061305, 25061306, 25061307 | Mariachi Bands, Musical Performers, Musical Artists | AE1 |
| Arts & Entertainment | Artists & Performers | Talent Agents | 11137300 | Sports Managers, Sports Agents, Scouts | AE1 |
| Arts & Entertainment | Entertainment Venues | Amusement Arcades / Miniature Golf | 25060505, 25061609 | Video Games, Arcades, Putt-Putt Golf | AE2 |
| Arts & Entertainment | Entertainment Venues | Amusement Parks | 27030300, 27030302, 27030326, 25060603 | Go Kart Tracks, Carnivals, Fairs, Roller Coasters, Water Parks | AE2 |
| Arts & Entertainment | Entertainment Venues | Casinos | 27030700 | Gambling, Card Rooms, Slot Machines, Indian Casinos | AE2 |
| Arts & Entertainment | Entertainment Venues | Movie & Video Game Rentals | 25182900, 25082924, 25182924 | Movie Rentals, Video Game Rentals, Video Game Console Rentals | AE2 |
| Arts & Entertainment | Entertainment Venues | Movie Theaters | 25060200 | Drive-Ins | AE2 |
| Arts & Entertainment | Entertainment Venues | Theatrical Companies - Fine Arts | 25060301 | Performing Arts, Ballets, Dinner Theatres, Orchestras, Symphonies, Pianists, Amphitheaters | AE2 |
| Arts & Entertainment | Entertainment Venues | Ticket Agencies | 25060300, 25060302, 25060303, 25060304, 25060305, 25060306 | Concerts, Sporting Events, Comedy Shows, Plays, Magic Shows, Music Concerts, Tickets, Concert Tickets | AE2 |
| Arts & Entertainment | Tourist Attractions | Historical Sites | 27050000, 27050100 | Adobes, Lighthouses, Missions, Battlegrounds, Battlefields, Military Sites | AE3 |
| Arts & Entertainment | Tourist Attractions | Museums | 12010800, 12010801, 12010809 | Planetariums, Art Museums, Natural History Museums, Maritime Museums, Wax Museums | AE3 |
| Arts & Entertainment | Tourist Attractions | Nature Parks | 12021300, 12021303, 12021304, 12021305 | Nature Trails, State Parks, National Parks, National Monuments, Parks, Parks and Recreation | AE3 |
| Arts & Entertainment | Tourist Attractions | Zoos, Aquariums, Botanical Gardens | 12021700, 27030900, 27030901, 27030903, 2730400, 27030401, 27030402 | Bonsai Gardens, Rose Gardens | AE3 |
| Automotive | Auto Parking Lots | Parking Lots & Garages | 21032000, 21032004, 21032005, 21032006 | Auto Storages | AU9 |

Fig. 37

| Industry | Segment | Category | BDC Codes | Keywords | Vertical ID |
|---|---|---|---|---|---|
| Automotive | Auto Repair & Service | Auto Air Conditioning Repair | 21020400, 21020401, 21042302 | Auto AC Repairs | AU6 |
| Automotive | Auto Repair & Service | Auto Diagnostic Testing | 21021200 | | AU6 |
| Automotive | Auto Repair & Service | Auto Electric | 21021400, 21021404 | Car Electrical Systems | AU6 |
| Automotive | Auto Repair & Service | Auto Fuel System Repair | 21021800, 21021801, 21021802 | | AU6 |
| Automotive | Auto Repair & Service | Auto Muffler Repair | 21022400, 21022401 | Muffler Shops, Muffler Repairs, Exhaust Repairs, Exhaust Shops | AU6 |
| Automotive | Auto Repair & Service | Auto Oil Change | 21022500 | Oil Changes | AU6 |
| Automotive | Auto Repair & Service | Auto Rust Proofing | 21033100, 21033101, 21033102 | | AU6 |
| Automotive | Auto Repair & Service | Auto Transmission Repairs | 21023600, 21045100 | Transmission Repairs | AU6 |
| Automotive | Auto Repair & Service | Brake Repair Shops | 21020800, 21020802 | | AU6 |
| Automotive | Auto Repair & Service | Emission Control Repairs | 21021500 | | AU6 |
| Automotive | Auto Repair & Service | General Auto Repairs | 21020000, 21021900, 21021600, 21021700, 21030000, 21021601 | Rebuilt Engines, Foreign Auto Repairs, Automotive Repairs, Auto Mechanic | AU5 |
| Automotive | Auto Repair & Service | Industrial Vehicle Repairs | 21022000, 21022001 | Bus Repairs | AU5 |
| Automotive | Auto Repair & Service | Motorcycle Repairs | 21022300, 21022301, 21022303, 21022304, 21022305 | Moped Repairs, Scooter Repairs, Dirt Bike Repairs | AU5 |
| Automotive | Auto Repair & Service | Radiator & Gas Tank Repairs | 21042300, 21042301, 21041302, 21022600 | | AU6 |
| Automotive | Auto Repair & Service | Recreational Vehicle Repairs | 21010100, 21022700, 21022703, 21024500, 21022702 | RV Repairs, Motor Home Repairs, Camper Repairs, Dune Buggy Repairs, Quad Repairs, Snowmobile Repairs, ATV Repairs, All-Terrain Vehicle Repairs | AU5 |
| Automotive | Auto Repair & Service | Smog Check Shops | 21031800, 21031802, 21031806 | Smog Tests | AU6 |
| Automotive | Auto Repair & Service | Truck & Trailer Repairs | 21023700, 21023500 | | AU5 |
| Automotive | Auto Repair & Service | Truck Spray Bedliners | 21045203, 21045206 | | AU6 |
| Automotive | Auto Repair & Service | Tune-up Shops | 21023800 | | AU6 |
| Automotive | Auto Repair & Service | Wheel Alignments | 21023900, 21023901 | Truck Alignments, Car Alignments, Tire Alignments | AU6 |
| Automotive | Auto Service | Auto Detailing | 21020200, 21031313, 21045102 | Motorcycle Detailing | AU8 |
| Automotive | Auto Service | Auto Dismantling | 21030800, 21030802, 21032700, 21032701 | Salvage Yards, Auto Wrecking, Junk Car Removal | AU8 |
| Automotive | Auto Service | Auto Registration Services | 21031603, 21031701, 21031702, 21031705 | Car Title, Tags Service, DMV, Boat Registration, Yacht Registration | AU8 |
| Automotive | Auto Service | Auto Towing | 21030200, 21030204, 21023000 | Tow Trucks, Road Services, Lock-Out Assistance | AU8 |
| Automotive | Auto Service | Car Washes | 21031300, 21031302, 21031306, 21031309, 21020207 | Car Upholstery Cleaning, Self Car Washes | AU8 |

Fig. 38

| Industry | Segment | Category | BDC Codes | Keywords | Vertical ID |
|---|---|---|---|---|---|
| Automotive | Auto Service Stations | Service Stations | 21032200 | Gas Stations | AU9 |
| Automotive | Autobody Service | Antiques & Classic Cars Restorations | 21022900, 21022902, 21021000, 21049200, 21060300 | Replica Cars | AU7 |
| Automotive | Autobody Service | Auto Body & Painting | 21040400, 21020100, 21020101, 21020102, 21020103, 21020104 | Collision Repairs, Dent Removals, Bumper Repairs | AU7 |
| Automotive | Autobody Service | Auto Glass Replacement & Tinting | 21020300, 21020301, 21020302, 21020318, 21040700, 21040701, 21040702 | Window Tinting, Windshield Repairs, Windshield Replacement | AU7 |
| Automotive | Autobody Service | Auto Upholstery | 21044000, 21044400 | Seat Covers | AU7 |
| Automotive | Automotive Dealers | Motorcycle & All-Terrain Vehicle Dealers | 21010300, 21010305, 21011200, 21011202 | Scooters, Mopeds, ATVs, Harley Davidsons, Dirt Bikes, OHV dealers, Mini Bikes | AU3 |
| Automotive | Automotive Dealers | New Car & Truck Dealers | 21060100, 21060103, 21060104, 21060105, 21060106, 21060107, 21060110, 21060111, 21060113, 21060116, 21060117, 21060118, 21060119, 21060124, 21060132, 21060134, 21060135, 21060136, 21060141, 21060142, 21060145, 21060147, 21060149, 21060128, 21060130 | New Truck Dealers, New Car Dealers, New Automobile Dealerships | AU1 |
| Automotive | Automotive Dealers | Specialty Vehicle Dealers | 25060926, 25182500, 21011401, 21010701, 21060600, 21060800 | Golf Carts, Go Carts, Snowmobiles, Dune Buggies, Limo Dealers, Limousine Dealers | AU3 |
| Automotive | Automotive Dealers | Recreational Vehicle Dealers | 21010000, 21046500, 21010400 | RVs, Campers, Travel Trailers, Motor Homes, Tent Trailers, Fifth Wheelers, 5th Wheelers | AU3 |
| Automotive | Automotive Dealers | Used Car & Truck Dealers | 21060200, 21060201, 21060301 | | AU2 |
| Automotive | Automotive Education | Auto Driving Schools | 14010100, 14010104 | Drivers Education, Traffic Schools, Speeding Tickets, Speeding Ticket | AU10 |
| Automotive | Automotive Education | Motorcycle Driving Schools | 14010110 | | AU10 |
| Automotive | Automotive Education | Truck Driving School | 14010108 | | AU10 |
| Automotive | Automotive Parts And Equipment | Auto Batteries | 25050800 | Car Batteries, Truck Batteries, Vehicle Batteries | AU4 |
| Automotive | Automotive Parts And Equipment | Auto Lubricants | 21043700, 21043703 | Synthetic Oils | AU4 |
| Automotive | Automotive Parts And Equipment | Auto Parts & Accessories | 21040800, 21040000, 21046100, 21040200, 21040600, 21045900, 21046605 | Auto Parts Stores | AU4 |
| Automotive | Automotive Parts And Equipment | Auto Parts Used & Rebuilt | 21045700 | | AU4 |
| Automotive | Automotive Parts And Equipment | Auto Security Systems | 21033000, 21033001, 21041902 | Car Alarms, Car Alarm Installations, Car Alarms Installs, Remote Starters, Cars Tracking | AU4 |

Fig. 39

| Industry | Segment | Category | BDC Codes | Keywords | Vertical ID |
|---|---|---|---|---|---|
| Automotive | Automotive Parts And Equipment | Auto Stereo Systems | 21040900 | Car Stereos, Car Stereo Installations, Car Installs, Car Installations | AU4 |
| Automotive | Automotive Parts And Equipment | Auto Trailers | 21010500, 21010501, 21010502, 21010503, 21010504, 21010505, 21010506 | Hitches, Auto Trailers, Boat Trailers, Utility Trailers | AU4 |
| Automotive | Automotive Parts And Equipment | Racing Performance Parts | 21044101, 21044102, 21044501, 21044701, 21044703, 20300207, 21022800, 21041700, 21046601 | Speed Shops, Racing Shops, Race Cars, Hot Rods, Shock Absorbers, Turbo Chargers, Turbos, NOS | AU4 |
| Automotive | Automotive Parts And Equipment | Tire Dealers | 21045000, 21045030, 21045028, 21046103, 21041201, 21045018, 21045026 | Truck Tires, Hub Caps, Wheel Covers, Retreads, Tire Installations | AU4 |
| Automotive | Automotive Parts And Equipment | Truck Campers & Shells | 21045300, 21045313, 21045314 | | AU4 |
| Automotive | Motorized Vehicles | Motorized Vehicles - Mixed | 21020600, 21030404, 21030600, 21030602, 21046102, 21046400, 21051000, 21070105, 21080202, 21100100, 21100102 | | AU11 |
| Business & Professional Services | Advertising | Advertising Agencies | 11010000, 11010100, 11010102 | Ad Agencies | BP1 |
| Business & Professional Services | Advertising | Advertising Material Distribution | 11014100, 11014700, 11011105 | Mailing Services, Marketing Materials Distributions | BP1 |
| Business & Professional Services | Advertising | Advertising Promotional Specialties | 11012801, 11010601, 11010604, 11010605, 11010606, 11010607, 11010602 | Novelty ADs, Novelty Advertising, Transportation ADs, Transportaion Advertising, Electronic Ads, Electronic Advertising, Advertising Products, Indoor Advertising, Billboards | BP1 |
| Business & Professional Services | Advertising | Commercial Photographers | 23030506 | Professional Commercial Photographers | BP2 |
| Business & Professional Services | Advertising | Convention & Trade Show Organizers | 11136600, 11011502, 11107412 | Meetings, Conferences, Exibit Installers, Display Installers | BP2 |
| Business & Professional Services | Advertising | Direct Mail Advertising | 11011100, 11011101 | Direct Mailings | BP1 |
| Business & Professional Services | Advertising | Display Advertising | 11011500, 11011501, 11011504, 11012500 | Tradeshow Exihibits, Tradeshow Displays | BP1 |
| Business & Professional Services | Advertising | Graphic Design Services | 11141000, 11141004 | Graphic Artists | BP2 |
| Business & Professional Services | Advertising | Internet Advertising | 11014200 | | BP1 |
| Business & Professional Services | Advertising | Mobile & Aerial Advertising | 11010800, 11010802, 11010900, 11010400, 11010608 | Skywriting, Sky Banners, Traveling Signboards, Mobile Advertising | BP1 |
| Business & Professional Services | Advertising | Newspaper Advertising | 11012400 | | BP1 |

Fig. 40

| Industry | Segment | Category | BDC Codes | Keywords | Vertical ID |
|---|---|---|---|---|---|
| Business & Professional Services | Advertising | Television & Radio Advertising | 11013200, 11013204 | TV Ads, Television Ads, Television Advertising, Radio Ads, Radio Advertisments, Television Advertisements, TV Advertisements | BP1 |
| Business & Professional Services | Advertising | Signs, Lettering & Painting Services | 11140500, 11140501, 11140503, 11013300, 25111400, 25111401, 19136200 | Banners, Posters | BP1 |
| Business & Professional Services | Business Consulting | Business & Professional Services - Mixed | 11100600, 11100700, 11100703, 11100711, 11100800, 11101203, 11101600, 11102200, 11102304, 11103600, 11103603, 11103605, 11105800, 11106500, 11106800, 11107900, 11107901, 11191923, 11191924, 11191926, 11191410, 11191400, 11192500, 11190800, 11190000, 11190200, 11190601, 11190700, 11190901, 11191311, 11191500, 11191914, 11102504, 11100100, 11100717, 11102006, 11102303 | | BP0 |
| Business & Professional Services | Business Consulting | Business Management Consultants | 11100900, 11100901, 11100902, 11100903, 11100906, 11191800, 11191801, 11191802, 11191803, 11101000, 11101003, 11103500 | Risk Management, Business Planning, Business Development, Inventory Services, Business Management Consulting, Business Consultants, Business Consulting, Business Coach, Leadership Coach, Executive Coach, Business Coaching, Leadership Coaching, Executive Coaching | BP5 |
| Business & Professional Services | Business Consulting | Environmental & Energy Consultants | 11106400, 11106401, 11106402, 11106406, 11101800, 11101802, 11101803, 11232303 | Environmental Consulting, Environmental Reports, Environments Consulting, Enviroments Consultants, Environments Reports, Energy Conservation Consultants, Energy Conservation Consulting, Energy Code Consultants, Energy Code Consulting, Geophysical Researching, Geophysical Researchers | BP8 |
| Business & Professional Services | Business Consulting | Fundraising Consultants | 11270410 | Fundraising Event Planner, Fundraising Coordinator, Fundraising Consultants, Fundraisers Consultants, Fundraisers Consulting, Fundraising Consulting | BP8 |
| Business & Professional Services | Business Consulting | Human Resources Consultants | 11191600, 11191601, 11191604, 11191603, 11102800, 11102803, 11102804, 11102805, 11191602 | HRs Consulting, HRs Consultants, Human Resources Consulting, Benefits Consulting | BP4 |

Fig. 41

| Industry | Segment | Category | BDC Codes | Keywords | Vertical ID |
|---|---|---|---|---|---|
| Business & Professional Services | Business Consulting | Sales & Marketing Consultants | 11191700, 11191701, 11191702, 11191705, 11191706, 11191707, 11191710, 11191912, 11101208 | Telemarketing, Telemarketing Consultants, Telemarketers, SEOs, Search Engine Optimizations, Sales Consultants, Sales Consulting, Marketing Consulting, Marketing and Sales Consulting, Marketing and Sales Consultants, Marketing & Sales Consulting, Marketing & Sales Consultants | BP7 |
| Business & Professional Services | Business Consulting | Agricultural & Economics Consultants | 11100300, 11101500, 11101502, 11101503, 10021200, 11232506 | Agricultural Consultants, Agricultural Consultings, Agricultures Consultants, Agricultures Consultings, Economics Consulting, Economics Consultants, Farm Management Consultants, Farm Management Consulting, Commercial Economic Sociological Researchers, Commercial Economic Educational Researchers | BP8 |
| Business & Professional Services | Business Consulting | Utilities & Telecom Management Consultants Services | 11101207, 11190900, 11190901 11190902, 11190903 | Utilitys Management Services, Utilities Management Services, Telecoms Management Services, Telecommunications Management Services, Utilities Consultants, Utilities Consulting, Telecom Consulting, Telecom Consultants, Telecommunications Consultants, Telecommunications Consulting, Tele-com Consultants | BP6 |
| Business & Professional Services | Business Consulting | Training Consultants | 11104800 | Trainings Consultings, Trainers Consultants, Trainers Consulting | BP8 |
| Business & Professional Services | Business Organizations | Business & Professional Organizations, Unions, Chambers & Services | 11270000, 11271500, 11271501, 11270500, 11271100, 11271300 | Chambers of Commerce, Labor Unions, Labor Organizations, Education Organizations, Health Service Organizations, Business Organizations | BP4 |
| Business & Professional Services | Business Rental And Leasing | Commercial & Industrial Equipment Rentals | 19260000, 19260910, 19261300 | Portable Toilets, Porta Potty, Pump Rentals | BP18 |
| Business & Professional Services | Business Rental And Leasing | Construction & Farming Machinery Rentals | 13025104, 13025105, 13025106, 10050500 | | BP18 |

Fig. 42

| Industry | Segment | Category | BDC Codes | Keywords | Vertical ID |
|---|---|---|---|---|---|
| Business & Professional Services | Business Rental And Leasing | Office Machinery & Equipment Rentals | 11210202, 11210204, 11210205, 11210100, 11210605 | | BP18 |
| Business & Professional Services | Business Repair Services | Audio & Video Repairs | 25170801 | TV Repairs, Radio Repairs | BP17 |
| Business & Professional Services | Business Repair Services | Commercial & Industrial - Machinery & Equipment Repairs | 11220700, 11220714, 11220718, 11220722, 11223325, 11223400, 11223002, 11223303, 11223329 | | BP17 |
| Business & Professional Services | Business Repair Services | Restaurant Equipment Repairs | 11222600, 11222602, 16010700, 16010702 | | BP17 |
| Business & Professional Services | Business Services | Employment & Administrative Management Services | 11100200, 11191301, 11250300, 11250317, 11250325 | Employment Agencies, Business Management Services, Staffing Agencies, General Laborers, Clerical Services | BP4 |
| Business & Professional Services | Business Services | Business Services - Mixed | 25170700, 25170800, 25170811, 25170812, 23020600, 23021200, 23022501, 23023000, 23040200, 23040202, 23040203, 23050109, 23060304, 23060403, 23070900, 23070916, 23071300, 23071501, 23072200, 23072201, 11000000, 11011300, 11013000, 11013500, 11030000, 11030500, 11031300, 11032700, 11033300, 11034400, 11110700, 11111100, 11123601, 11123609, 11123803, 11130000, 11131106, 11131108, 11131800, 11131802, 11131901, 11132400, 11133000, 11133507, 11134100, 11134106, 11134112, 11134302, 11134400, 11134701, 11134702, 11135000, 11135400, 11135703, 11136008, 11136206, 11136800, 11136902, 11138101, 11138706, 11138708, 11138713, 11139300, 11140400, 11141300, 11160000, 11160700, 11180500, 11200000, 11201200, 11201701, 11202600, 11203600, 11203601, 11203602, 11203610, 11204600, 11210800, 11211000, 11290106, 11290201, 11280103, 11280105, 11280200 | | BP20 |
| Business & Professional Services | Business Services | Commercial & Industrial Cleaning Services | 11131500, 11131514, 11131515, 11131524, 11131525, 11131526, 11131536, 11137800, 11131503, 11131506, 11131509, 11131520, 11131533, 11131528, 11131538 | Janitorial, Power Cleaning, Commercial Duct Cleaning, Commercial Furnace Cleaning, Commercial Duct Cleaners, Commercial Furnace Cleaners, Commercial Septic Cleaning, Commercial Septic Cleaners, Commercial Septic Tank Cleaning, Commercial Septic Tank Cleaners | BP13 |

Fig. 43

| Industry | Segment | Category | BDC Codes | Keywords | Vertical ID |
|---|---|---|---|---|---|
| Business & Professional Services | Business Services | Commercial Printing Services | 11200800, 11110000 | Copying, Duplicating | BP11 |
| Business & Professional Services | Business Services | Commercial Screen Printing | 11200847 | | BP11 |
| Business & Professional Services | Business Services | Desktop Publishing | 11201000, 11260500 | Resume Writing | BP12 |
| Business & Professional Services | Business Services | Express Mail Delivery Services | 11310000, 11310200 | Mailing Centers | BP10 |
| Business & Professional Services | Business Services | Concierge & Hotel/Motel Services | 11102700, 11102701 | Hotel Management, Motel Management | BP9 |
| Business & Professional Services | Business Services | Linen, Uniform, & Laundry Services | 22050200, 11137600, 22052001, 22052002, 22052003 | | BP13 |
| Business & Professional Services | Business Services | Local Messengers & Delivery Services | 26025200 | Couriers, Courier Services | BP10 |
| Business & Professional Services | Business Services | Mailing Services | 11014806, 11014807, 11011106 | Mail Box Rental, Mail Sorting | BP10 |
| Business & Professional Services | Business Services | Marking & Coding Services | 11014803, 11014805 | Industrial Coding, Industial Coders | BP12 |
| Business & Professional Services | Business Services | Testing Services | 11232900, 11232906, 11232909, 11232920, 11232954, 11232957, 11232960, 11231200 | Labs, Test Labs, Labratories | BP10 |
| Business & Professional Services | Business Services | Translation & Interpretation Services | 11138800 | Translators | BP10 |
| Business & Professional Services | Business Services | Video & Teleconferencing Services | 11030802, 11031603 | Conference Calls, Webinars | BP10 |
| Business & Professional Services | Business Services | Waste Management Services | 12061523, 12061518, 12061510, 12061517 | Hazardous Waste, Medical Waste, Biohazardous Waste | BP13 |
| Business & Professional Services | Business Services | Website Design Services | 11161400 | Web Developers, Web Development | BP12 |
| Business & Professional Services | Employment Services | Employment & Recruiting Consultants | 11103703 | Recruiting, Executive Search, Head Hunters, Recruiters, Employment Consultants, Employments Consulting, Recruiting Consulting | BP4 |
| Business & Professional Services | Employment Services | Career & Vocational Services | 11250417 | Outplacement Services, Career Counselor, Job Counselor, Career Advisor, Job Advisor | BP4 |
| Business & Professional Services | Employment Services | Temporary Agencies | 11250600 | Temp Agencies | BP4 |
| Business & Professional Services | Marketing | Public Relations - Marketing Services | 11012900, 11012901, 11012902, 11012904 | PR Services | BP3 |

Fig. 44

| Industry | Segment | Category | BDC Codes | Keywords | Vertical ID |
|---|---|---|---|---|---|
| Business & Professional Services | Marketing | Marketing Research & Polling | 11232502, 11232503, 11232504, 11232505 | | BP3 |
| Business & Professional Services | Marketing | Media Consultants | 11104200 | Medias Consultants, Medias Consultings | BP3 |
| Business & Professional Services | Professional Services | Appraisal Services | 15110200, 15110208, 11134700, 15010200, 15010210 | Automobile Appraisals, Boat Appraisals, Antique Appraisals, Jewelry Appraisals, Coin Appraisals, Aircraft Appraisals, Business Appraisals | BP14 |
| Business & Professional Services | Professional Services | Arbitrations & Conciliations Services | 11181400 | Arbitrators, Arbitrating, Arbitration Services | BP14 |
| Business & Professional Services | Professional Services | Armored Car Services | 11240100 | Cash Handling | BP16 |
| Business & Professional Services | Professional Services | Auctioneers | 15010400, 25120100 | Auctions | BP15 |
| Business & Professional Services | Professional Services | Business Brokers | 11131100, 11131101, 11131102, 11131111 | | BP14 |
| Business & Professional Services | Professional Services | Fire Protection Services | 11240400, 11240404 | Fire Alarm Systems, Fire Alarm Services | BP16 |
| Business & Professional Services | Professional Services | Inspection Services | 11105700, 11105707 | | BP14 |
| Business & Professional Services | Professional Services | Quantity Surveyors | 11123600, 11126601, 11126602, 11123603, 11123604, 11123606, 11123607 | | BP14 |
| Business & Professional Services | Professional Services | Repossession Services | 11181700 | Repoman, Repomen, Repos | BP14 |
| Business & Professional Services | Professional Services | Security Guards & Patrols | 11240500 | Mall Cops | BP16 |
| Business & Professional Services | Professional Services | Safety, Security, & Security Systems Consultants | 11105400, 11105401, 11105402, 11105403, 11105404, 11105405, 11240407, 11240602 | Security Camera Services, Security Systems Consultants, Security Systems Consultings, Security Consulting, Security Consultants, Security Counselors, Safety Consulting, Safety Consultants, Personal Security Services, Bodyguards, Body Guards, Fire Protection Services, Fire Protection Services, Alarm Systems | BP16 |
| Business & Professional Services | Warehousing & Storage | General Warehousing & Storages | 19230000, 19230700, 19231300, 19231500, 19231600, 19231601, 19231700 | Self Storages, Public Storages, Mini Storages, Storage Units | BP19 |
| Business & Professional Services | Warehousing & Storage | Packaging & Shipping Supplies | 25110700, 25110706, 25110712 | | BP19 |

Fig. 45

| Industry | Segment | Category | BDC Codes | Keywords | Vertical ID |
|---|---|---|---|---|---|
| Business & Professional Services | Warehousing & Storage | Record Storage | 11131300, 11131301, 11131302, 11131303, 11131304, 11131305 | Shredding, Document Shredding, Document Storages, Document Disposals, Record Searchers, Microfilm, Microfilming | BP19 |
| Community & Government | City | Local Government Administrative Agencies | 17010100 | City Agencies, County Agencies | CG1 |
| Community & Government | City | Local Correctional Facilities | 17010203, 17010202 | Parole Offices, Jails, Prisons | CG1 |
| Community & Government | City | Local Courts | 17010300 | Prosecution, DAs Office, District Attorneys | CG1 |
| Community & Government | City | Local Fire Protection | 12050609 | Fire Department | CG1 |
| Community & Government | City | Local Law Enforcement | 17010402 | Police Department, Sheriffs Department, Police Substation, Sheriffs Substation, Royal Canadian Mounted Police, Canadian Police | CG1 |
| Community & Government | Community & Government | Community & Government - Mixed | 17010000, 17010303, 17020000, 17020101, 17020113, 17020402, 17020405, 17020504, 17020513, 17030100, 17060101, 17060500, 17070100, 17080000, 17080101, 17080402, 12000000, 12010224, 12020202, 12020203, 12020204, 12020206, 12020210, 12020213, 12020218, 12020500, 12021404, 12021801, 12022301, 12022400, 12050000, 12050202, 12050203, 12050209, 12050300, 12050602, 12050605, 12050611, 12050616, 12050700, 12050705, 12050708, 12050712, 12051004, 12051104, 12051200, 12051403, 12051405, 12051406, 12051512, 12051515, 12052101, 12052204, 12052210, 12060000, 12060200, 12060300, 12060400, 12060600, 12060604, 12061507, 12061508, 12061900, 12061915, 12062000, 12062003, 12062100, 12062401, 12062500, 12062600, 12062700, 12063100, 12040401, 12040600, 12040704, 12041000, 12041300, 12041400, 12041700, 12041800, 12041806, 12041902, 12042000 | | CG4 |
| Community & Government | Community Services | Charitable & Non-Profit Organizations | 11020000, 11020400, 11020401, 11020500 | Red Cross, Non Profits, Non-Profits, Charities, Catholic Charities | CG2 |
| Community & Government | Community Services | Child & Youth Services | 12050200 | YMCAs | CG2 |
| Community & Government | Community Services | Civic & Social - Foundations, Clubs, Alumnis, & Organizations | 12040000 | Fraternities, Frats, Alumni Associations | CG2 |

Fig. 46

| Industry | Segment | Category | BDC Codes | Keywords | Vertical ID |
|---|---|---|---|---|---|
| Community & Government | Community Services | Community Food Services | 12051900 | Food Banks | CG2 |
| Community & Government | Community Services | Elderly & Disabled Services | 12051300, 12051400, 12050800, 12051000, 12050400, 12051407, 12051409 | | CG2 |
| Community & Government | Community Services | Individual & Family Services | 12052000, 12051500, 12051601, 12050900, 12052200, 12052100 | | CG2 |
| Community & Government | Community Services | Libraries | 12010722, 12010700, 12010715 | | CG2 |
| Community & Government | Federal | Federal Conservation Programs | 17020508 | | CG1 |
| Community & Government | Federal | Federal Education Programs | 17020104 | | CG1 |
| Community & Government | Federal | Federal Executive Offices | 17020105 | | CG1 |
| Community & Government | Federal | Federal Housing Programs | 17020108 | | CG1 |
| Community & Government | Federal | Federal International Affairs | 17020800 | Immigration, Immigration & Natralization Services | CG1 |
| Community & Government | Federal | Federal Legislative Bodies | 17020109 | | CG1 |
| Community & Government | Federal | Federal Military & National Security | 17020700 | Army, Navy, Coast Guard, Marines, Marine Corps, US Nays, USMC, US Army, US Coast Guard, Canadian Armed Forces, Canadian Forces, Canadian Army, Royal Canadian Air Force, Royal Canadian Navy, Naval Reserves | CG1 |
| Community & Government | Federal | Federal Political Organizations | 17020110 | | CG1 |
| Community & Government | Federal | Federal Postal Service | 17020111 | Post Office, USPO, US Postal service, Canada Post | CG1 |
| Community & Government | Federal | Federal Public Finances | 17020112 | IRS, Internal Revenue Service | CG1 |
| Community & Government | Federal | Veteran Affairs | 17020115 | VA, VFW | CG1 |
| Community & Government | Religious Services | Churches, Synagogues, Temples, Mosques, Missions, & Ministries | 12030000, 12030102, 12030103, 12030110, 12030112, 12030114, 12030116, 12030123, 12030124, 12030125, 12030128, 12030129, 12030131, 12030132, 12030133, 12030148, 12030158, 12030161, 12030197, 12030198, 12030210, 12030229, 12030243, 12030288, 12030297, 12030302, 12030305, 12030315, 12030320, 12030602, 12030800, 12030808, 12030810, 12030811, 12030901, 12030902, 12031000, 12031200, 12031408, 12031410 | Tabenacles, Steeples, Chapels, Ashrams, Convents, Monestaries | CG3 |
| Community & Government | State | State Administrative Agencies | 17060000 | Senators, Governors, Governors Office | CG1 |

Fig. 47

| Industry | Segment | Category | BDC Codes | Keywords | Vertical ID |
|---|---|---|---|---|---|
| Community & Government | State | State Courts | 17060301 | | CG1 |
| Community & Government | State | State Law Enforcement | 17060400 | State Police, Highway Patrol, CHP, State Troopers | CG1 |
| Community & Government | State | State Legislators | 17060600 | | CG1 |
| Computers | Computer & Software Stores | Computers & Softwares Stores | 25040000, 25040100, 25040200, 25040206, 25040229, 25040300, 25040330, 25041229 | Softwares, Computers Hardwares, Computers Stores | C01 |
| Computers | Computer Education | Computer Training | 14010207 | Computer Schools | C07 |
| Computers | Computer Services | Computer & Audio Visual Equipment Installations | 11040000, 11040100, 11040200, 11040900 | Computer Rooms, Data Rooms, Data Closets, Computer Closets | C06 |
| Computers | Computer Services | Computer Data Processing Services | 11041500, 11041501, 11041504, 11041507, 11041510, 11041512, 11041515, 11041516, 11041518, 11041520, 11041600 | Databases Administrators | C05 |
| Computers | Computer Services | Computer Data Services | 11050000, 11050124, 11050125, 11050126, 11050127, 11050128, 11050129, 11050130 | Data Storage | C05 |
| Computers | Computer Services | Computer Digital Imaging Service | 11081000, 11081001, 11081002 | Digital Imaging | C06 |
| Computers | Computer Services | Computer Facilities Management | 11040300 | | C07 |
| Computers | Computer Services | Computer Graphics Services | 11060000, 11060100, 11060101, 11060105, 11060106 | | C06 |
| Computers | Computer Services | Computer Information Recovery Services | 11041700, 11041702, 11041703, 11041705 | | C07 |
| Computers | Computer Services | Computer Networks Services | 11070000, 11070100, 11070101, 11070102, 11070103, 11070200, 11070207, 11160301, 25040351 | Network Technicians, Network Techs, Computer Networking Consultants, Computer Networking Consulting, Computer Networks Consultants, Computer Networks Consulting | C03 |
| Computers | Computer Services | Computer Programming & Software Development | 11040400, 11040401, 11040404, 11041200, 11041201, 11040800, 11040802, 25040225 | | C02 |
| Computers | Computer Services | Computers Repairs | 11040500, 11220400, 11220401, 11220403, 11220404, 11220405 | Word Processing Equipment, Macintosh Repairs, Apple Repairs | C07 |
| Computers | Computer Services | Computer Systems Consultants | 11041300, 11041301, 11041302, 11041303 | Computer Systems Consultings, Computer Consultants | C04 |
| Computers | Computer Services | Computer Systems Design Services | 11090000, 11090100 | | C03 |
| Computers | Computer Services | Computer Technical Support Service | 11080300, 11080301, 11080302 | | C07 |

Fig. 48

| Industry | Segment | Category | BDC Codes | Keywords | Vertical ID |
|---|---|---|---|---|---|
| Computers | Computer Services | Information Technology Services | 11081700 | Cloud Services | C05 |
| Computers | Computer Services | Software Publishers | 11204300 | | C06 |
| Education | Education | Education - Mixed | 14000000, 14010000, 14010600, 14010654, 14011000, 14011001, 14011004, 14020100, 14030600, 14040302, 14050802 | | ED5 |
| Education | Educational Services | Educational Consultants | 14050600, 14050700, 11101700 | Education Consultants, Education Consulting, Educational Consulting | ED2 |
| Education | Educational Services | Testing Services | 14050200 | | ED2 |
| Education | Educational Services | Tutoring & Exam Preparations | 14050300, 14030503 | College Prep, SATs, PSATs, SAT Test Prep, Tutors, Tutoring Services | ED2 |
| Education | Elementary And Secondary Schools | Elementary & Secondary Schools | 14080000, 1410000 | | ED1 |
| Education | Elementary And Secondary Schools | Montessori Schools | 14010508 | | ED1 |
| Education | Elementary And Secondary Schools | Private Elementary Schools | 14080200 | | ED1 |
| Education | Elementary And Secondary Schools | Private Secondary Schools | 14100200 | | ED1 |
| Education | Elementary And Secondary Schools | Religious Education Schools | 14110000 | Christian Schools, Catholic Schools | ED1 |
| Education | Higher Education | Colleges & Universities | 14040000, 14040201 | | ED2 |
| Education | Higher Education | Law School | 14010304 | | ED2 |
| Education | Higher Education | Online Colleges | 14051000 | | ED2 |
| Education | Special Interest Schools | Acting Schools | 14010601 | Drama Schools | ED3 |
| Education | Special Interest Schools | Business, Vocational & Technical Schools | 14010200 | | ED3 |
| Education | Special Interest Schools | Continuing Education Schools | 14010300, 14010307, 14010308 | Seminary Schools, Dental Schools | ED3 |
| Education | Special Interest Schools | Correspondence & Writing Schools | 14010612 | | ED4 |
| Education | Special Interest Schools | Cosmetology School | 14010209 | Barber | ED3 |
| Education | Special Interest Schools | Fine Arts Schools | 14010214 | | ED3 |
| Education | Special Interest Schools | First Aid Training Schools | 14010621 | | ED4 |
| Education | Special Interest Schools | Flight Training Schools | 14010215 | | ED3 |
| Education | Special Interest Schools | Language Schools | 14010400 | | ED4 |
| Education | Special Interest Schools | Marketing Schools | 14010227 | | ED3 |

Fig. 49

| Industry | Segment | Category | BDC Codes | Keywords | Vertical ID |
|---|---|---|---|---|---|
| Education | Special Interest Schools | Modeling Schools | 11250900 | | ED3 |
| Education | Special Interest Schools | Motivational & Self Improvement Schools | 14010631, 14010636 | Public Speaking, Speech | ED4 |
| Education | Special Interest Schools | Music Schools | 14010632 | | ED3 |
| Education | Special Interest Schools | Reading Instruction Schools | 14010633 | | ED4 |
| Education | Special Interest Schools | Safety Training Schools | 14010659 | | ED4 |
| Education | Special Interest Schools | Secretarial Schools | 14010222 | | ED3 |
| Education | Special Interest Schools | Special Education & Care Schools | 14010500, 14010502 | Blind Schools | ED3 |
| Education | Special Interest Schools | Yoga Instruction Schools | 14010640 | | ED4 |
| Food & Beverage | Bakeries | Bakeries - Bread, Cake, Pies, & Pastries | 16170000, 16170401, 16170402 16170405, 16170700 | Cookies | FB4 |
| Food & Beverage | Bakeries | Bakeries - Donuts, Bagels, & Pretzels | 16170100, 16170200, 16170300, 16170600 | Donut Shops, Bagel Shops | FB4 |
| Food & Beverage | Beverage Stores | Liquor Stores | 25080500, 25080502 | Beers, Wines, Spirits | FB10 |
| Food & Beverage | Beverage Stores | Water, Coffee, Tea Stores | 25081000, 25081001, 25081002, 25090909, 25093500 | | FB10 |
| Food & Beverage | Cafeterias | Cafeterias & Buffets | 16160700, 16164400 | | FB4 |
| Food & Beverage | Drinking Establishments | Bars, Pubs & Night Clubs | 16020000, 16020100, 16020102, 16020104, 16020105, 16020106, 16020110, 16020112, 16020200, 16020500, 16062300, 16020113 | Sports Bars, Breweries, Taverns, Cigar Lounges, Cocktails, Lounges, Cocktail Lounges | FB6 |
| Food & Beverage | Fast Food | Deli & Sandwich Shops | 16160300, 16160400 | | FB3 |
| Food & Beverage | Fast Food | Fast Food Restaurants | 16163800, 16163900, 16010500, 16161600, 16121100 | | FB3 |
| Food & Beverage | Fast Food | Hamburger Restaurants | 16163100 | | FB3 |
| Food & Beverage | Food & Beverage | Food & Beverage - Mixed | 25080000, 25090200, 25090402, 25093300 | | FB11 |
| Food & Beverage | Food Service Contractors | Banquet Halls | 16010100, 11131701 | Auditoriums, Ballrooms | FB5 |
| Food & Beverage | Food Service Contractors | Caterers | 16010200, 16011200 | | FB5 |
| Food & Beverage | Grocers - Retail | Chinese Markets | 25091401 | | FB7 |
| Food & Beverage | Grocers - Retail | Convenience Stores | 25080100, 25080106 | Convenience Stores | FB8 |
| Food & Beverage | Grocers - Retail | Grocery Stores & Supermarkets | 25080200, 25080203 | Grocerys Stores, Super Markets, Grocers, Groceries, Food Stores, super-markets | FB7 |
| Food & Beverage | Grocers - Retail | Japanese Markets | 25080303 | | FB7 |
| Food & Beverage | Grocers - Retail | Mexican Markets | 25080313 | | FB7 |
| Food & Beverage | Mobile Food Service | Food Trucks | 16164000, 16164001, 16164002, 16164003 | Food Carts, Catering Trucks, Lunch Trucks | FB4 |

Fig. 50

| Industry | Segment | Category | BDC Codes | Keywords | Vertical ID |
|---|---|---|---|---|---|
| Food & Beverage | Restaurants | American, Diners, Family, Country | 16161200, 16121400, 16161300, 16161400 | | FB1 |
| Food & Beverage | Restaurants | Barbeque Restaurants | 16161900, 16162400 | BBQ | FB2 |
| Food & Beverage | Restaurants | Bars & Grills | 16163500, 16164300 | Pubs, Lounges, Restaurant Lounges | FB2 |
| Food & Beverage | Restaurants | Breakfast Restaurants | 16180000, 16180100, 16180300 | Pancake House, Waffle House | FB2 |
| Food & Beverage | Restaurants | Cafes & Bistros | 16160200, 16160203, 16160235 | | FB2 |
| Food & Beverage | Restaurants | Chinese Restaurants | 16090000, 16090100, 16091200 | | FB1 |
| Food & Beverage | Restaurants | French Restaurants | 16100100 | | FB1 |
| Food & Beverage | Restaurants | General Restaurants | 16000000, 16010000, 16220100 | | FB1 |
| Food & Beverage | Restaurants | Greek Restaurants | 16100300 | | FB1 |
| Food & Beverage | Restaurants | Health Food Restaurants | 16161100, 16161104 | | FB2 |
| Food & Beverage | Restaurants | Indian Restaurants | 16111300, 16111301 | | FB2 |
| Food & Beverage | Restaurants | Italian & Pizza Restaurants | 16100500, 16100517, 16163600 | | FB2 |
| Food & Beverage | Restaurants | Japanese Restaurants | 16090200, 16090400 | Sushi | FB1 |
| Food & Beverage | Restaurants | Korean Restaurants | 16090300 | | FB1 |
| Food & Beverage | Restaurants | Mexican Restaurants | 16140100 | | FB2 |
| Food & Beverage | Restaurants | Middle Eastern / Mediterranean / African Restaurants | 16110000, 16080200, 16102900 | European Cuisine | FB2 |
| Food & Beverage | Restaurants | Seafood Restaurants | 16210100, 16210105, 16210109, 16210200 | Fish and Chips | FB2 |
| Food & Beverage | Restaurants | Steak Restaurants | 16162500 | | FB2 |
| Food & Beverage | Restaurants | Thai Restaurants | 16091900 | | FB1 |
| Food & Beverage | Restaurants | Vietnamese Restaurants | 16092500 | | FB1 |
| Food & Beverage | Specialty Food | Coffee Shops | 16160900 | | FB4 |
| Food & Beverage | Specialty Food | Snacks & Desserts | 16190000, 16190100, 16190300, 16190500, 16190900, 16190700, 1611000, 25090302 | Ice Cream, Frozen Yogurt, Smoothies, Juices | FB4 |
| Food & Beverage | Specialty Food Stores | Candy & Nut Stores | 25090701, 25090703, 25090704, 25092900 | Snack Foods | FB9 |
| Food & Beverage | Specialty Food Stores | Chocolate | 25091200, 25092800 | | FB9 |
| Food & Beverage | Specialty Food Stores | Dairy & Cheese | 25090100, 25090103 | | FB9 |
| Food & Beverage | Specialty Food Stores | Fish & Seafood Markets | 25091500 | | FB9 |
| Food & Beverage | Specialty Food Stores | Fruit & Vegetables Markets | 25090300 | | FB9 |
| Food & Beverage | Specialty Food Stores | Gourmet | 25080400 | | FB9 |
| Food & Beverage | Specialty Food Stores | Herbs & Spices | 25090400 | | FB9 |

Fig. 51

| Industry | Segment | Category | BDC Codes | Keywords | Vertical ID |
|---|---|---|---|---|---|
| Food & Beverage | Specialty Food Stores | Meat Markets | 25080301, 25090600 | Butcher Shops | FB9 |
| Food & Beverage | Tobacco Stores | Tobacco Stores | 25110400 | Cigars, Pipes | FB10 |
| Food & Beverage | Wineries | Wineries | 20113200 | | FB10 |
| Healthcare | Alternative Medicine | Acupuncturists, Acupressure | 18030100, 18030101, 18031104 | Reflexologists | HC11 |
| Healthcare | Alternative Medicine | Chiropractors | 18030200, 18050219 | | HC10 |
| Healthcare | Alternative Medicine | Holistic Medicine | 18030400 | | HC11 |
| Healthcare | Alternative Medicine | Homeopaths | 18031106, 18030500 | | HC11 |
| Healthcare | Alternative Medicine | Hypnotherapists | 18030765 | Hypnosis | HC11 |
| Healthcare | Alternative Medicine | Massage Therapists | 22080800, 22080801 | Massage Therapy | HC12 |
| Healthcare | Alternative Medicine | Natural Healing | 18031108, 18031101, 18031100 | Naturopaths | HC11 |
| Healthcare | Dentistry | Dentists - General | 18030300 | Dentist, Dentists | HC13 |
| Healthcare | Dentistry | Denturists & Dental Emergency Services | 18030303, 18030310 | | HC14 |
| Healthcare | Dentistry | Endodontists | 18030309 | | HC14 |
| Healthcare | Dentistry | Dental Hygienists | 18031500 | Teeth Cleaning | HC14 |
| Healthcare | Dentistry | Oral & Maxillofacial Surgeons | 18030313 | | HC14 |
| Healthcare | Dentistry | Orthodontists | 18030314 | | HC14 |
| Healthcare | Dentistry | Pediatric Dentists | 18030319 | Childrens Dentist | HC14 |
| Healthcare | Dentistry | Periodontists | 18030315 | | HC14 |
| Healthcare | Dentistry | Prosthodontists | 18030316 | Teeth Replacement, Tooth Replacement, TMJ, Sleep Apnea | HC14 |
| Healthcare | Healthcare Equipment & Supplies | Medical Equipment & Supplies | 18041400, 18041500, 18042100, 18042300, 18042400, 18042700, 18042802, 18043000, 18043200, 18044201, 18044400, 18044600, 18044700, 18042402 | Health Equipment, Healthcare Equipment, Medical Equipment, Medical Supplies | HC19 |
| Healthcare | Healthcare Facilities | Blood & Organ Banks | 18050100 | | HC20 |
| Healthcare | Healthcare Facilities | Eating Disorder Clinics | 18030773 | | HC20 |
| Healthcare | Healthcare Facilities | Endoscopy Center | 1803010 | | HC20 |
| Healthcare | Healthcare Facilities | Hospitals | 18050500 | Medical Centers, Childrens Hospital, Emergency Rooms, Surgery | HC20 |
| Healthcare | Healthcare Facilities | Healthcare Facilities - Mixed | 18010400, 18010601, 18010901, 18011400, 18011801, 18012200, 18012500, 18012501, 18012600, 18012903, 18013200, 18013901, 18014201, 18030000, 18051000, 18051325 | | HC23 |
| Healthcare | Healthcare Facilities | Homes For The Elderly | 18050800, 18050612, 24030305 | | HC21 |

Fig. 52

| Industry | Segment | Category | BDC Codes | Keywords | Vertical ID |
|---|---|---|---|---|---|
| Healthcare | Healthcare Facilities | Hospices | 18050400 | | HC21 |
| Healthcare | Healthcare Facilities | Imaging Centers | 18051320 | Diagnostic Imaging Centers | HC20 |
| Healthcare | Healthcare Facilities | Kidney Dialysis Centers | 18050521 | | HC20 |
| Healthcare | Healthcare Facilities | Laser Surgery Centers | 18050206 | | HC20 |
| Healthcare | Healthcare Facilities | Medical Groups & Clinics | 18050208, 18050000, 18050242, 18050202, 18050200, 18050233 | Medical Clinics | HC20 |
| Healthcare | Healthcare Facilities | Medical Testing Laboratories | 18051306, 18051300 | | HC20 |
| Healthcare | Healthcare Facilities | Nursing Care Facilities | 18050600, 18050603, 18050604, 18050605, 18050614, 12051410 | Long-Term Care, Alzheimers Care, Nursing Homes, Assisted Living, Skilled Nursing, Convalescent Hospital | HC21 |
| Healthcare | Healthcare Facilities | Pain Management Center | 18030746 | | HC20 |
| Healthcare | Healthcare Facilities | Rehabilitation Centers | 18031307 | | HC20 |
| Healthcare | Healthcare Facilities | Retirement Communities | 18050900 | Retirement Homes, Seniors Living, Independent Seniors Living | HC21 |
| Healthcare | Healthcare Facilities | Sleep Disorder Centers | 18030744 | | HC20 |
| Healthcare | Healthcare Facilities | Urgent Care Centers | 18050234 | | HC20 |
| Healthcare | Healthcare Facilities | Wound Care Center | 18030787 | | HC20 |
| Healthcare | Healthcare Professionals Services | Audiologists | 18031201, 18031207, 18014302 | Hearing Loss, Hearing Aids, Hearing Assessments, Hearing Tests | HC16 |
| Healthcare | Healthcare Professionals Services | Home Health Care Services | 18050300, 18050301, 18050303, 18050304, 18010000 | Home Health Care Services, Health Care Information | HC18 |
| Healthcare | Healthcare Professionals Services | Nursing Services | 18030600, 18060601, 18030602, 18030604, 18030609, 18030611 | Licensed Nurse | HC18 |
| Healthcare | Healthcare Professionals Services | Occupational Therapists | 18030901, 18030902, 18030903 | | HC16 |
| Healthcare | Healthcare Professionals Services | Physical Therapists | 18030756, 18031000, 18032000 | Sports Medicine, Physiotherapy | HC17 |
| Healthcare | Healthcare Professionals Services | Respiratory Therapists | 18013001 | | HC16 |
| Healthcare | Healthcare Professionals Services | Speech Therapists | 18031205 | Language Pathologists | HC16 |
| Healthcare | Mental Health | Outpatient Mental Health & Substance Abuse Centers | 18013300, 18013301 | Drug Rehab Outpatient, Alcohol Rehab Outpatient, Outpatient Clinics | HC9 |
| Healthcare | Mental Health | Psychiatric & Substance Abuse Hospitals | 18050511 | | HC9 |
| Healthcare | Mental Health | Psychiatrists | 18030751 | | HC9 |

Fig. 53

| Industry | Segment | Category | BDC Codes | Keywords | Vertical ID |
|---|---|---|---|---|---|
| Healthcare | Mental Health | Psychologists, Psychotherapists, Psychoanalysts | 18031700 | | HC9 |
| Healthcare | Mental Health | Inpatient Mental Health & Substance Abuse Facilities | 18050215 | Drug Rehab Inpatient, Alcohol Rehab Inpatient, Inpatient Clinics, Residential Mental Health | HC9 |
| Healthcare | Nutrition And Wellness | Dieticians & Nutritionists | 18031600 | | HC22 |
| Healthcare | Nutrition And Wellness | Health Food & Vitamin Stores | 25093700, 25181400, 25180400 | Herbs | HC22 |
| Healthcare | Nutrition And Wellness | Weight Reducing Centers | 22040600, 22040607, 22040900 | Diet Centers, Weight Loss Clinics | HC22 |
| Healthcare | Ophthalmology | Ophthalmology | 18030738 | Eye Doctor | HC15 |
| Healthcare | Optometry | Optometrists | 18030739, 18050210 | | HC15 |
| Healthcare | Pharmacies & Drug Stores | Pharmacies & Drug Stores | 18050700 | Prescriptions, RXs | HC22 |
| Healthcare | Physicians And Surgeons | Allergists & Immunologists | 18030701 | | HC8 |
| Healthcare | Physicians And Surgeons | Cardiologists | 18030704, 18030752 | Pulmonary Disease | HC6 |
| Healthcare | Physicians And Surgeons | Dermatologists | 18030705 | | HC8 |
| Healthcare | Physicians And Surgeons | Ears Nose & Throat Specialists | 18030708 | Otolaryngology | HC8 |
| Healthcare | Physicians And Surgeons | Endocrinologists | 18030709 | | HC8 |
| Healthcare | Physicians And Surgeons | Fertility Specialists | 18030712 | | HC7 |
| Healthcare | Physicians And Surgeons | Gastroenterologists | 18030713 | | HC6 |
| Healthcare | Physicians And Surgeons | Head & Neck Specialists | 18030717 | | HC8 |
| Healthcare | Physicians And Surgeons | Internal Medicine Specialists | 18030726 | | HC3 |
| Healthcare | Physicians And Surgeons | Neurologists | 18030731 | | HC6 |
| Healthcare | Physicians And Surgeons | Neuropathic Specialists | 18030732 | | HC6 |
| Healthcare | Physicians And Surgeons | Obstetrics & Gynecologists | 18030780 | OBGYN | HC7 |
| Healthcare | Physicians And Surgeons | Oncologists | 18030737 | Cancer Doctor | HC6 |
| Healthcare | Physicians And Surgeons | Orthopedic Specialists | 18030740 | | HC5 |
| Healthcare | Physicians And Surgeons | Osteopath | 18030769 | | HC4 |
| Healthcare | Physicians And Surgeons | Pathologists, Radiologists, Anesthesiologists | 18030753, 18030318 | Dental Radiology, Dental Radiologist | HC8 |
| Healthcare | Physicians And Surgeons | Pediatricians | 18030766 | Childrens Doctors, Kids Doctors | HC2 |
| Healthcare | Physicians And Surgeons | Physicians & Surgeons - Mixed | 18030757, 18030715, 18030718, 18030754, 18030775 | | HC24 |
| Healthcare | Physicians And Surgeons | Plastic Surgeons | 18030749, 18030728 | Liposuction, Face Lifts, Botox, Plastic surgery | HC8 |

Fig. 54

| Industry | Segment | Category | BDC Codes | Keywords | Vertical ID |
|---|---|---|---|---|---|
| Healthcare | Physicians And Surgeons | Podiatrists | 18030764 | | HC8 |
| Healthcare | Physicians And Surgeons | Doctors & Primary Care Physicians | 18030700, 18030711 | Family Doctors, Doctor, Doctors, Drs, Dr.s, Medical Doctors, MDs, M.D.s | HC1 |
| Healthcare | Physicians And Surgeons | Proctologists | 18030750 | | HC7 |
| Healthcare | Physicians And Surgeons | Urologists | 18030761 | | HC7 |
| Home, Construction & Garden | Building Material Suppliers | Brick & Stone Products | 13024300, 13024302, 13024305, 13024311, 13024314, 13024322, 13024312 | | HG17 |
| Home, Construction & Garden | Building Material Suppliers | Fencing Supplies | 13020500, 13020505, 25280000 | | HG17 |
| Home, Construction & Garden | Building Material Suppliers | Flooring Materials & Supplies | 13021800, 13021803 | Flooring Supplies | HG17 |
| Home, Construction & Garden | Building Material Suppliers | Garage Doors & Gates | 13021900 | Security Doors, Security Gates | HG17 |
| Home, Construction & Garden | Building Material Suppliers | General Building Supplies | 13027200 | | HG17 |
| Home, Construction & Garden | Building Material Suppliers | Granite, Marble, Slate | 25230400, 25230600, 25230700 | | HG17 |
| Home, Construction & Garden | Building Material Suppliers | Heating & Plumbing Supplies | 13022600, 13022626, 13022627, 13022631, 13022632, 13022633, 13022635, 25450200, 13024408 | | HG17 |
| Home, Construction & Garden | Building Material Suppliers | Kitchen & Bath Supplies | 13024600 | | HG17 |
| Home, Construction & Garden | Building Material Suppliers | Lumber | 13023000, 13023020, 25220000 | Lumber Yard | HG17 |
| Home, Construction & Garden | Building Material Suppliers | Roofing Materials | 13023600, 25300000 | | HG17 |
| Home, Construction & Garden | Building Material Suppliers | Tiles & Ceramics Stores | 13026300, 13026301 | | HG17 |
| Home, Construction & Garden | Building Material Suppliers | Tools & Hardware Suppliers | 25450100 | | HG17 |
| Home, Construction & Garden | Building Material Suppliers | Windows & Doors Suppliers | 13024200, 13024202, 13024209, 13024210, 25261100, 25261200, 25260900, 13024216 | Screens, Shutters, Skylights, Rolling Doors, Sliding Doors | HG17 |
| Home, Construction & Garden | Commercial Buildings | Commercial Buildings Contractors | 13010400 | | HG14 |
| Home, Construction & Garden | Commercial Buildings | Commercial Equipment Installation Contractors | 13014002 | Millwrights | HG14 |
| Home, Construction & Garden | Construction Services | Site Preparation Contractors | 13050900, 13050905, 13011300 | Construction Clean-Up | HG15 |

Fig. 55

| Industry | Segment | Category | BDC Codes | Keywords | Vertical ID |
|---|---|---|---|---|---|
| Home, Construction & Garden | Contractors & Suppliers | Contractors & Suppliers - Mixed | 25250000, 25260500, 25261000, 25270000, 25270102, 25320000, 25330000, 25340000, 25401600, 25402500, 25410000, 25410400, 25410500, 25411900, 25420400, 25422000, 25460300, 25460500, 25460600, 25480000, 25490000, 13011800, 13013108, 13013500, 13013602, 13014000, 13014601, 13014603, 13014604, 13014606, 13016000, 13016200, 13017600, 13017800, 13017811, 13017900, 13018300, 13018904, 13019102, 13019609, 13019611, 13019703, 13019800, 13019802, 13030901, 13050102, 13050400, 13050500, 13050902, 13051200, 13051400, 13052901, 13053502, 13053702, 13054103, 13054400, 13054403, 13054500, 13054501, 13055102, 13055109, 13055112, 13055401, 13055403, 13055406, 13056100, 13056103, 13056600, 13056804, 13056900, 13057000, 13057003, 13057005, 13057900, 13020000, 13020401, 13021903, 13022000, 13022005, 13022006, 13022803, 13022902, 13023400, 13023604 | | HG36 |
| Home, Construction & Garden | Engineering Services | Engineers | 11101900, 11101901, 11101904, 11120000, 11120100, 11120500, 11121002, 11121400, 11121402 | | HG16 |
| Home, Construction & Garden | Engineering Services | Engineers - Mixed | 11120806, 11120808, 11121000, 11122609, 11123100, 11123101, 11123105, 11123106, 11121700, 11124104, 11124110, 11124200, 11125100, 11124803, 11124805, 11124817, 11124818, 11124300, 11124301, 11124314, 11124319, 11124402, 11121403 | | HG35 |
| Home, Construction & Garden | Furniture Rental | Appliances & Equipment Rental Centers | 25010800, 25160000 | | HG33 |
| Home, Construction & Garden | Furniture Rental | Home Furnishing Rental Centers | 25160800, 25160803 | | HG33 |
| Home, Construction & Garden | Home Improvement | Cabinet Contractors | 13012000, 13012002 | | HG9 |
| Home, Construction & Garden | Home Improvement | Carpenters | 13014300, 13014308 | | HG9 |
| Home, Construction & Garden | Home Improvement | Ceiling Contractors | 13010200, 13010201 | | HG7 |

Fig. 56

| Industry | Segment | Category | BDC Codes | Keywords | Vertical ID |
|---|---|---|---|---|---|
| Home, Construction & Garden | Home Improvement | Chimneys & Fireplaces Construction Contractors | 13014501 | Hearths, Hearths Builders, Hearths Constructions, Hearths Contractors, Chimneys Construction, Chimneys Contractors, Chimneys Construction Contractors | HG10 |
| Home, Construction & Garden | Home Improvement | Concrete Contractors | 13011000, 13011002, 13011008, 13011009 | Concrete Pouring, Conrete Cutting, Concrete Pumping, Concrete Repair | HG3 |
| Home, Construction & Garden | Home Improvement | Custom Woodworking | 13056800 | Woodworkers, Wood Craftsman | HG9 |
| Home, Construction & Garden | Home Improvement | Deck & Patio Construction Contractors | 13012400, 13012401, 13012403 | Gazebo | HG10 |
| Home, Construction & Garden | Home Improvement | Driveways Contractors | 13010603, 13016901, 13016902, 13016903, 13016906 | Construction, Paving, Resurfacing | HG10 |
| Home, Construction & Garden | Home Improvement | Drywall, Plastering, & Insulation Contractors | 13011500, 13052200, 13052201, 13052208, 13052203, 13022800 | | HG7 |
| Home, Construction & Garden | Home Improvement | Electrical Contractors & Electricians | 13017100, 13017112, 13017105 | Home Theater Installation, Electricians | HG2 |
| Home, Construction & Garden | Home Improvement | Fencing Contractors | 13018001, 25170709 | Fence Builders | HG10 |
| Home, Construction & Garden | Home Improvement | Flooring Contractors | 13012100, 13012101, 13012105, 13056700, 13056701 | Carpets, Carpeting, Hardwoods, hardwoods floors, hardwood flooring contractors | HG9 |
| Home, Construction & Garden | Home Improvement | Foundation Contractors | 13012500, 13012502 | | HG3 |
| Home, Construction & Garden | Home Improvement | Framing Contractors | 13011700, 13014307 | Frame Builders | HG4 |
| Home, Construction & Garden | Home Improvement | Garages Contractors | 13014312, 13022002 | Garage Builders, Garage Organizers, Garage Organization | HG9 |
| Home, Construction & Garden | Home Improvement | General Contractors | 13010000, 13010300 | Construction Companies, General Builders | HG1 |
| Home, Construction & Garden | Home Improvement | Glass & Glazing Contractors | 13019100, 13019105 | | HG9 |
| Home, Construction & Garden | Home Improvement | Handyman Contractors | 11222900 | Handymen | HG11 |
| Home, Construction & Garden | Home Improvement | Home Remodeling Contractors | 13011900, 13011902, 13011903, 13011904, 13011907 | Kitchen and Bath Remodelers, Remodelers, Remodel Contractors | HG1 |
| Home, Construction & Garden | Home Improvement | Masonry & Stone Contractors | 13051101, 13051103, 13051109, 13051111 | Bricklaying, Bricklayers, Stone Workers | HG5 |
| Home, Construction & Garden | Home Improvement | Painters & Wallpaper Installers | 13051800, 13010500, 13012700, 13051801, 13051808 | | HG8 |

Fig. 57

| Industry | Segment | Category | BDC Codes | Keywords | Vertical ID |
|---|---|---|---|---|---|
| Home, Construction & Garden | Home Improvement | Rain Gutters & Eaves Contractors | 13019301, 13019307 | Downspouts | HG10 |
| Home, Construction & Garden | Home Improvement | Roofing Contractors | 13012600 | Roof Builders, Roofs, Roofers, Roofing, Roof Contractors, Roofing Builders, Roof Leaks, Roof Repairs | HG6 |
| Home, Construction & Garden | Home Improvement | Sidings Contractors | 13010700 | | HG7 |
| Home, Construction & Garden | Home Improvement | Solar Panels Contractors | 13054100, 13054101 | | HG10 |
| Home, Construction & Garden | Home Improvement | Stairs & Balconies Contractors | 13054300, 13054301 | Terraces, Balcony, Balcony Builders, Stair Builders | HG10 |
| Home, Construction & Garden | Home Improvement | Stucco & Grouting Contractors | 13054801, 13054805 | | HG5 |
| Home, Construction & Garden | Home Improvement | Sunrooms | 13014311, 13054901, 1354902, 13010604, 13054902 | Vanishing Screens, Solariums | HG9 |
| Home, Construction & Garden | Home Improvement | Swimming Pool Installation | 13055001 | Pool Design, Pool Designers | HG10 |
| Home, Construction & Garden | Home Improvement | Tiles & Terrazzos Contractors | 13055300, 13055301, 13055302, 13055303, 13055306, 13055308 | Granites, Ceramics, Marbles, Tiles Installers, Tiles Installations, Tiles Repairs, Tiles Replacements, Tiles Contractors, Tilers | HG5 |
| Home, Construction & Garden | Home Improvement | Windows & Door Contractors | 13011100, 13011102, 13017819 | | HG9 |
| Home, Construction & Garden | Home Repairs | Appliances Repairs & Parts | 25010300, 25010400, 25171204, 25171206, 25171209 | Refrigerators, Dishwashers, Ovens, Washers, Dryers, Microwaves, Vacuums, Lighting, Garbage Disposals | HG26 |
| Home, Construction & Garden | Home Repairs | Chimneys & Fireplaces Repairs & Installations | 11138114, 25170710, 25181511 | Hearths Repairs, Hearths Installations, Chimneys Repairs, Chimneys Installations, Fireplaces Installations | HG27 |
| Home, Construction & Garden | Home Repairs | Furniture Repairs & Upholsterys | 25170200, 25170202, 25170600, 25170601, 25170900 | Antique Restorations | HG27 |
| Home, Construction & Garden | Home Repairs | Garage Door Repairs | 25170708 | | HG27 |
| Home, Construction & Garden | Home Repairs | Garden Equipment Repairs | 25171300, 25171301, 25171304, 25171305 | Mowers Repairs, Tractors Repairs, Lawn Mowers Repairs | HG27 |
| Home, Construction & Garden | Home Repairs | Heating & Air Conditioning Repairs | 25170500, 19111100, 13019600, 13019602 | | HG26 |
| Home, Construction & Garden | Home Repairs | Picture Repairs & Restorations | 25170707 | | HG27 |

Fig. 58

| Industry | Segment | Category | BDC Codes | Keywords | Vertical ID |
|---|---|---|---|---|---|
| Home, Construction & Garden | Home Repairs | Plumbers | 13011200, 13011202, 13011206, 13011207, 11221302, 11221300 | Drain Cleaning, Sewer Repair, Plumbing | HG25 |
| Home, Construction & Garden | Home Repairs | Television & Radio Repairs | 25070804 | | HG26 |
| Home, Construction & Garden | Home Retail | Awnings & Tents | 25141300, 25141301 | | HG33 |
| Home, Construction & Garden | Home Retail | BBQ Equipment | 25141401 | Barbecue Grills, Smokers, Propane Grills, Natural Gas Grills | HG33 |
| Home, Construction & Garden | Home Retail | Floors Coverings Stores | 25184300, 251843001, 25184303, 25184304, 25184305, 25310100 | Rugs, Laminates Flooring, Vinyl Flooring, Floor Coverings, linoleums, Granites Dealers, Ceramics Dealers, Marbles Dealers, Tiles Dealers, Vinyls Dealers, Flooring Dealers, Hardwoods Dealers, Carpets Dealers, Carpeting Dealers, Laminates Dealers, Linoleum Dealers | HG30 |
| Home, Construction & Garden | Home Retail | Furniture Stores | 25181100, 25181102, 25181140, 25181141, 25181144, 25181145, 25181149, 25181150, 25181158, 25181164, 25111603, 25140903, 25181174 | Outdoor Furnitures, Rattanas, Bedroom Furnitures, Dining Room Furnitures, Living Room Furnitures, Patio Furnitures, Kids Furnitures | HG31 |
| Home, Construction & Garden | Home Retail | Glass & Mirror Shops | 25181502 | | HG32 |
| Home, Construction & Garden | Home Retail | Hardware Stores | 25450000 | | HG29 |
| Home, Construction & Garden | Home Retail | Home Furnishings | 25181200, 25181222, 25181226, 25181227, 25181229 | | HG31 |
| Home, Construction & Garden | Home Retail | Home Improvement Centers | 25380000, 25400000, 25460115 | | HG28 |
| Home, Construction & Garden | Home Retail | Home Lighting & Ceiling Fans | 25010509, 25050900, 25050902 | | HG33 |
| Home, Construction & Garden | Home Retail | Home Theater Systems | 25052001, 25050100, 25050200 | Stereos, Televisions | HG33 |
| Home, Construction & Garden | Home Retail | Hot Tub, Spas, & Pool Supplies | 25290101, 25141200, 25141100 | | HG33 |
| Home, Construction & Garden | Home Retail | Household & Commercial Refrigeration | 25010113, 25010122 | | HG33 |
| Home, Construction & Garden | Home Retail | Household Appliances Stores | 25010000, 25010100, 25010600 | Used Appliances | HG33 |
| Home, Construction & Garden | Home Retail | Kitchenware & Housewares Stores | 25184002, 25184003, 25184004, 25184000, 25184003, 25184004 | China, Crystal, Cookware, Cutlery | HG32 |

Fig. 59

| Industry | Segment | Category | BDC Codes | Keywords | Vertical ID |
|---|---|---|---|---|---|
| Home, Construction & Garden | Home Retail | Kitchen & Bath Stores | 25290200, 25181223, 25181224, 25290100, 13024605 | Kitchen and Bath Stores | HG32 |
| Home, Construction & Garden | Home Retail | Educational Stores & Materials | 25188200, 25188201, 25188202 | Teachers Stores, Teachers Aids, Teacher's Aids, Teaching Materials | HG32 |
| Home, Construction & Garden | Home Retail | Linen Stores | 25181218 | Sheets | HG32 |
| Home, Construction & Garden | Home Retail | Mattress Stores | 25181105 | | HG32 |
| Home, Construction & Garden | Home Retail | Nursery - Garden Centers | 25070300, 25460000, 25460100, 10110205 | Seeds, Bulbs, Wholesale Seeds, Wholesale Bulbs, Seed Growers, Bulb Growers | HG34 |
| Home, Construction & Garden | Home Retail | Outdoor Power Equipment & Supplies | 25010105, 25010107, 25010115, 25460107 | Lawn Mowers, Sprinklers, | HG34 |
| Home, Construction & Garden | Home Retail | Paint & Wallpaper Stores | 25182300, 25430100, 25430200, 25440000, 25182310, 25182314 | | HG29 |
| Home, Construction & Garden | Home Retail | Picture Frame Shops | 11290600, 25181509, 25181515 | | HG32 |
| Home, Construction & Garden | Home Retail | Pottery Stores | 25181508 | | HG33 |
| Home, Construction & Garden | Home Retail | Sewing Machines | 25010506 | | HG33 |
| Home, Construction & Garden | Home Retail | Vacuums | 25010512 | | HG33 |
| Home, Construction & Garden | Home Retail | Window Treatment Stores | 25181506, 25181507, 13024702 | Curtains, Blinds, Shutters, Shades | HG32 |
| Home, Construction & Garden | Home Retail | Home Brewing & Wine Making Equipment | 25184012, 25100300 | | HG32 |
| Home, Construction & Garden | Home Services | Carpet & Upholstery Cleaning | 22100100, 22100103, 22100104, 22100105, 22100106 | Drapes, Rugs, Curtains, Treatment, Flood | HG20 |
| Home, Construction & Garden | Home Services | Chimneys & Fireplaces Cleaning | 13012300, 13012301, 13012302 | Hearths Cleaning, Chimneys Cleaning, Chimneys Sweeps, Chimneys Sweeping, Chimney Cleaning | HG21 |
| Home, Construction & Garden | Home Services | Fire & Flood Restoration Services | 13044606 | Fire Restoration, Flood Restoration | HG21 |
| Home, Construction & Garden | Home Services | Furnace & Air Duct Cleaning - Home | 13013501 | Air Purifying | HG21 |
| Home, Construction & Garden | Home Services | Graffiti Cleaning | 13044601 | Grafitti Removal, Grafitti Removing | HG21 |
| Home, Construction & Garden | Home Services | Home & Building Exterior Washing | 22100300, 22100301, 11131513 | Gutter Cleaning | HG21 |

Fig. 60

| Industry | Segment | Category | BDC Codes | Keywords | Vertical ID |
|---|---|---|---|---|---|
| Home, Construction & Garden | Home Services | Home & Office Cleaning Services | 22100500, 22100503, 22110100 | Window Cleaning, Maids | HG20 |
| Home, Construction & Garden | Home Services | Home Security Systems | 11240600, 11240601, 11240603, 11241100, 11241200 | Burglar Alarms | HG23 |
| Home, Construction & Garden | Home Services | House Sitting | 22130500 | | HG23 |
| Home, Construction & Garden | Home Services | Interior Design Services | 11290000, 11290100, 11290112, 11290113, 23021400 | Home Decorators, Feng Shui, Custom Furniture | HG19 |
| Home, Construction & Garden | Home Services | Locksmiths | 25172501, 25172503, 25172504, 23040100, 23040101, 25172500 | Keymaker | HG23 |
| Home, Construction & Garden | Home Services | Mold, Lead, Asbestos, Removal Services | 19030214, 11137811, 11137818 | | HG24 |
| Home, Construction & Garden | Home Services | Moving & Hauling Services | 26024200, 26024201, 26024204 | Piano Movers, Movers | HG24 |
| Home, Construction & Garden | Home Services | Pest Control Services | 13031000, 13031002, 13031010 | Green Treatment, Gophers, Bees, Termites | HG22 |
| Home, Construction & Garden | Home Services | Septic Tank Services - Home | 13053606, 13053605, 13053608 | | HG24 |
| Home, Construction & Garden | Home Services | Snow Plowing & Sweeping Service | 11108101, 11108103 | | HG21 |
| Home, Construction & Garden | Home Services | Swimming Pool Cleaning & Service | 11222200, 11222204 | Hot Tubs, Spa | HG21 |
| Home, Construction & Garden | Home Services | Well Drilling Services | 13056305, 13056301, 13056400 | | HG24 |
| Home, Construction & Garden | Landscape Design & Service | Landscape Lighting | 25460104 | | HG18 |
| Home, Construction & Garden | Landscape Design & Service | Landscape Maintenance | 10130000, 10130100, 10130300, 10130302 | Grass Mowing, Lawn care, Lawn Maintenance, Yardwork, Yard Work, Yard Workers, Lawn Mowing, Lawn Care | HG18 |
| Home, Construction & Garden | Landscape Design & Service | Landscaping Architects & Designers | 10120000, 10120100, 10120101, 10120105, 10120200 | | HG18 |
| Home, Construction & Garden | Landscape Design & Service | Tree Service | 10110300 | Tree Care, Tree Removal, Tree Trimming, Tree Trimmers | HG18 |
| Home, Construction & Garden | New Home Construction | Architectural Services | 11120200, 11120208, 11124907, 11124901, 11124906, 11122100 | | HG13 |
| Home, Construction & Garden | New Home Construction | Drafting Services | 11120900, 11120901, 11120902, 11120903, 11140800, 11140802 | | HG13 |
| Home, Construction & Garden | New Home Construction | General Contractors - New Home Build | 13010600, 13010606, 13010609, 13010610, 13010611 | | HG12 |

Fig. 61

| Industry | Segment | Category | BDC Codes | Keywords | Vertical ID |
|---|---|---|---|---|---|
| Home, Construction & Garden | New Home Construction | Mobile Homes & Log Cabins | 13057200, 13057201, 13057100, 24030400 | Modular Homes | HG13 |
| Industry & Agriculture | Agricultural / Livestock | Agricultural / Livestock - Mixed | 10010000, 10011200, 10020000, 10020102, 10020200, 10022000, 10030400, 10030424, 10050000, 10050400, 10050600, 10051002, 10051902, 10052600, 10060000, 10060700, 10060811, 10060900, 10061000, 10061500, 10070401, 10080100, 10080101, 10080400, 10080500, 10080506, 10080700, 10080708, 10080715, 10101400, 10110310, 10110401, 10130101, 10130102, 10150000, 10150102, 10160100, 10030430 | | IA9 |
| Industry & Agriculture | General Freight Trucking | General Freight Trucking | 19080000, 26021800, 26022100, 26022101, 26024300 | Long Haul, Short Haul, Local Trucking | IA8 |
| Industry & Agriculture | Industrial Machinery & Equipment | Industrial Machinery & Equipment - Mixed | 19150303, 19150401, 19150500, 19150600, 19150900, 19150911, 19151400, 19151401, 19153000, 19150303, 19150401, 19150500, 19150600, 19150900, 19150911, 19151400, 19151401, 19153000, 19158009, 19158200, 19160402, 19160409, 19160600, 19161102, 19161328, 19161352, 19161600, 19161700, 19162000, 19162003, 19164000, 19165200, 19165400, 19165402, 19166300, 19167400, 19167900, 19168200, 19168400, 19170201, 19170501, 19170700, 19170800, 19170805, 19171000, 19171100, 19171108, 19171200, 19171400, 19171900, 19172503, 19172700, 19172703, 19172901, 19172902, 19173500, 19174600, 19176000, 19176100, 19190801, 19192100, 19192206, 19192301, 19192303, 19192311, 19201000, 19201109, 19201800, 19201807, 19202101, 19202505, 19210101, 19210107, 19240000, 19250100, 19260906, 19270107, 19270202, 19270203, 19270314, 19270407, 19270411, 19270530, 19270533 | | IA12 |

Fig. 62

| Industry | Segment | Category | BDC Codes | Keywords | Vertical ID |
|---|---|---|---|---|---|
| Industry & Agriculture | Industrial Services, Supplies & Goods | Industrial Services, Supplies & Goods - Mixed | 25500100, 25500107, 25500121, 25500200, 25500205, 25500213, 25530000, 25540000, 25540200, 25540203, 25190100, 25190200, 25200200, 25200702, 25010500, 25010700, 25010503, 25050000, 25050400, 25050402, 25050403, 25050500, 25050702, 25050901, 25051000, 25051100, 25051400, 25051601, 19010200, 19030201, 19030306, 19030307, 19030310, 19030323, 19050000, 19050300, 19050302, 19060103, 19070000, 19070100, 19070200, 19070300, 19070900, 19070901, 19070903, 19070907, 19070927, 19070942, 19070943, 19071100, 19071200, 19080300, 19080316, 19080500, 19080700, 19081000, 19081600, 19100000, 19111131, 19111200, 19111202, 19111208, 19111302, 19111602, 19112001, 19112002, 19112600, 19112607, 19112800, 19113003, 19113007, 19113017, 19113400, 19113600, 19114000, 19120505, 19120506, 19120508, 19120509, 19120602, 19121205, 19121501, 19121502, 19121700 | | IA10 |
| Industry & Agriculture | Manufacturers | Manufacturers - Mixed | 20000000, 20010000, 20010100, 20010103, 20010105, 20010112, 20011100, 20030103, 20030201, 20050400, 20052100, 20052200, 20060400, 20060600, 20061701, 20062007, 20081000, 20081600, 20090100, 20090100, 20090123, 20090126, 20110100, 20110104, 20110802, 20112200, 20160500, 20161005, 20161403, 20161508, 20161535, 20161600, 20163901, 20180100, 20180104, 20180500, 20180517, 20180526, 20181100, 20181317, 20182102, 20182204, 20182206, 20182300, 20182600, 20182601, 20182604, 20182702, 20182906, 20182917, 20183400, 20183404, 20183500, 20183502, 20183700, 20183901, 20183903, 20184000, 20184000, 20184007, 20191100, 20193315, 20194601, 20195301, 20195501, 20195814, 20196000, 20196200, 20197202, 20197214, 20210322, 20220523, 20221204, 20230405, 20230406, 20230409, 20230411, 20230602, 20230605, 20240102, 20240116, 20240400, 20250100, 20270300 | | IA11 |
| Industry & Agriculture | Wholesalers - Agriculture | Farm Machinery & Equipment Wholesalers | 10050800 | | IA1 |
| Industry & Agriculture | Wholesalers - Agriculture | Farm Supplies Wholesalers | 10050300, 10050312 | | IA1 |

Fig. 63

| Industry | Segment | Category | BDC Codes | Keywords | Vertical ID |
|---|---|---|---|---|---|
| Industry & Agriculture | Wholesalers - Agriculture | Grain & Field Bean Wholesalers | 20112800, 25080908 | | IA1 |
| Industry & Agriculture | Wholesalers - Agriculture | Livestock Merchants & Wholesalers | 10080000 | | IA1 |
| Industry & Agriculture | Wholesalers - Agriculture | Raw Farm Products Wholesalers | 10100000 | | IA1 |
| Industry & Agriculture | Wholesalers - Chemicals | Chemicals Wholesalers | 19141100, 20060500 | | IA6 |
| Industry & Agriculture | Wholesalers - Construction Material | Brick & Stone Wholesalers | 20050200, 20270000, 19120500, 19120504, 25230300, 25230601, 25230800 | | IA7 |
| Industry & Agriculture | Wholesalers - Construction Material | Lumber Wholesalers | 20051100, 19173900, 25111600 | | IA7 |
| Industry & Agriculture | Wholesalers - Construction Material | Other Construction Material Wholesalers | 19170900, 19120800, 19120802 | | IA7 |
| Industry & Agriculture | Wholesalers - Construction Material | Roofing, Siding, & Insulation Wholesalers | 20192402 | | IA7 |
| Industry & Agriculture | Wholesalers - Food Products | Confectionary Products Wholesalers | 20110400 | | IA2 |
| Industry & Agriculture | Wholesalers - Food Products | Dairy Products Wholesalers | 20111100 | Milk Wholesalers, Cheese Wholesalers | IA2 |
| Industry & Agriculture | Wholesalers - Food Products | Fish & Seafood Products Wholesalers | 20111400 | Crab Wholesalers, Shrimp Wholesalers, Tuna Wholesalers, Lobster Wholesalers | IA2 |
| Industry & Agriculture | Wholesalers - Food Products | Frozen Food Products Wholesalers | 20112500, 25092100 | | IA2 |
| Industry & Agriculture | Wholesalers - Food Products | Fruit & Vegetables Products Wholesalers | 10060800 | | IA2 |
| Industry & Agriculture | Wholesalers - Food Products | Meat Products Wholesalers | 20110800, 25080905 | Steak Wholesalers | IA2 |
| Industry & Agriculture | Wholesalers - Food Products | Poultry Products Wholesalers | 10061100, 25094100 | Chicken Wholesalers | IA2 |
| Industry & Agriculture | Wholesalers - Metals | Metals Wholesalers | 20182900, 20182200, 20182000, 20181500, 25360000, 19136311 | Alloy Wholesalers, Bronze Products | IA7 |
| Industry & Agriculture | Wholesalers - Paper Products | Paper, Pulp, Paperboard Products Wholesalers | 19144001, 19144002, 19144003, 19145200 | | IA6 |
| Industry & Agriculture | Wholesalers - Petroleum | Petroleum Wholesalers | 20210300, 19070953 | Oil Wholesalers | IA7 |
| Industry & Agriculture | Wholesalers - Petroleum | Petroleum Products Wholesalers | 19143900, 19070955, 19071002 | Oil Products Wholesalers, Lubricant Wholesalers | IA7 |
| Industry & Agriculture | Wholesalers - Plastics | Plastics Wholesalers | 20230000, 19135400, 19135414, 19135415, 19135416, 19135444 | | IA7 |
| Industry & Agriculture | Wholesalers - Recyclable Materials | Recyclable Materials Wholesalers | 19220000, 19220500 | | IA7 |

Fig. 64

| Industry | Segment | Category | BDC Codes | Keywords | Vertical ID |
|---|---|---|---|---|---|
| Industry & Agriculture | Wholesalers - minerals And Mining | Minerals & Mining Wholesalers | 10100900 | Gold Mining Wholesalers | IA7 |
| Industry & Agriculture | Wholesalers-commercial Equip & Parts | Commercial Equipment Wholesalers | 25210000, 19150203, 25210101, 25210104, 25210105, 25210201, 25210202, 25210400, 25210502 | Restaurant Equipment Wholesalers | IA5 |
| Industry & Agriculture | Wholesalers-commercial Equip & Parts | Computer & Software Equipment Wholesalers | 20070000 | | IA5 |
| Industry & Agriculture | Wholesalers-commercial Equip & Parts | Electrical Equipment Wholesalers | 20080000, 20080702 | | IA5 |
| Industry & Agriculture | Wholesalers-commercial Equip & Parts | Electronic Parts & Equipment Wholesalers | 19020100, 19020202, 19161300 | | IA5 |
| Industry & Agriculture | Wholesalers-commercial Equip & Parts | Heating & Air-conditioning Equipment Wholesalers | 20051000 | | IA5 |
| Industry & Agriculture | Wholesalers-commercial Equip & Parts | Industrial Machinery Wholesalers | 19270100, 19154603 | | IA6 |
| Industry & Agriculture | Wholesalers-commercial Equip & Parts | Medical, Dental, & Hospital Supplies Wholesalers | 20170000, 20170400, 25210700 | | IA5 |
| Industry & Agriculture | Wholesalers-commercial Equip & Parts | Office Equipment Wholesalers | 20162100, 20240100 | | IA5 |
| Industry & Agriculture | Wholesalers-commercial Equip & Parts | Photographic Equipment Wholesalers | 20196903 | Imaging Equipment Wholesalers, Camera Eqiupment Wholesalers | IA5 |
| Industry & Agriculture | Wholesalers-commercial Equip & Parts | Plumbing & Supplies Wholesalers | 20051306 | | IA5 |
| Industry & Agriculture | Wholesalers-commercial Equip & Parts | Refrigeration Equipment Wholesalers | 19158400, 19158405, 19158404, 19158406 | | IA5 |
| Industry & Agriculture | Wholesalers-commercial Equip & Parts | Service Equipment & Supplies Wholesalers | 19150000, 19135703 | | IA6 |
| Industry & Agriculture | Wholesalers-commercial Equip & Parts | Transportation Equipment Wholesalers | 20301000 | | IA6 |
| Industry & Agriculture | Wholesalers-consumer Durable Goods | Auto Wholesalers | 21060400 | Truck Wholesalers, Vehicle Wholesalers, Automotive Wholesalers | IA3 |
| Industry & Agriculture | Wholesalers-consumer Durable Goods | Books Wholesalers | 20240104 | | IA3 |
| Industry & Agriculture | Wholesalers-consumer Durable Goods | Furniture Merchants Wholesalers | 20120000 | | IA3 |
| Industry & Agriculture | Wholesalers-consumer Durable Goods | Hardware Merchants Wholesalers | 20050000 | | IA3 |

Fig. 65

| Industry | Segment | Category | BDC Codes | Keywords | Vertical ID |
|---|---|---|---|---|---|
| Industry & Agriculture | Wholesalers-consumer Durable Goods | Home Furnishing Merchants & Wholesalers | 20195500 | | IA3 |
| Industry & Agriculture | Wholesalers-consumer Durable Goods | Jewelry, Watch, Precious Stone Wholesalers | 20193305 | | IA3 |
| Industry & Agriculture | Wholesalers-consumer Durable Goods | Motor Vehicle Parts Wholesalers | 20300300 | Auto Parts Wholesalers | IA3 |
| Industry & Agriculture | Wholesalers-consumer Durable Goods | Motor Vehicle Supplies Wholesalers | 20301502 | Auto Parts Supplies Wholesalers | IA3 |
| Industry & Agriculture | Wholesalers-consumer Durable Goods | Sporting Goods Wholesalers | 19010600, 19162800 | Sporting Equipments Wholesalers, Gymnasium Equipment Wholesalers, Gymnasium Supplies | IA3 |
| Industry & Agriculture | Wholesalers-consumer Durable Goods | Tire Wholesalers | 20300900 | | IA3 |
| Industry & Agriculture | Wholesalers-consumer Durable Goods | Toys & Hobby Wholesalers | 20290200 | | IA3 |
| Industry & Agriculture | Wholesalers-consumer Non Durables | Beer & Ale Wholesalers | 20030101 | | IA4 |
| Industry & Agriculture | Wholesalers-consumer Non Durables | Distilled Alcoholic Beverage Wholesalers | 25090908 | | IA4 |
| Industry & Agriculture | Wholesalers-consumer Non Durables | Drugs & Sundries Wholesalers | 20062100, 20062506 | | IA4 |
| Industry & Agriculture | Wholesalers-consumer Non Durables | Dry Goods Wholesalers | 20111300 | | IA4 |
| Industry & Agriculture | Wholesalers-consumer Non Durables | Florists' Supplies Wholesalers | 19271801 | | IA4 |
| Industry & Agriculture | Wholesalers-consumer Non Durables | Footwear Wholesalers | 20010500 | | IA4 |
| Industry & Agriculture | Wholesalers-consumer Non Durables | Mens & Boys Clothing Wholesalers | 20011700 | | IA4 |
| Industry & Agriculture | Wholesalers-consumer Non Durables | Paint & Supplies Wholesalers | 20062000 | | IA4 |
| Industry & Agriculture | Wholesalers-consumer Non Durables | Tobacco Products Wholesalers | 20280000 | Cigars Wholesalers, Cigarettes Wholesalers | IA4 |
| Industry & Agriculture | Wholesalers-consumer Non Durables | Womens, Children & Infants Clothing Wholesalers | 20011800 | Child Clothing Wholesalers, Kids Clothing Wholsalers, Kids Wear Wholsalers, Child Wear Wholesalers | IA4 |

Fig. 66

| Industry | Segment | Category | BDC Codes | Keywords | Vertical ID |
|---|---|---|---|---|---|
| Legal & Financial | Attorneys | Drugs & Alcohol Laws Attorneys | 11180222, 11180204 | DUIs, DWIs, DUI's, DWI's, Drug and Alcohol Attorneys, Drug Attorneys, Alcohol Attorneys, Drug & Alcohol Lawyers, Drug and Alcohol Lawyers, Drug Lawyers, Alcohol Lawyers | LF13 |
| Legal & Financial | Attorneys | Arbitrations Laws Attorneys | 11180100, 11180208 | Arbitrations Lawyers, Arbitrations Attorneys | LF12 |
| Legal & Financial | Attorneys | General Laws Attorneys | 11180000, 11180200, 23010000 | Lawyers, Attorneys | LF12 |
| Legal & Financial | Attorneys | Bankruptcy, Debt, & Credit Laws Attorneys | 11180210, 11180220 | Bankruptcy Attorneys, Debt Attorneys, Credit Attorneys, Bankruptcy Lawyers, Debt Lawyers, Credit Lawyers, Bankruptcies, Bankruptcys | LF14 |
| Legal & Financial | Attorneys | Civil Laws Attorneys | 11180211 | Civil Attorneys, Civil Lawyers | LF17 |
| Legal & Financial | Attorneys | Consumer Protection Laws Attorneys | 11180216 | Consumer Protection Attorneys, Consumer Protection Lawyers | LF16 |
| Legal & Financial | Attorneys | Copyrights, Patents, & Trademarks Laws Attorneys | 11180217 | Patents Law, Copyrights Law, Trademarks Law, Patents Lawyers, Copyrights Lawyers, Trademarks Lawyers, Patents Attorneys, Copyrights Attorneys, Trademarks Attorneys, Copy Rights, TMs, TM's | LF16 |
| Legal & Financial | Attorneys | Corporate & Business Laws Attorneys | 11180218 | Franchises Attorneys, Franchises Lawyers, Corporates Business Laws, Corporates Law, Corporations Law, Sole Proprieters, Sole Proprieterships, llcs, LLC's, Business Laws, Business Lawyers, Business Attorneys | LF16 |
| Legal & Financial | Attorneys | Criminal Laws Attorneys | 11180219 | Criminals Defense, Public Defenders, Criminals Lawyers, Criminals Attorneys | LF17 |
| Legal & Financial | Attorneys | Divorce & Family Laws Attorneys | 11180221 | Divorces Lawyers, Custody, Annulments, Prenuptials, Families Lawyers, Divorces Attorneys | LF15 |
| Legal & Financial | Attorneys | Estate & Property Laws Attorneys | 11180227 | Estates Laws, Estates Lawyers, Estates Attorneys, Estates Planning, Property Lawyers, Properties Lawyers, Propretys Attorneys, Estates Planning Laws | LF15 |
| Legal & Financial | Attorneys | Immigration & Naturalization Laws Attorneys | 11180232, 11103100 | Citizenships, Immigrations Lawyers, Immigrations Attorneys, Naturalizations Layers, Naturalizations Attorneys | LF18 |

Fig. 67

| Industry | Segment | Category | BDC Codes | Keywords | Vertical ID |
|---|---|---|---|---|---|
| Legal & Financial | Attorneys | Labor & Employment Relations Laws Attorneys | 11180236 | Workers Comp Laws, Workmens Comp Laws, Workmens Compensation Laws, Sexual Harassments, Workmans Compensation Laws, Workers Comp Lawyers, Workmens Comp Lawyers, Workmens Compensation Lawyers, Sexual Harassments Lawyers, Workmans Compensation Lawyers, Workers Comp Attorneys, Workmens Comp Attorneys, Workmens Compensation Attorneys, Sexual Harassments Attorneys, Workmans Compensation Attorneys, Labor Lawyers, Labor Attorneys, Employments Attorneys, Employments Lawyers, Harrassments | LF18 |
| Legal & Financial | Attorneys | Landlord & Tenant Laws Attorneys | 11180237 | Rentals Laws, Rents Laws, Tenants Lawyers, Tenants Attorneys, Landlords Lawyers, Landlords Attorneys, Rental Agreement Lawyers, Rental Agreements, Rental Agreements Attorneys | LF18 |
| Legal & Financial | Attorneys | Litigation & Trial Laws Attorneys | 11180242 | Trials Lawyers, Jurys Selections Lawyers, Trials Attorneys, Litigations Lawyers, Litigations Attorneys | LF13 |
| Legal & Financial | Attorneys | Malpractice Laws Attorneys | 11180243 | Malpractices, Malpractice Lawyers, Malpractice Attorneys | LF19 |
| Legal & Financial | Attorneys | Personal Injury Laws Attorneys | 11180252 | Slips and Falls, Personal Injuries, Slips & Falls, Injury Attorneys, Injury Lawyers, Injuries Lawyers, Injuries Attornies, Injuries Attorneys | LF19 |
| Legal & Financial | Attorneys | Tax Laws Attorneys | 11180259, 11182412 | Tax Attorney, Tax Lawyers, IRS Lawyers, IRS Attorneys, Taxes Lawyers, Taxes Attorneys | LF14 |
| Legal & Financial | Attorneys | Traffic Violations Laws Attorneys | 11180260, 11180267, 11180268 | Speeding Tickets Laws, Speeding Tickets Lawyers, Speeding Tickets Attorneys | LF13 |
| Legal & Financial | Attorneys | Trusts & Wills Laws Attorneys | 11180261 | Probate Laws, Probate Lawyers, Probate Attorneys, Living Wills, Power of Attorney Laws, Trusts Attorneys, Trusts Lawyers, Wills Lawyers, Wills Attorneys | LF15 |

Fig. 68

| Industry | Segment | Category | BDC Codes | Keywords | Vertical ID |
|---|---|---|---|---|---|
| Legal & Financial | Financial Institutions | Commercial Banks | 15020100 | Banks | LF9 |
| Legal & Financial | Financial Institutions | Credit Unions | 15020200, 15020203 | | LF9 |
| Legal & Financial | Financial Institutions | Savings & Loans Institutions | 15015400, 15015401, 15020409 | | LF9 |
| Legal & Financial | Financial Services | Accountants & Accounting Services | 15010000, 15015200, 15015205 | CPAs, Certified Public Accountants, CPA's, Accounting Firms, Financials Services | LF1 |
| Legal & Financial | Financial Services | Billing Services | 15011500 | | LF2 |
| Legal & Financial | Financial Services | Bookkeeping Services | 15011600, 15011601, 15011602, 15011603, 15011604 | BookKeepers, Book Keeping Services, Book Keepers Services, Bookeeping, Bookeepers | LF2 |
| Legal & Financial | Financial Services | Check Cashing & Lending Services | 15011900, 15030901 | | LF7 |
| Legal & Financial | Financial Services | Collection Agencies | 15012100, 15012103 | Debt Collectors, Debt Collections | LF8 |
| Legal & Financial | Financial Services | Consumer Credit Repair Services | 15012200, 15012201, 15012202, 15012203, 15030200, 15030201, 22140100 | Bankruptcy Services, Debt Repair | LF8 |
| Legal & Financial | Financial Services | Consumer Finance & Loan Services | 15031701, 15031702, 15031703 | | LF8 |
| Legal & Financial | Financial Services | Direct Life Insurance Carrier Services | 15042600 | | LF6 |
| Legal & Financial | Financial Services | Financial Advisors & Planners | 15060000, 15060105, 15060200, 15060203, 15060204, 15060205, 15060206, 15060400, 15030000 | Certified Financial Planner, CFPs, FAs, Financial Planning | LF4 |
| Legal & Financial | Financial Services | Financial Services - Mixed | 15010300, 15011200, 15012001, 15012300, 15012302, 15013901, 15014000, 15015600, 15015802, 15020000, 15020700, 15020705, 15020710, 15030503, 15030507, 15031201, 15043235, 15050000, 15050200, 15050700, 15060701, 15061700 | | LF21 |
| Legal & Financial | Financial Services | Payroll Services | 15015100, 15015104 | | LF8 |
| Legal & Financial | Financial Services | Retirement Fund Services | 15050500, 15050503, 15050504 | Pensions, IRAs, Annuities | LF6 |
| Legal & Financial | Financial Services | Stock & Bond Brokers | 15060800, 15061200, 15061201, 15061202 | Securities Brokerage, Securities Brokers, Investment Brokers | LF5 |
| Legal & Financial | Financial Services | Tax Preparation Services | 15013500, 15013506, 15014300, 15014302, 15014303 | Enrolled Agent | LF3 |
| Legal & Financial | Financial Services | Trust, Fiduciary, & Custody Financial Services | 15031300, 15031301, 15031303 | | LF6 |
| Legal & Financial | Insurance | Life Insurance & Actuaries | 15010100 | Risk Insurance | LF11 |

Fig. 69

| Industry | Segment | Category | BDC Codes | Keywords | Vertical ID |
|---|---|---|---|---|---|
| Legal & Financial | Insurance | Auto, Motorcycle, RV, & Boat Insurance | 15040200, 15040250, 15040251, 15010252 | Cars Insurances, Trucks Insurances, Autos Insurances, Motorcycles Insurances, RVs Insurances, Recreationals Vehicles Insurances, Boats Insurances | LF11 |
| Legal & Financial | Insurance | Business & Commercial Insurance | 15040500 | | LF11 |
| Legal & Financial | Insurance | Farm & Agriculture Insurance | 15040100, 15040101 | | LF11 |
| Legal & Financial | Insurance | Financial Insurance | 15040801 | | LF11 |
| Legal & Financial | Insurance | Fire, Marine & Casualty Insurance | 15041900, 15041904 | | LF11 |
| Legal & Financial | Insurance | Health Insurance | 15042100, 15042101, 15042102, 15042106, 15042107, 15042407 | Medical Insurance | LF10 |
| Legal & Financial | Insurance | Homeowners Insurance | 15042300, 15042301 | Mobile Home Insurance, Property Insurance, Renters Insurance | LF11 |
| Legal & Financial | Insurance | Insurance Companies & Brokers | 15040000, 15040102, 15050400 | | LF11 |
| Legal & Financial | Insurance | Insurance Consultants | 15051100, 15051101, 15051102, 15051105 | Insurances Consulting, Workmens Compensation Insurances, Workmans Compensation Insurances, Workmans Comp Insurances, Workmens Comp Insurances | LF11 |
| Legal & Financial | Insurance | Long-term Care Insurance | 15042406, 15042402 | | LF11 |
| Legal & Financial | Legal Services | Bail Bonding Services | 11180300 | Bail Bonds | LF20 |
| Legal & Financial | Legal Services | Court & Public Reporting Services | 11136007, 11136000, 11136001, 11136002 | Stenotype, Stenographer, Stenography | LF20 |
| Legal & Financial | Legal Services | Business & Private Investigation Services | 11241500, 11241501, 11241502, 11241503, 11241504, 11241505 | Private Investigators, PIs, Private Eyes, Fraud Investigators, Lie Detection, Sabotage Prevention | LF20 |
| Legal & Financial | Legal Services | Notaries & Legal Forms Services | 11182402, 11180900 | Notary, Legal Forms Preparation Services | LF20 |
| Legal & Financial | Legal Services | Process Servers, Patent Agents, Paralegals | 23010200, 11181600 | | LF20 |
| Media & Communications | Communication Services | Call Centers | 11033000, 11033001 | | MC3 |
| Media & Communications | Communication Services | Phone Companies, Mobile & Cell Phone Services | 11030300, 11030301, 11030304, 11032200, 11032300 | Cell Phone Carriers, Phone Resellers, Landlines, Wireless Phone Services, Long Distance Calling, Cell Phone Companies, Cell Phone Services, Cellular Phone Services | MC2 |

Fig. 70

| Industry | Segment | Category | BDC Codes | Keywords | Vertical ID |
|---|---|---|---|---|---|
| Media & Communications | Communication Services | Telephone Answering & Messaging Services | 11030900, 11030901, 11030902, 11030904, 11030912 | | MC3 |
| Media & Communications | Communication Services | Video Conference Hosting Services | 11030800 | | MC3 |
| Media & Communications | Communication Services | Web Hosting & Wireless Data Services | 11034300, 11160606 | | MC3 |
| Media & Communications | Media Providers | Book Publishers | 11200500 | Publishing, Publishing Company, Publishing Companies, Publishing Companys, Books Publishers | MC1 |
| Media & Communications | Media Providers | Cable Television Companies & Service | 11032800, 11034100 | Satellite | MC1 |
| Media & Communications | Media Providers | Directory & Mailing List Publishers | 11011900 | | MC1 |
| Media & Communications | Media Providers | Internet Providers | 11160600 | Dial Up Internet, DSL, Satellite Internet | MC1 |
| Media & Communications | Media Providers | Magazine Publishers | 11205000, 11012600 | | MC1 |
| Media & Communications | Media Providers | News Services | 11012300, 11012301 | | MC1 |
| Media & Communications | Media Providers | Newspaper Publishers | 11202400 | | MC1 |
| Media & Communications | Media Providers | Radio Stations | 11033800 | | MC1 |
| Media & Communications | Media Providers | Specialty Publishers | 11200100, 11201800, 11202103, 11201402, 11203800 | Art Publisher, Invitations, Maps, Yearbooks, Multi-Media, GPS Maps, Announcments, Telephone Directory, Telephone Book | MC1 |
| Media & Communications | Media Providers | Television Broadcasting Companies | 11033900 | | MC1 |
| Media & Communications | Media Retail | Newspaper & Magazine Stands | 25180340 | | MC1 |
| Personal Care & Services | Beauty Treatments | Barber Shops | 22080100, 23022601 | | PS2 |
| Personal Care & Services | Beauty Treatments | Beauty Salons | 22080200, 22080201, 22080207 | Hair Stylists | PS1 |
| Personal Care & Services | Beauty Treatments | Cosmetic Salons | 22080206, 22080400, 22080401, 22080405 | Make-Up Artist, Make Up Artist | PS1 |
| Personal Care & Services | Beauty Treatments | Day Spas | 22080500 | | PS3 |
| Personal Care & Services | Beauty Treatments | Hair Removal | 22080209, 22080503 | Electrolysis, Waxing, Laser Hair Removal | PS3 |
| Personal Care & Services | Beauty Treatments | Hair Replacement & Extensions | 22080213 | Hair Regrowth, Balding Specialists | PS3 |
| Personal Care & Services | Beauty Treatments | Image Consultants | 22080303 | Fashion Diva, Fashionista, Style Advisor, Images Consulting, Image Consulting | PS3 |
| Personal Care & Services | Beauty Treatments | Manicurists & Pedicurists | 22080202 | Nail Salons, Manicure, Pedicure | PS4 |

Fig. 71

| Industry | Segment | Category | BDC Codes | Keywords | Vertical ID |
|---|---|---|---|---|---|
| Personal Care & Services | Beauty Treatments | Masseuse, Massage, & Bath Treatments, Equipment & Supplies | 22080803, 22080804, 22080807 | Massage Parlor, Masseur | PS3 |
| Personal Care & Services | Beauty Treatments | Ear & Body Piercing | 22080600 | Ear Piercings, Belly Button Piercings, Nipple Rings, Tongue Piercings, Lip Rings | PS3 |
| Personal Care & Services | Beauty Treatments | Cosmetology Salons & Skin Care | 22081005, 22080205, 11106602 | Facials, Estheticians, Beauty Consultants, Beauty Consulting | PS1 |
| Personal Care & Services | Beauty Treatments | Tanning Salons | 22081100 | Tanning Booth, Ultraviolet, Fake Tan | PS3 |
| Personal Care & Services | Beauty Treatments | Tattoo Artists & Parlors | 22080700, 22080702 | Tattoo Cover-ups, Tattoo Parlor, Tattoo Removal | PS3 |
| Personal Care & Services | Day Care Services | Child Care, Day Care, & Sitters | 22090100, 14010511, 22090107, 22090105 | Afterschools, Nanny, Age Cares, Babysitters, Au pairs, Child Caregivers, Daycares, Daycare's, Day Cares, Day Care's, Childrens Care, Children's Care, Nannies, Nannys, Baby Sitters, Babys Sitting, After Schools, Daycares Schools, Day Cares Schools | PS9 |
| Personal Care & Services | Day Care Services | Preschools | 14090000, 14090200, 14090300, 14090301 | Public Preschools, Private Preschools, Pre Ks, PreKs, Pre-Ks | PS9 |
| Personal Care & Services | Fitness | Fitness & Diet Consultants | 22040207 | Fitness Consultants, Fitness Consulting, Diet Consultants, Diet Consulting | PS5 |
| Personal Care & Services | Fitness | Personal Fitness Trainers | 22040204 | Personal Trainers | PS5 |
| Personal Care & Services | Personal Services | Astrologist & Psychic Readings | 11102007 | Palm Readings, Psychics, Tarot, Fortune Telling, Astrology, Horoscope, Witch Doctor | PS5 |
| Personal Care & Services | Personal Services | Laundromats | 22050503, 22051100 | Self-Service Laundry, Coin Operated Laundry | PS6 |
| Personal Care & Services | Personal Services | Escort, Dating, & Matchmaking Services | 22030500, 22031100 | On-line Dating, Speed Dating, Match Makers, Personal Escorts | PS5 |
| Personal Care & Services | Personal Services | Dry Cleaning Service | 22050500, 22050514, 11137501, 22050000 | Leather Cleaning, Laundry Services | PS6 |
| Personal Care & Services | Personal Services | Embroidery Service | 22050600 | | PS6 |
| Personal Care & Services | Personal Services | Funeral Services, Cemeteries, & Crematories | 11133300, 11133307, 11133301, 11133302, 11133303, 11133304, 11133308, 11133309, 11133312 | Funeral Homes, Funeral Parlors, Mortuaries, Morgues, Mortuary, Gravestones, Cemetery Markers, Cemetery Monuments, Headstones, Head Stones, Funeral Planning, Funeral Planners | PS7 |
| Personal Care & Services | Personal Services | Fur Cleaning, Dyeing, & Storage | 22050800, 22050802 | | PS6 |

Fig. 72

| Industry | Segment | Category | BDC Codes | Keywords | Vertical ID |
|---|---|---|---|---|---|
| Personal Care & Services | Personal Services | Genealogical Investigating Services | 22120200 | Family Tree, Genealogy | PS5 |
| Personal Care & Services | Personal Services | Party Furniture, Equipment & Supplies Rental | 25161304, 25160604 | Bounce Houses, Jumpies, Jumpy, Astro Jumps | PS5 |
| Personal Care & Services | Personal Services | Personal Services - Mixed | 22000000, 22041005, 22080507, 22100400, 22130000, 22140300 |  | PS10 |
| Personal Care & Services | Personal Services | Photofinishing Labs | 23030800, 23030802, 23030806, 23030807 | Retouching, Restoration | PS8 |
| Personal Care & Services | Personal Services | Photographers | 23030500, 23030530, 23030518, 23030523, 23030525, 23030700, 23030502 | Portraits, Wedding Photography, Wedding Photographers, Passport Photos, Videographers, Videography, Film Artists, Special Events Photographer, Sports Photographer, Sports Photography | PS8 |
| Personal Care & Services | Personal Services | Shoe Repair Shops | 22051700, 22051800 |  | PS6 |
| Personal Care & Services | Personal Services | Tailors & Alteration Shops | 2205000, 22050100, 22050102, 22050106, 22051500 | Dressmaker, Seamstress, sewing | PS6 |
| Personal Care & Services | Personal Services | Watch & Jewelry Repair Shops | 25170300, 25170306, 25170704 | Clocks | PS6 |
| Personal Care & Services | Personal Services | Wedding & Party Planning | 25182700, 25182702, 22070000, 22070200 | Officiants, Bartending Services, Wedding Coordinators, Party Planner, Justice of the peace | PS5 |
| Pets | Pet Health | Animal Hospitals | 18050519 |  | PT2 |
| Pets | Pet Health | Veterinarians | 18030800, 18030801 | Vets, Veterinary, Pet Doctor, Pet Dr | PT2 |
| Pets | Pet Retail | Fish Stores & Aquarium Supplies | 25150100 |  | PT1 |
| Pets | Pet Retail | Pet Stores & Supplies | 25150500, 25150513 | Puppy Stores, Kitten Stores | PT1 |
| Pets | Pet Service | Horse Breeding & Boarding | 10030416, 10030411, 10030413, 10030403 | Stables, Horse Transport, Shoer | PT1 |
| Pets | Pet Service | Pet Boarding Kennels | 22130800 | Cage Free, Pet Hotel | PT1 |
| Pets | Pet Service | Pet Grooming & Care Services | 22130802, 22130803, 10030415 | Pet Washing, Pet Exercising, Pet Sitting | PT1 |
| Pets | Pet Training | Pet Obedience Training | 25150803, 10030420 | Dog Trainer, Cat Trainer, Puppy Trainer, Obedience School | PT1 |
| Real Estate | Real Estate Agents & Brokers | Real Estate Agents & Brokers - Commercial | 24010000, 24010202 | Commercial Realtors, Commercial Real Estate Agents, Commercial Real Estate Agents | RE2 |
| Real Estate | Real Estate Agents & Brokers | Real Estate Agents & Brokers - Residentials | 24000000, 24024303 | Residential Realtors, Realestate Agents, Residential Real Estate Agents, Residential Real Estate Brokers | RE1 |
| Real Estate | Real Estate Education | Real Estate Schools | 14010219 | Real Estate Classes, Real Estate Certifications | RE4 |
| Real Estate | Real Estate Finance | Mortgage & Loan Brokers | 24020400, 15031800, 15031801, 15031811 |  | RE3 |

Fig. 73

| Industry | Segment | Category | BDC Codes | Keywords | Vertical ID |
|---|---|---|---|---|---|
| Real Estate | Real Estate Rentals | Apartment Rentals | 24030300, 24030301, 24030302, 24030304 | Apartments, Furnished, Unfurnished | RE4 |
| Real Estate | Real Estate Services | Apartment Finding Services | 24021000 | | RE4 |
| Real Estate | Real Estate Services | Escrow Services | 24023400 | | RE4 |
| Real Estate | Real Estate Services | Home & Building Inspectors | 24020300 | | RE4 |
| Real Estate | Real Estate Services | Home Appraisers & Consultants | 24022301, 24022302, 24022303, 24022304 | Home Appraisals, Appraisals Consulting | RE4 |
| Real Estate | Real Estate Services | Land Surveyors | 11122600 | Land Surveying, Lot Surveys, Building Surveys, Land Surveys | RE4 |
| Real Estate | Real Estate Services | Professional Relocation Services | 24022500 | | RE4 |
| Real Estate | Real Estate Services | Property Maintenance Services | 24021100 | | RE4 |
| Real Estate | Real Estate Services | Real Estate Leasing & Services - Mixed | 24010203, 24010600, 24021602, 24021603, 24021606, 24021701, 24021900, 24021902, 24022100, 24022200, 24024400, 24024700, 24024703 | | RE4 |
| Real Estate | Real Estate Services | Real Estate Staging Services | 11290700 | | RE4 |
| Real Estate | Real Estate Services | Property Management Services | 24020600 | Property Managers, Residential Property Managers, Commercail Property Managers | RE4 |
| Real Estate | Real Estate Services | Title Companies & Services | 24020900, 24020901 | Title Services | RE4 |
| Shopping | Clothing Rental | Tux Shops & Formal Wear Stores | 25185200 | Tuxedos Renrals, Wedding Dress Rentals, Bridal Party Rentals, Mother of the Bride Dress Rentals, Flowergirl Dress Rentals, Ring Bearer Rentals, Bridesmaid Dress Rentals | SH12 |
| Shopping | Clothing Accessories | Boots Stores | 25182472, 25182462, 25182484 | Cowboy Apparel Stores, Western Stores | SH12 |
| Shopping | Clothing Accessories | Boutiques & Accessories Stores | 25021100 | | SH11 |
| Shopping | Clothing Accessories | Costume Jewlery Stores | 25181627 | | SH11 |
| Shopping | Clothing Accessories | Fabric Stores | 25181000, 25020700, 25010718, 25020734, 25020718 | Sewing, Yarn, Needlework, Quilt, Spindles | SH12 |
| Shopping | Clothing Accessories | Womens Accessories Stores | 25181357 | Purses, Wallets, Handbags, Briefcases, Women's Accessories | SH11 |
| Shopping | Clothing Accessories | Hat & Cap Shops | 25184201 | | SH11 |
| Shopping | Clothing Accessories | Jewelry & Watch Stores | 25181600, 25181603, 25181645, 25181622, 25181628, 25181648, 25181650, 25181655 | Diamonds, Gold, Silver, Gems, Engagement Rings, Rings, Rubies, Emeralds, Charms, Jewlers | SH10 |

Fig. 74

| Industry | Segment | Category | BDC Codes | Keywords | Vertical ID |
|---|---|---|---|---|---|
| Shopping | Clothing Accessories | Luggage & Leather Goods Stores | 25110600, 25110602, 25110606, 25172000 | Travel Goods | SH11 |
| Shopping | Clothing Accessories | Shoe Stores | 25182463, 25188600, 25188601 | Sneakers | SH12 |
| Shopping | Clothing Accessories | Eyeglasses & Sunglasses Stores | 25182100, 25182107, 18031400 | Eyeglasses, Contact Lenses | SH11 |
| Shopping | Clothing Accessories | Wig & Hairpiece Stores | 25186500 | Toupees | SH11 |
| Shopping | Clothing Stores | Bridal Gown Shops | 25180900 | Tuxedos, Wedding Dresses, Bridal Party Dresses, Mother of the Bride Dresses, Flowergirl Dresses, Ring Bearer Suits, Bridesmaids Dresses | SH9 |
| Shopping | Clothing Stores | Children, Infants, & Toddlers Stores | 25180600, 25180607, 25030313, 25110501 | Baby Stores, Kids Stores, Kids Apparel | SH9 |
| Shopping | Clothing Stores | Clothing Stores | 25180800, 25180807, 25180818 | Clothing Apparel, Deparment Stores | SH8 |
| Shopping | Clothing Stores | Costume Shops | 22050300 | Halloween Stores, Costume Stores, Theater Stores, Props Stores | SH9 |
| Shopping | Clothing Stores | Custom Made Clothing | 25180806, 25180808 | Dress Makers, Dressmakers., Fashion Houses | SH8 |
| Shopping | Clothing Stores | Western Wear Stores | 25185905 | | SH9 |
| Shopping | Clothing Stores | Furs & Leathers Stores | 25184400, 25184402, 25184404, 25184206 | Coats, Parkas, Leather Wallets, Leather Jackets, Furs Stores | SH9 |
| Shopping | Clothing Stores | Lingerie Stores | 25181700 | Nightime Wear | SH9 |
| Shopping | Clothing Stores | Maternity Stores | 25181800 | Maternity Wear | SH8 |
| Shopping | Clothing Stores | Men's Clothing Stores | 25181900, 25181902 | Men's Apparel, Mens Apparel, Mens Clothing | SH9 |
| Shopping | Clothing Stores | Sportswear & Swimwear Stores | 25184100, 25182657, 25182645 | Bikinis, Dancewear, Bathing Suits, Jogging Suits, Sports Apparel | SH9 |
| Shopping | Clothing Stores | T-shirt Stores | 25180817 | Tshirts | SH9 |
| Shopping | Clothing Stores | Uniforms Stores | 25186700 | Military Uniforms, Medical Uniforms | SH9 |
| Shopping | Clothing Stores | Womens Clothing | 25181300, 25181355, 25181362 | Womens Wear, Women's Clothing | SH8 |
| Shopping | Department Stores | Department Stores | 25110100 | | SH1 |
| Shopping | Discount Stores & Warehouses | Discount Department Stores | 25110200, 25110300 | Factory Outlets, Supercenters | SH1 |
| Shopping | Electronic Shopping | Mail Order & Catalog Shopping | 25520000, 25520100, 25520400, 25520500, 25520600 | Mail-Order Houses | SH1 |
| Shopping | General Merchandise Stores | General Merchandise Stores | 25110000 | | SH1 |
| Shopping | General Merchandise Stores | Trading Posts | 25186200 | | SH1 |
| Shopping | Specialty Stores | Art Supply Stores | 25020100, 25020105, 25020308 | Ceramic Supplies, Art Stores | SH6 |

Fig. 75

| Industry | Segment | Category | BDC Codes | Keywords | Vertical ID |
|---|---|---|---|---|---|
| Shopping | Specialty Stores | Book Stores | 25180300, 25180313, 25182060, 25183952 | Magazines, Newspapers, Calendars | SH2 |
| Shopping | Specialty Stores | Camera & Camcorder Stores | 25180500, 25180502, 23030100, 25101701 | Camcorder Stores | SH4 |
| Shopping | Specialty Stores | Candle Shops | 25183400, 25183401, 25183402, 25183404 | Aromatherapy Stores, Incense | SH6 |
| Shopping | Specialty Stores | Seasonal & Holiday Stores | 25184600, 25184601, 25184602, 25184603 | Christmas Decorations, Halloween Costumes, XMAS Decorations | SH6 |
| Shopping | Specialty Stores | Coin & Stamp Stores | 25101000, 25101001 | | SH6 |
| Shopping | Specialty Stores | Cosmetics, Beauty Supplies, & Perfume Stores | 25183700, 25183701, 25183703, 25183711, 25183713, 25111000, 25111020, 25111022, 25111026 | Cosmetic Stores, Beauty Supplies, Perfume Stores, Make-Up Stores, Make Up Stores | SH2 |
| Shopping | Specialty Stores | Craft Stores | 25020300, 25020305, 25020000, 25183002 | Beads, Buttons, Badges, Seasonal Décor, Seasonal Decorations | SH5 |
| Shopping | Specialty Stores | Florists | 25070200, 25070204, 25070206, 25070400 | Flower Shops | SH3 |
| Shopping | Specialty Stores | Gift Basket Stores | 25030302 | | SH5 |
| Shopping | Specialty Stores | Gift Shops | 25030000, 25030200, 25030314, 25030315, 25187800, 25030307, 25030306 | Novelties, Souvenirs, Collectables | SH5 |
| Shopping | Specialty Stores | Greeting Card Shops | 25030100 | Card Stores | SH5 |
| Shopping | Specialty Stores | Musical Instrument & Supplies Stores | 25130000, 25130200, 25130301, 25130409, 25130414, 25130302, 25130400, 25130413, 25130418, 25130500 | Piano Stores, Guitar Stores, Music Stores | SH4 |
| Shopping | Specialty Stores | Office Supplies Store | 25182000, 25030405, 25182062 | Office Supplies, Stationery Stores, Office Equipment Sales | SH4 |
| Shopping | Specialty Stores | Party & Balloon Stores | 25187500, 25030215, 25030216, 25030217, 25030218 | Helium Stores | SH5 |
| Shopping | Specialty Stores | Religious Stores | 25184500, 25184501, 25184502 | Religious Shops | SH6 |
| Shopping | Specialty Stores | Riding Apparel & Equipment | 25060918, 25187601 | Equestrian Apparel, Horse Riding Apparel, Jockey Apparel | SH6 |
| Shopping | Specialty Stores | Rocks & Gems Stores | 25188100 | Rocks and Gems, Rock Shops | SH5 |
| Shopping | Specialty Stores | Specialty Stores - Mixed | 25000000, 25101900, 25130705, 25020319, 25020730, 25181004, 25180209, 25160308, 25185100, 25185902, 25183100, 25181516, 25180700, 25180702, 25180705, 25180712, 25182001, 25182008, 25182017, 25182027, 25182029, 25182047, 25182059, 25182066, 25182067, 25182069, 25182070, 25182071, 25182072, 25182079, 25182080, 25182081, 25182082, 25110900, 25110903, 25110907, 25160102, 25110715 | | SH13 |
| Shopping | Specialty Stores | Sports Memorabilia Shops | 25101400, 25101402 | Baseball Cards | SH6 |

Fig. 76

| Industry | Segment | Category | BDC Codes | Keywords | Vertical ID |
|---|---|---|---|---|---|
| Shopping | Specialty Stores | Toy, Hobby & Game Stores | 25182800, 25100000, 25100100, 25182814, 25182815, 25182816 | Magic Stores, Kites, Puppets, Remote Contol Cars, Remote Control Planes, Model Cars, Model Trains, Toy Helicopter | SH4 |
| Shopping | Specialty Stores | Trophy Stores | 25187300, 25187304 | Awards Stores, Medals Stores, Award Shops, Medals Shops | SH6 |
| Shopping | Used Merchandise Stores | Antiques Shops | 25180100, 25180140 | Antiques Stores, Antique Furniture | SH7 |
| Shopping | Used Merchandise Stores | Consignment & Resale Stores | 25184700 | Resale Shops, Consignment Shops | SH7 |
| Shopping | Used Merchandise Stores | Flea Markets & Swap Meets | 25120200 | | SH7 |
| Shopping | Used Merchandise Stores | Pawn Shops | 25187104 | Pawn Brokers | SH7 |
| Shopping | Used Merchandise Stores | Thrift Stores | 25187100 | Salvation Army, Goodwill | SH7 |
| Shopping | Used Merchandise Stores | Comics & Used Book Stores | 25183912, 25183964 | | SH7 |
| Shopping | Used Merchandise Stores | Used Clothing & Vintage Stores | 25184701 | | SH7 |
| Shopping | Used Merchandise Stores | Used Record Stores | 25130700 | CDs, Tapes | SH7 |
| Sports & Recreation | Sport & Recreation Facilities | Bowling Centers | 12022000, 12022001, 12022002, 12022003 | Bowling Alleys | SR2 |
| Sports & Recreation | Sport & Recreation Facilities | Laser Tag, Paintball, & Other Gaming | 12020800 | | SR2 |
| Sports & Recreation | Sport & Recreation Facilities | Fitness Programs & Training Studios | 22040200, 22040201 | Pilates, Yoga, Zumba, Kick Boxing, Boxing | SR1 |
| Sports & Recreation | Sport & Recreation Facilities | Golf Courses | 22041008, 25061400, 25061401 | Country Clubs, Public Golf Courses, Private Golf Courses | SR2 |
| Sports & Recreation | Sport & Recreation Facilities | Golf Driving Ranges | 25061610 | Driving Ranges | SR2 |
| Sports & Recreation | Sport & Recreation Facilities | Gymnastics Clubs | 22041020 | | SR1 |
| Sports & Recreation | Sport & Recreation Facilities | Health & Fitness Clubs | 22040000, 22040100, 22040105 | Gyms, Fitness Clubs, Boxing Gyms | SR1 |
| Sports & Recreation | Sport & Recreation Facilities | Hockey Clubs | 22041001 | | SR1 |
| Sports & Recreation | Sport & Recreation Facilities | Ice & Roller Skating Rinks | 12020212 | Ice Skating | SR2 |

Fig. 77

| Industry | Segment | Category | BDC Codes | Keywords | Vertical ID |
|---|---|---|---|---|---|
| Sports & Recreation | Sport & Recreation Facilities | Marinas | 26090700 | Docks, Boat Launching | SR2 |
| Sports & Recreation | Sport & Recreation Facilities | Nutrition & Weight Training Centers | 22040208, 22040401 | | SR1 |
| Sports & Recreation | Sport & Recreation Facilities | Pool Halls & Billiard Parlors | 12020806 | Billiards | SR2 |
| Sports & Recreation | Sport & Recreation Facilities | Racetracks | 27031301, 27031304, 22030900, 22030906, 22030911 | Horse Racing, Dog Tracks, Dog Racing, Drag Strips, Speedways, Motor Raceways | SR2 |
| Sports & Recreation | Sport & Recreation Facilities | Recreation Clubs | 22041000, 22041011, 22041012, 22041013, 22041014, 22041016, 22041021, 25060715 | Tennis, Racquetball, Volleyball, Soccer, Softball, Bicycle, Hiking | SR1 |
| Sports & Recreation | Sport & Recreation Facilities | Riding Stables | 11135706, 11135701 | Horse Riding, Pony Rides, Equestrian, Trail Rides | SR2 |
| Sports & Recreation | Sport & Recreation Facilities | Shooting Ranges | 12021800, 12011801, 12021802, 12021807, 12021809 | Gun Clubs | SR2 |
| Sports & Recreation | Sport & Recreation Facilities | Skiing & Snowboarding Facilities | 27031800 | Ski Lifts, Ski Slopes, Snowboarding Lifts, Snowboarding Slopes | SR2 |
| Sports & Recreation | Sport And Recreation Instruction | Golf Instruction Schools | 25061608 | Golf Schools | SR3 |
| Sports & Recreation | Sport And Recreation Instruction | Horse Riding Schools | 11135705 | Equestrian Schools | SR3 |
| Sports & Recreation | Sport And Recreation Instruction | Martial Arts Schools | 14010629 | Judo, Kun Fu, Karate, Kempo, Jiu Jitsu, UFC, Mixed Martial Arts, Thai Chi | SR3 |
| Sports & Recreation | Sport And Recreation Instruction | Scuba Diving Schools | 14010616 | Scuba Instruction, Scuba Instructors, Deep Sea Diving | SR3 |
| Sports & Recreation | Sport And Recreation Instruction | Sport Camps | 12020223 | Football Camps, Soccer Camps, Baseball Camps, Softball Camps, Cheerleading Camps, Basketball Camps | SR3 |
| Sports & Recreation | Sport And Recreation Instruction | Swimming & Sailing Instruction | 25060714, 25060718, 25060712, 14010607 | Water Skiing, Boating, Public Swimming Pools | SR3 |
| Sports & Recreation | Sport Teams | Sports Teams -- Pro & Semi-Pro | 22041017 | Sports Teams, Sports Clubs | SR1 |
| Sports & Recreation | Sporting Goods Rental | Bike Rentals | 25160501 | Bicycle Rentals, Scooter Rentals | SR3 |
| Sports & Recreation | Sporting Goods Rental | Camping Equipment & Sporting Goods Rentals | 25160601, 2560604, 12020219 | Backpacking Rentals | SR3 |
| Sports & Recreation | Sporting Goods Stores | Bicycle Shops | 25180200, 25182641, 25171001 | Bike Store, Bicycle Repairs, Bike Parts, Bike Repairs, Bicycle Parts, Mountain Bikes | SR4 |
| Sports & Recreation | Sporting Goods Stores | Camping Equipment Stores | 25182642, 25182643 | Canoes, Kayaks | SR4 |

Fig. 78

| Industry | Segment | Category | BDC Codes | Keywords | Vertical ID |
|---|---|---|---|---|---|
| Sports & Recreation | Sporting Goods Stores | Diving & Scuba Equipment Stores | 25182646 | Scuba Diving, Snuba | SR4 |
| Sports & Recreation | Sporting Goods Stores | Fitness & Exercise Equipment Stores | 25182613, 25182630 | Treadmills, Stairsteppers, Stair Climbing, Ellipticals, Rowing Machines, Weight Lifting, Dumbells, Nordic Track, Weight Lifting Machines | SR4 |
| Sports & Recreation | Sporting Goods Stores | Fishing Supply Stores | 25185004 | Bait and Tackle, Bait & Tackle, Lures, Earthworms | SR4 |
| Sports & Recreation | Sporting Goods Stores | Golf Pro Shops | 25182615 | Pro Shops, Golf Shops | SR4 |
| Sports & Recreation | Sporting Goods Stores | Gun Shops | 25182649, 25171902 | Gun Repairs, Gun Racks, Ammo Stores, Ammunition Stores, Gun Safes | SR4 |
| Sports & Recreation | Sporting Goods Stores | Martial Arts Supply | 25182617 | Nunchucks, Ghees, Martial Arts Uniforms, Samurai | SR4 |
| Sports & Recreation | Sporting Goods Stores | Surfing & Skateboarding Shops | 25182622, 25182623, 25182627 | Surf Shops, Surf Stores, Skateboard Stores | SR4 |
| Sports & Recreation | Sporting Goods Stores | Skiing & Snowboarding Shops | 25182658, 25182624 | Sleds, Ski Stores, Snowboarding Stores | SR4 |
| Sports & Recreation | Sporting Goods Stores | Soccer Stores | 25182625 | Soccer Equipment, Soccer Apparel, Soccer Uniforms | SR4 |
| Sports & Recreation | Sporting Goods Stores | Sporting Equipment Repair Shops | 25171000, 25171704 | Racquet Restringing, Sports Repair | SR4 |
| Sports & Recreation | Sporting Goods Stores | New & Used Sporting Goods Stores | 25182600, 25182635 | | SR4 |
| Sports & Recreation | Sporting Goods Stores | Tennis & Badminton Shops | 25182628, 25182640 | Tennis Stores | SR4 |
| Travel & Transportation | Lodging | Bed & Breakfasts | 27010100 | Bed and Breakfasts, B&Bs, B & Bs, B and Bs | TT3 |
| Travel & Transportation | Lodging | Casino Hotels | 27010300 | Indian Casino Hotels | TT3 |
| Travel & Transportation | Lodging | Hostels, Cottages, Cabins | 27010707, 27010703 | Lodges | TT3 |
| Travel & Transportation | Lodging | Hotels & Motels | 27010400, 27010500, 27010503, 27010000 | Inns | TT3 |
| Travel & Transportation | Lodging | Rooming & Boarding Houses | 27010706 | | TT3 |
| Travel & Transportation | Lodging | RV Parks & Campgrounds | 27010200, 27010203 | Camping Sites, RV Sites, KOAs | TT3 |
| Travel & Transportation | Lodging | Vacation & Adventure Camps | 27010908, 27010905 | Recreational Camps, Hunting Camps, Adventure Camps, Wilderness Camps, Leisure Camps | TT3 |
| Travel & Transportation | Tourist Services | Aerial Tours & Extreme Sports | 27031100, 27031102, 27020211 | Hot Air Balloons, Helicopters Tours, Trams, Helicopter Rides, Airplane Rides, Hang Gliders, Hang Gliding, Parasailing, Parachuting, Sky Diving | TT4 |

Fig. 79

| Industry | Segment | Category | BDC Codes | Keywords | Vertical ID |
|---|---|---|---|---|---|
| Travel & Transportation | Tourist Services | Tours & Guide Services | 27020201, 27020205, 27020212, 27020220, 27020221, 27020228, 27020230, 27020233, 27020222, 27020231 | Sightseeing, Harbor Cruises, Fishing Guides, Hunting Guides, Bike Tours, Adventures, Floats, Snowmobile Tours, Hiking Guides, Dinner Cruises | TT4 |
| Travel & Transportation | Transportation | Commercial Airlines | 26030100 | Airports, Air Travel | TT1 |
| Travel & Transportation | Transportation | Airport Shuttles | 26080104 |  | TT1 |
| Travel & Transportation | Transportation | Bus Lines | 26040100 | Bus Depots | TT1 |
| Travel & Transportation | Transportation | Charter Airlines | 26060300 |  | TT1 |
| Travel & Transportation | Transportation | Charter Boats | 26050500 |  | TT1 |
| Travel & Transportation | Transportation | Charter Bus | 26040800 |  | TT1 |
| Travel & Transportation | Transportation | Cruise Lines & Ferries | 26050102 | Deep Sea Passenger Transportations, Ferry, Water Transportations, Ocean Transportations, Cruises, Boat Cruises | TT1 |
| Travel & Transportation | Transportation | Helicopter Charters & Transport Services | 26010300, 26010900 | Helicopter Transports | TT1 |
| Travel & Transportation | Transportation | Limousine Services | 26040200 | chauffeurs | TT1 |
| Travel & Transportation | Transportation | Car Rentals | 26060100 | Passenger Rentals, Vehicle Rentals, Automobile Rentals | TT2 |
| Travel & Transportation | Transportation | Railroads | 26040300, 26020700 | Trains | TT1 |
| Travel & Transportation | Transportation | RV Rental & Leasing | 26060601, 26060602 | Motor Home Rentals, Tent Trailer Rentals | TT2 |
| Travel & Transportation | Transportation | Taxis & Cabs Services | 21032300 | Metro, Taxi's, Taxicabs, Taxi Cabs,Taxis Services | TT1 |
| Travel & Transportation | Transportation | Transportation - Mixed | 26000000, 26010000, 26020000, 26020500, 26020601, 26020800, 26021200, 26021201, 26023900, 26024100, 26024900, 26025301, 26025400, 26025402, 26025600, 26040900, 26060500, 26070600, 26080100, 26080105, 26080114, 26080200, 26081105, 26100100 |  | TT5 |
| Travel & Transportation | Transportation | Truck Rental | 21080301, 21080302, 21080600 | U-Haul, Penske, Ryder, Moving, Moving Rentals, Tractor Rentals, Tractor Leasing, Rental Equipment Centers | TT2 |
| Travel & Transportation | Travel Services | Convention Centers & Visitors Information Bureaus | 11131804 | Information Booths | TT4 |
| Travel & Transportation | Travel Services | Tour Operators | 27020200 | Tour Companies | TT4 |
| Travel & Transportation | Travel Services | Travel Agencies | 26030113, 27040300 | Vacation Planners | TT4 |

Fig. 80

| Standard Plan | Gold Plan | Platinum Plan |
|---|---|---|
| $XX.XX | $XX.XX / Month Additions: | $XX.XX / Month Additions: |
| Basic Profile –webpage w/ logo<br><br>Business Analytics - Basic<br>Access & Respond to Reviews<br>Complaint Resolution Team | Enhanced Profile –webpage w/ photos<br><br>Competitive Analysis Report<br>WZG Now Option<br>WZG Deal Option (Coupon)<br>Mobile App Access<br>   -New Review Alerts<br>   -New Lead Alerts | Enhanced Profile –webpage w/video<br>Free Advanced Market Research Data<br>Competitive Analysis Report<br>WZG Now Option<br>WZG Deal Option (Coupon)<br>Mobile App Access<br>   -New Review Alerts<br>   -New Lead Alerts<br>Free Webinars |
| Access to:<br>-WZG Integrity Certification<br>-Webinars / Seminars<br>-Business Coaching | Access to:<br>-WZG Integrity Certification<br>-Premium webinars / seminars<br>-Business Coaching | Access to:<br>-WZG Integrity Certification<br>-Premium webinars / seminars<br>-Business Coaching |
| Access to:<br><br>-Business & Employee assessments<br><br>Pre-hire mini ($XX) & full assessments ($XX) for following positions:<br>• Sales (farmer & hunter)<br>• Customer service<br>• Management<br>• Professional<br>• Admin / Clerical<br>• Call center<br>• Laborers | Access to:<br><br>-Business & Employee assessments<br>Pre-hire mini ($XX) & full assessments ($XX) for following positions:<br>• Sales (farmer & hunter)<br>• Customer service<br>• Management<br>• Professional<br>• Admin / Clerical<br>• Call center<br>• Laborers<br>First month's membership reimbursed with first full assessment (within 6 mos.) | Access to:<br>-Business & Employee assessments<br>Pre-hire mini ($XX) & full assessments ($XX) for following positions:<br>• Sales (farmer & hunter)<br>• Customer service<br>• Management<br>• Professional<br>• Admin / Clerical<br>• Call center<br>• Laborers<br>First full assessment is free; second full assessment is 50% off. (within 6 mos.) |
| -WZG Leads Option ($XX)<br>  a. Buyer Criteria match<br><br>  b. Consumers select up to 3 SP's<br><br><br><br>-WZBest4me<br><br>  a. Coarse personality match ($XX)<br>  b. Fine personality match ($XX) | -WZG Leads Option ($XX)<br>  a. Buyer Criteria match<br>  b. Consumers select up to 3 SP's<br>Up to 2 Free WZG Leads per month<br><br>-WZBest4me<br>  a. Coarse personality match ($XX)<br>  b. Fine personality match ($XX) | -WZG Leads Option ($XX)<br>  a. Buyer Criteria match<br>  b. Consumers select up to 3 SP's<br>Up to 5 Free WZG Leads per month<br><br>-WZBest4me<br>  a. Coarse personality match ($XX)<br>  b. Fine personality match ($XX) |

*Fig. 82*

| Scope | LOCAL | REGIONAL | NATIONAL |
|---|---|---|---|
| Coverage | 20 mi (32 km) radius | 200 mi (322 km) radius | US & Canada |
| WZG Search | | | |
| Price | XX.XX | $XX.XX / category / yr | $XX.XX / category / yr |
| Values | 1. *Individual ratings* of every rated WZG SP's<br>2. *Compiled average* ratings of every rated WZG SP's<br>3. *Industry averages* of all rated WZG SP's<br>4. WZG SP's *Background / Qualifications* | 1. *Individual ratings* of every rated WZG SP's<br>2. *Compiled average* ratings of every rated WZG SP's<br>3. *Industry averages* of all rated WZG SP's<br>4. WZG SP's *Background / Qualifications* | 1. *Individual ratings* of every rated WZG SP's<br>2. *Compiled average* ratings of every rated WZG SP's<br>3. *Industry averages* of all rated WZG SP's<br>4. WZG SP's *Background / Qualifications* |
| WZG "NOW" | | | |
| Price | $XX.XX / yr / category | Included with regional search | Included with national search |
| WZG "Compare" | | | |
| Price | I. WZG Compare: No charge to select 3 & request contact<br>II. Buyer Criteria match: $XX.XX per category / year | I. WZG Compare: No charge to select 3 & request contact<br>II. Buyer Criteria match: $XX.XX per category / year | I. WZG Compare: No charge to select 3 & request contact<br>II. Buyer Criteria match: $XX.XX per category / year |
| "WhoZaBest4me" Personality Match | | | |
| Price | Personality match:<br>a. Mini-assessment:<br>$XX.XX once – lasts 1 year<br>$XX.XX once - lasts 5 years<br>Coarse Match:<br>$XX.XX per category/year<br>or<br>b. Full profile assessment:<br>$XX. once – lasts 5 years<br>Fine Match:<br>$XX.XX per category/year | Personality match:<br>a. Mini-assessment:<br>$XX.XX once – lasts 1 year<br>$XX.XX once - lasts 5 years<br>Coarse Match:<br>$XX.XX per category/year<br>or<br>b. Full profile assessment:<br>$XX. once – lasts 5 years<br>Fine Match:<br>$XX.XX per category/year | Personality match:<br>a. Mini-assessment:<br>$XX.XX once – lasts 1 year<br>$XX.XX once - lasts 5 years<br>Coarse Match:<br>$XX.XX per category/year<br>or<br>b. Full profile assessment:<br>$XX. once – lasts 5 years<br>Fine Match:<br>$XX.XX per category/year |

*Fig. 83*

| Scope | LOCAL | REGIONAL | NATIONAL |
|---|---|---|---|
| Coverage | 20 mi (32 km) radius | 200 mi (322 km) radius | US & Canada |
| | WZG Search | | |
| Price | Free | $XX.XX / category / yr | $XX.XX / category / yr |
| % of users: | 93% | 5% | 2% |
| # uses/yr: | 50+ | 3 | 2 |
| | WZG "NOW" | | |
| Price | $XX.XX / yr / category | Included with regional search | Included with national search |
| % of users: | 10% | as above | as above |
| # uses/yr: | 2 | as above | as above |
| | WZG "Compare" | | |
| Price | I. WZG Compare: No charge to select 3 & request contact<br>II. Buyer Criteria match: $XX.XX per category / year | I. WZG Compare: No charge to select 3 & request contact<br>II. Buyer Criteria match: $XX.XX per category / year | I. WZG Compare: No charge to select 3 & request contact<br>II. Buyer Criteria match: $XX.XX per category / year |
| % of users: | 5% | 5% | 5% |
| # uses/yr: | 2 | 2 | 2 |
| | "WhoZaBest4me" Personality Match | | |
| Price: | Personality match:<br>a. Mini-assessment:<br>$10. once – lasts 1 year<br>Coarse match:<br>+ $XX.XX per category/yr | Personality match:<br>a. Mini-assessment:<br>$10. once – lasts 1 year<br>Coarse match:<br>+ $XX.XX per category/yr | Personality match:<br>a. Mini-assessment:<br>$10. once – lasts 1 year<br>Coarse match:<br>+ $XX.XX per category/yr |
| % of users: | 2% | 2% | 2% |
| # uses/yr: | 2 | 2 | 2 |
| | a. Mini-assessment<br>$XX.XX once - lasts 5 years<br>Coarse match:<br>+ $XX.XX per category / yr | a. Mini-assessment:<br>$XX.XX once - lasts 5 years<br>Coarse match:<br>+ $XX.XX per category / yr | a. Mini-assessment:<br>$XX.XX once - lasts 5 years<br>Coarse match:<br>+ $XX.XX per category / yr |
| % of users: | 1.5% | 1.5% | 1.5% |
| # uses/yr: | 2 | 2 | 2 |
| | b. Full profile assessment:<br>$XX.XX once – lasts 5 years<br>Fine match:<br>+ $XX.XX per category / yr | b. Full profile assessment:<br>$XX.XX once – lasts 5 years<br>Fine match:<br>+ $XX.XX per category / yr | b. Full profile assessment:<br>$XX.XX once – lasts 5 years<br>Fine match:<br>+ $XX.XX per category / yr |
| % of users: | 1% | 1% | 1% |
| # uses/yr: | 2 | 2 | 2 |

*Fig. 84*

Sample Service Provider Questionnaire (Healthcare Industry)

| Number | Field Label | Response |
|---|---|---|
| 1 | Insurances accepted | |
| 2 | Cash Programs available | Select: Yes, No |
| 3 | Type of Practice: Solo Practice or Group | |
| 4 | Board Certified, Which Specialty | Fill in the blank |
| | More than one Board Certification | Fill in the blank |
| 5 | Date of Certification | Fill in the blank |
| 6 | Services offered: | |
| | Treadmill | check box |
| | Lab | check box |
| | EKG | check box |
| | Other | Fill in the blank |
| 7 | Nutrition / Herb / Diet Counseling / Weight-loss | check box |
| 8 | Do you use electronic medical records | check box |
| 9 | Alternative or Integrated Medicine | check box |
| 10 | What machine diagnostics | check box |
| 11 | Which hospitals do you use | check box |
| 12 | How do you cover after hours | check box |
| 13 | Other (please specify): | form field |
| 14 | Gender: | Select: Female, Male |
| 15 | Undergraduate College/University: | Fill in the blank |
| | Degree / Yr Graduated | Fill in the blank |
| 16 | Graduate College/University: | Fill in the blank |
| | Degree / Yr Graduated | Fill in the blank |
| 17 | Other degrees or certifications | Fill in the blank |
| | Year Received | Fill in the blank |
| 18 | License | Fill in the blank |
| 19 | State or Province | Fill in the blank |
| 20 | Disciplinary proceedings: | Select: Yes, No |
| | Date | Fill in the blank |
| | Charge | Fill in the blank |
| | Outcome | Fill in the blank |

*Fig. 85*

| Item | Yr 1 | Yr 2 | Yr 3 | Yr 4 | Yr 5 |
|---|---|---|---|---|---|
| A: SP Subscription Revenue | | | | | |
| # of WZG registered SP's (Free) | | | | | |
| # of Gold Plan subscribers ($___/mo) | | | | | |
| # of Platinum Plan subscribers ($___/mo) | | | | | |
| Total SP subscription revenue (A) | | | | | |
| VD compensation from subscriptions | | | | | |
| Accelerated payback (X% of A) | | | | | |
| Standard payback (Y% of A), Y<X | | | | | |
| B: Consumer Revenue | | | | | |
| Total # of Internet searches (for vertical) | | | | | |
| # of WZG searches | | | | | |
| # of Consumer ratings | | | | | |
| # of WZG Connect uses-free to consumer (for Leads) | | | | | |
| # of WZG paid Regional searches: $___ | | | | | |
| # of WZG paid National searches: $___ | | | | | |
| # of Buyer Criteria match searches: $___ | | | | | |
| Total Consumer paid search revenue (B) | | | | | |
| VD compensation from consumer searches | | | | | |
| Accelerated payback (X% of B) | | | | | |
| Standard payback (Y% of B), Y<X | | | | | |
| C: Other Consumer Revenue- WhoZaBest4me | | | | | |
| # of Coarse personality matches ($___+$___) | | | | | |
| # of Coarse personality matches ($___+$___) | | | | | |
| # of Fine personality matches ($___+$___) | | | | | |
| Total Consumer match revenue (C) | | | | | |
| VD compensation from consumer searches | | | | | |
| Standard payback (Y% of C) | | | | | |
| D: WZG Leads Revenue | | | | | |
| # of Leads from WZG Connect (above) | | | | | |
| Total WZG Leads revenue (D) | | | | | |
| VD compensation from Leads / Connect | | | | | |
| Accelerated payback (X% of D) | | | | | |
| Standard payback (Y% of D), Y<X | | | | | |

*Fig. 86A*

| E. WZG Business Support Revenue | | | | | |
|---|---|---|---|---|---|
| # of Webinars / seminars | | | | | |
| # of Attendees / seminar | | | | | |
| Avg. Cost / seminar | | | | | |
| Total seminar revenue (E1) | | | | | |
| # of Coaching clients ($1,000 / mo) | | | | | |
| Revenue from Coaching (E2) | | | | | |
| # of Integrity Certifications | | | | | |
| Expected Price (based on # of employees) | | | | | |
| Revenue from Integrity certifications (E3) | | | | | |
| # of Personality Assessments ($___) | | | | | |
| Revenue from Personality Assessments (E4) | | | | | |
| Total Business Support revenue (E) | | | | | |
| VD compensation from Business Support products | | | | | |
| Accelerated payback (X% of E) | | | | | |
| Standard payback (Y% of E), Y<X | | | | | |
| Totals | | | | | |
| Total vertical revenue(A+B+C+D+E) | | | | | |
| Subtotal Accelerated payback (X% A+B+D) | | | | | |
| Subtotal Standard payback (Y% A, B, D) | | | | | |
| Subtotal Standard payback (Y% C, E) | | | | | |
| Total expected Accelerated payback (X% A,B,D; Y% C,E) – Y<X | | | | | |
| Total expected Standard payback (Y% A,B,C,D,E) | | | | | |
| Expected Budget for BoA (Z% of total revenue: A+B+C+D+E); Z<Y | | | | | |

*Fig. 86B*

| Free Plan | "Pay-As-You-Go" Plan | Gold Plan | Platinum Plan |
|---|---|---|---|
| Free | Pay for Leads only | $XX.XX / Month Additions: | $XX.XX / Month Additions: |
| Basic Profile –webpage w/ logo | | Enhanced Profile –webpage w/ photos | Enhanced Profile – webpage w/video<br>Free Advanced Market Research Data |
| Business Analytics - Basic | | Competitive Analysis Report | |
| Access & Respond to Reviews | | Mobile App Access | Mobile App Access<br>-New Review Alerts |
| Complaint Resolution Team | | -New Review Alerts | |
| | | -New Lead Alerts | -New Lead Alerts<br>Free Webinars |
| No WZG Now Option | WZG Now Option | | |
| Access to:<br>-WZG Integrity Certification<br>-Webinars / Seminars<br>-Business Coaching | | | |
| Access to:<br>-Business & Employee assessments<br>Pre-hire mini ($XX) & full assessments ($XX) for following positions:<br>• Sales (farmer & hunter)<br>• Customer Service<br>• Management<br>• Professional<br>• Admin / Clerical<br>• Call Center<br>• Laborers | | | |
| | | First month's membership reimbursed with first full assessment (within 6 mos.) | First full assessment is free; 2nd full assessment is 50% off (within 6 mos.) |
| No WZG Leads<br><br>No WZG Connect<br>No WZG Compare<br>No Buyer Criteria Match | -WZG Leads Options (~$XX)<br><br>a. WZG Connect<br>b. WZG Compare:<br>   Consumers select up to 3 SP's<br>c. Buyer Criteria Match: Consumers select up to 3 matched SP's<br><br>Pay for leads as received only<br>Can set cap at any limit | -WZG Leads Options (~$XX)<br><br>a. WZG Connect<br>b. WZG Compare:<br>   Consumers select up to 3 SP's<br>c. Buyer Criteria Match: Consumers select up to 3 matched SP's<br><br>Up to $XX Free WZG Leads credits per month. Can set cap over $XX at any limit. | -WZG Leads Options (~$XX)<br>a. WZG Connect<br>b. WZG Compare: Consumers select up to 3 SP's<br>c. Buyer Criteria Match: Consumers select up to 3 matched SP's<br><br>Up to $XX Free WZG Leads credits per month. Can set cap at any limit. |
| -WZBest4me<br>c. Coarse personality match ($XX)<br>b. Fine personality match ($XX) | | -WZBest4me<br>a. Coarse personality match ($XX)<br>b. Fine personality match ($XX) | |

*Fig. 88*

Prequalifying Questions

| | | |
|---|---|---|
| 1. Have you done business with this provider within the last 3 years? | Yes | No |
| 2. When was the service provided? | Within last week | |
| | Within last month | |
| | 2-3 months ago | |
| | 3-6 months ago | |
| | 6-12 months ago | |
| | More than 1 year | |
| 3. What service was provided? | | |

Common Rating Questions

| # | Category | Question | Not at all likely | | Neutral | | Extremely likely |
|---|---|---|---|---|---|---|---|
| NPS | | How likely are you to recommend this provider to a colleague or friend | 0  1  2 | 3  4 | 5 | 6  7  8 | 9  10 |

*Net Promoters Score*

| | | | Strongly Disagree | Moderately Disagree | Neutral | Moderately Disagree | Strongly Agree | N/A |
|---|---|---|---|---|---|---|---|---|
| 2 | Service Quality | My service was handled in a timely manner | 1 | 2 | 3 | 4 | 5 | |
| 3 | Service Quality | I received a thorough explanation before being asked to commit to a particular service | 1 | 2 | 3 | 4 | 5 | |
| 4 | Service Quality | The provider was honest and direct when explaining my options | 1 | 2 | 3 | 4 | 5 | |
| 5 | Service Quality | I received quality service from the provider | 1 | 2 | 3 | 4 | 5 | |
| 6 | Service Quality | I received quality service from the support staff | 1 | 2 | 3 | 4 | 5 | |
| 7 | Competence | The provider was professional | 1 | 2 | 3 | 4 | 5 | |
| 8 | Competence | The provider was very knowledgeable | 1 | 2 | 3 | 4 | 5 | |
| 9 | Competence | I followed the recommendations / advice given (if given) | 1 | 2 | 3 | 4 | 5 | |
| 10 | Environment | The provider's office / work environment was clean (if applicable) | 1 | 2 | 3 | 4 | 5 | |

*Fig. 89A*

| | | | | | | | |
|---|---|---|---|---|---|---|---|
| 11 | Environment | The provider's office / work environment was easily accessible (if applicable) | 1 | 2 | 3 | 4 | 5 |
| 12 | Value | I received good value for my money | 1 | 2 | 3 | 4 | 5 |
| 13 | Value | My expectations were met | 1 | 2 | 3 | 4 | 5 |
| 14 | Value | The pricing was fair | 1 | 2 | 3 | 4 | 5 |
| 15 | Value | The final bill was consistent with the initial quote | 1 | 2 | 3 | 4 | 5 |
| 16 | Ethics | The provider was honest in dealing with me | 1 | 2 | 3 | 4 | 5 |
| 17 | Ethics | I trust the provider | 1 | 2 | 3 | 4 | 5 |
| 18 | Ethics | The provider was ethical | 1 | 2 | 3 | 4 | 5 |
| 19 | Ethics | The provider met all of their commitments to me | 1 | 2 | 3 | 4 | 5 |
| 20 | Ethics | The provider had my best interests in mind | 1 | 2 | 3 | 4 | 5 |
| 21 | Ethics | The provider acted with integrity | 1 | 2 | 3 | 4 | 5 |
| 22 | Ethics | The provider was transparent in dealing with me (i.e., no hidden agenda) | 1 | 2 | 3 | 4 | 5 |
| 23 | Overall Satisfaction | I would buy again from this provider | 1 | 2 | 3 | 4 | 5 |
| 24 | Overall Satisfaction | Overall, I was satisfied with the service that was provided to me | 1 | 2 | 3 | 4 | 5 |
| | | | Low | Below Avg | Average | Above Avg | High |
| 25 | Price | The provider's price compared to other providers in the area | 1 | 2 | 3 | 4 | 5 |
| 26 | Comments | | | | | | |

*Fig. 89B*

ELECTRONIC COMPUTER ENGINES FOR ANALYTICAL MATCHING AND METHODS OF USE THEREOF

RELATED APPLICATIONS

This application claims the priority of U.S. provisional application Ser. No. 61/905,750, entitled "COMPUTER-IMPLEMENTED METHODS AND COMPUTER SYSTEMS RELATED TO ANALYTICAL RATING AND MATCHING INDIVIDUALS AND/OR ENTITIES TO SERVICE PROVIDERS," filed on Nov. 18, 2013; U.S. provisional application Ser. No. 61/905,765, entitled "COMPUTER-IMPLEMENTED METHODS AND COMPUTER SYSTEMS RELATED TO ANALYTICAL RATING AND MATCHING INDIVIDUALS AND/OR ENTITIES TO SERVICE PROVIDERS INDEPENDENTLY OF PRICING AND FRANCHISING PARTICIPATION"; U.S. provisional application Ser. No. 61/905,773, entitled "COMPUTER-IMPLEMENTED METHODS AND COMPUTER SYSTEMS RELATED TO ANALYTICAL RATING AND MATCHING INDIVIDUALS AND/OR ENTITIES TO SERVICE PROVIDERS INDEPENDENT OF PRICING"; and U.S. provisional application Ser. No. 61/905,782, entitled "COMPUTER-IMPLEMENTED METHODS AND COMPUTER SYSTEMS RELATED TO ANALYTICAL RATING AND MATCHING INDIVIDUALS AND/OR ENTITIES TO SERVICE PROVIDERS INDEPENDENT OF FRANCHISEE PARTICIPATION"; which are incorporated herein by reference in their entirety for all purposes.

TECHNICAL FIELD

In some embodiments, the present invention relates to electronic engines for analytical rating and matching consumers to businesses and methods of use thereof.

BACKGROUND

Typically, if a person is interesting to purchase a product and/or a service (e.g., having a meal, spa treatment, etc.), he or she can search electronic sources/databases (e.g., the Internet) which outputs information about business(es) that may offer the product and/or the service that the person is looking for.

SUMMARY OF INVENTION

In some embodiments, the instant invention provides for a method being implemented by an improved computer system programmed for searching in accordance with the method, including at least steps of: obtaining, by a specially programmed computer matching system, business information regarding a plurality of businesses and a plurality of offerings offered by the plurality of businesses; where: 1) the plurality of offerings comprises services, products, or both; 2) the business information comprises: i) information about each business being submitted by such business in accordance with at least the following conditions agreed to by each business: a) the information being submitted is complete, b) the information being submitted is truthful, and c) the information being submitted is accurate; ii) business profile information corresponding to one of the following business profile information tier: a) a first business profile information tier having responses to a Y(1) number of psychometric questions displayed to at least one representative of such business, b) a second business profile information tier having responses to a Y(2) number of psychometric questions displayed to the at least one representative of such business, c) a third tier personal consumer profile information tier having responses to a Y(3) number of psychometric questions displayed to the at least one representative of such business, and where the Y(1) number being less than the Y(2) number and the Y(2) number being less than the Y(3) number; where the plurality of businesses comprises at least one thousand business; storing, by the specially programmed computer matching system, in at least one database, the business information regarding the plurality of businesses and the plurality of offerings offered by the plurality of businesses; generating, by the specially programmed computer matching system, a rating score for each business based on consumer ratings submitted by a plurality of consumers, where the consumer ratings evaluate each business in at least the following rating categories: 1) service, 2) value, 3) ethics, 4) competence, 5) environment, and 6) price; associating, by the specially programmed computer matching system, in the at least one database, each business with the rating score; causing, by the specially programmed computer matching system, to concurrently display at least one first graphical user interface from a plurality of first graphical user interfaces to the plurality of consumers, where the at least one first graphical user interface of the plurality of first graphical user interfaces is configured to obtain from each consumer from the plurality of consumers at least: i) personal identifying information of such consumer to be validated prior to conducting matching for such consumer; ii) personal consumer profile information corresponding to one of the following personal consumer profile information tiers: a) a first personal consumer profile information tier having responses to a X(1) number of personality psychometric questions displayed to such consumer, b) a second personal consumer profile information tier having responses to a X(2) number of personality psychometric questions displayed to such consumer, c) a third personal consumer profile information tier having responses to a X(3) number of personality psychometric questions displayed to such consumer, and d) a tier personal consumer profile information fourth having responses to a X(4) number of personality psychometric questions displayed to such consumer, where the X(1) number being less than the X(2) number, the X(2) number being less than the X(3) number, and the X(3) number being less than the X(4) number; (iii) at least one business identifying matching parameter, identifying at least one identifying characteristic associated with at least one of: 1) at least one business, offering at least one service, at least one product, or both, being desired by such consumer, 2) the at least one service, the at least one product, or both, being desired by such consumer, and 3) a combination of thereof; iv) at least one geographic indication, identifying at least one geographic location associated with the at least one business offering at least one service, at least one product, or both, desired by such consumer; v) a plurality of ranked filtering criteria, where the ranked filtering criteria being: 1) selected from a plurality of evaluation criteria that are associated with one of: the at least one business, the at least one service, the at least one product, an any combination thereof, and are configured to allow such consumer to select the at least one business, the at least one service, the at least one product, an any combination thereof; and 2) ranked by such consumer from in an predetermined ranking order; vi) at least one rating score filtering parameter, identifying a particular rating score or a plurality of rating scores to be associated with the at least one business desired by such consumer; where the plurality of consumers comprises at least one thousand consumers; prior to conducting matching for a plurality of particular consumers, validating, by the specially programmed computer matching system, each particular consumer of the plurality of particular consumers based on the personal identifying information of such particular consumer; based on an outcome of the validating, concurrently matching, by the specially programmed computer matching system, each particular consumer of the plurality of particular consumers with at least one business based at least in part on: 1) the at least one business identifying matching parameter obtained from each particular consumer of the plurality of particular consumers, 2) the at least one geographic indication obtained from each particular consumer of the plurality of particular consumers, 3) the plurality of ranked filtering criteria obtained from each particular consumer of the plurality of particular consumers, 4) the personal consumer profile information, 5) the business profile information, and 6) the at least one rating score filtering parameter; and causing, by the specially programmed matching computer system, to concurrently output, utilizing at least one second graphical user interface from a plurality of second graphical user interfaces, each matching result of a plurality of matching results to each respective particular consumer of the plurality of particular consumers.

In some embodiments, the at least one second graphical user interface of the plurality of second graphical user interfaces is further configured to display: at least one urgency indication, identifying when a particular business, a particular service, a particular product, or any combination thereof, is available.

In some embodiments, the plurality of evaluation criteria comprise evaluation criteria selected from the group consisting of: 1) price, 2) geographic proximity to a particular location associated with such consumer, 3) professional competence of the at least one business, 4) background information of the at least one business, 5) certification of the at least one business, 6) experience of the at least one business, and 7) environment associated with the at least one business.

In some embodiments, the at least one second graphical user interface of the plurality of second graphical user interfaces is further configured to allow each respective particular consumer of the plurality of particular consumers to give a consent to at least one particular business identified in a particular match result to contact such respective particular consumer.

In some embodiments, the method further includes at least the steps of: upon each consent received each particular consumer, automatically and in-real time generating, by the specially programmed computer matching system, at least one lead to be transmitted to the least one particular business.

In some embodiments, the at least one second graphical user interface of the plurality of second graphical user interfaces is further configured to allow each respective particular consumer of the plurality of particular consumers to select, with the consent, an anonymity level, identifying how much of the personal information of such respective particular consumer to be disclosed to the at least one particular business.

In some embodiments, the business information further includes: iii) integrity certification status, identifying businesses that have passed at least one integrity certification assessment, where the at least one integrity certification assessment varies based at least in part on a size of each business; and where the at least one second graphical user interface of the plurality of second graphical user interfaces is further configured to display the integrity certification status associated with a particular business.

In some embodiments, the business information further includes: iii) integrity certification status, identifying businesses that have passed at least one integrity certification assessment, where the at least one integrity certification assessment varies based at least in part on a size of each business; and automatically notifying, by the specially programmed computer matching system, the at least one particular business about an obligation of the at least one particular business to respond the at least one lead.

In some embodiments, the concurrently matching each particular consumer of the plurality of particular consumers with the at least one business further includes: matching based on a plurality of matching levels; where the plurality of matching levels are selected from the group consisting of: 1) a first matching level, where the personal consumer profile corresponds to the first personal consumer profile information tier and the business profile information corresponds to the first business profile information tier; 2) a second matching level, where the personal consumer profile corresponds to one of: the second personal consumer profile information tier, the third personal consumer profile information tier, or the fourth personal consumer profile information tier; and the business profile information corresponds to one of the second business profile information tier and the third business profile information tier.

In some embodiments, the method can further includes: obtaining, by the specially programmed computer matching system, updated business information regarding one of the plurality of businesses, the plurality of offerings offered by the plurality of businesses, or both; and based at least in part on the updated business information, periodically modifying, by the specially programmed computer matching system, at least one of: 1) the plurality of ranked filtering criteria, 2) the plurality of evaluation criteria, 3) the rating score, and 4) any combination thereof.

In some embodiments, at least one consumer of the plurality of consumers is one of: i) an individual, and ii) a business that desires to obtain at least one service, at least one product, or both, from another business. In some embodiments, at least one business is an individual who offers for sale at least one service, at least one product, or both.

In some embodiments, the instant invention provides an improved computer system programmed for searching which includes at least the following components: at least one specialized computer machine, having: a non-transient memory having at least one region for storing particular computer executable program code; and at least one processor for executing the particular program code stored in the memory, where the particular program code is configured to at least perform the following operations upon the execution: obtaining business information regarding a plurality of businesses and a plurality of offerings offered by the plurality of businesses; where: 1) the plurality of offerings comprises services, products, or both; 2) the business information comprises: i) information about each business being submitted by such business in accordance with at least the following conditions agreed to by each business: a) the information being submitted is complete, b) the information being submitted is truthful, and c) the information being submitted is accurate; ii) business profile information corresponding to one of the following business profile information tier: a) a first business profile information tier having responses to a $Y(1)$ number of psychometric questions displayed to at least one representative of such business, b) a second business profile information tier having responses to a $Y(2)$ number of psychometric questions displayed to the at least one representative of such business, c) a third tier personal consumer profile information tier having responses to a $Y(3)$ number of psychometric questions displayed to the at least one representative of such business, and where the $Y(1)$ number being less than the $Y(2)$ number and the Y(2) number being less than the Y(3) number; where the plurality of business comprises at least one thousand business; storing, in at least one database, the business information regarding the plurality of businesses and the plurality of offerings offered by the plurality of businesses; generating a rating score for each business based on consumer ratings submitted by a plurality of consumers, where the consumer ratings evaluate each business in at least the following rating categories: 1) service, 2) value, 3) ethics, 4) competence, 5) environment, and 6) price; associating in the at least one database, each business with the rating score; causing to concurrently display at least one first graphical user interface from a plurality of first graphical user interfaces to the plurality of consumers, where the at least one first graphical user interface of the plurality of first graphical user interfaces is configured to obtain from each consumer from the plurality of consumers at least: i) personal identifying information of such consumer to be validated prior to conducting matching for such consumer; ii) personal consumer profile information corresponding to one of the following personal consumer profile information tiers: a) a first personal consumer profile information tier having responses to a X(1) number of personality psychometric questions displayed to such consumer, b) a second personal consumer profile information tier having responses to a X(2) number of personality psychometric questions displayed to such consumer, c) a third personal consumer profile information tier having responses to a X(3) number of personality psychometric questions displayed to such consumer, and d) a tier personal consumer profile information fourth having responses to a X(4) number of personality psychometric questions displayed to such consumer, where the X(1) number being less than the X(2) number, the X(2) number being less than the X(3) number, and the X(3) number being less than the X(4) number; (iii) at least one business identifying matching parameter, identifying at least one identifying characteristic associated with at least one of: 1) at least one business, offering at least one service, at least one product, or both, being desired by such consumer, 2) the at least one service, the at least one product, or both, being desired by such consumer, and 3) a combination of thereof; iv) at least one geographic indication, identifying at least one geographic location associated with the at least one business offering at least one service, at least one product, or both, desired by such consumer; v) a plurality of ranked filtering criteria, where the ranked filtering criteria being: 1) selected from a plurality of evaluation criteria that are associated with one of: the at least one business, the at least one service, the at least one product, an any combination thereof, and are configured to allow such consumer to select the at least one business, the at least one service, the at least one product, an any combination thereof; and 2) ranked by such consumer from in an predetermined ranking order; vi) at least one rating score filtering parameter, identifying a particular rating score or a plurality of rating scores to be associated with the at least one business desired by such consumer; where the plurality of consumers comprises at least one thousand consumers; prior to conducting matching for a plurality of particular consumers, validating each particular consumer of the plurality of particular consumers based on the personal identifying information of such particular consumer; based on an outcome of the validating, concurrently matching each particular consumer of the plurality of particular consumers with at least one business based at least in part on: 1) the at least one business identifying matching parameter obtained from each particular consumer of the plurality of particular consumers, 2) the at least one geographic indication obtained from each particular consumer of the plurality of particular consumers, 3) the plurality of ranked filtering criteria obtained from each particular consumer of the plurality of particular consumers, 4) the personal consumer profile information, 5) the business profile information, and 6) the at least one rating score filtering parameter; and causing to concurrently output, utilizing at least one second graphical user interface from a plurality of second graphical user interfaces, each matching result of a plurality of matching results to each respective particular consumer of the plurality of particular consumers.

BRIEF DESCRIPTION OF THE DRAWINGS

The present invention will be further explained with reference to the attached figures.

Figure 4:
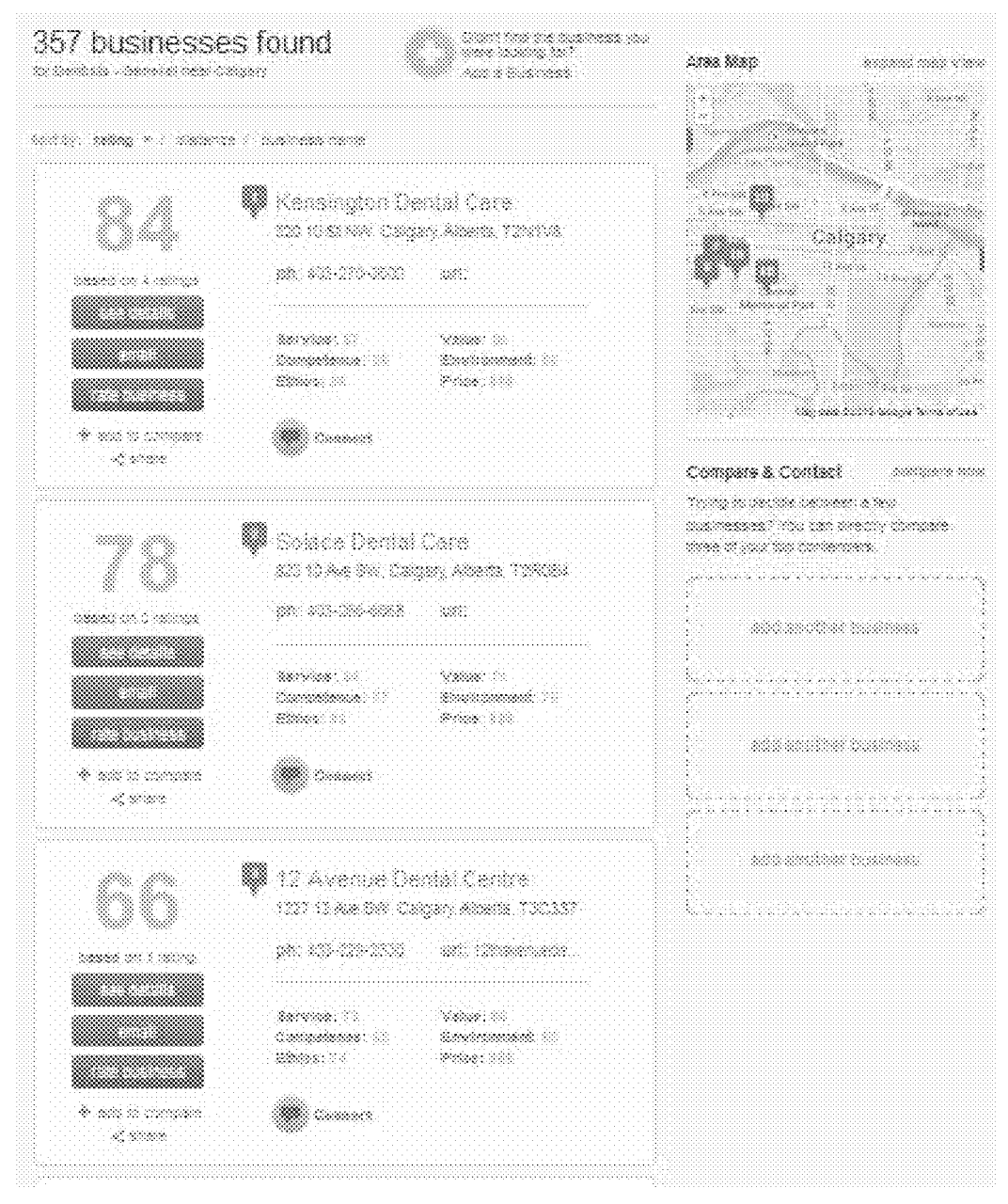

FIGS. 1-4 are screenshots that illustrate certain aspects of some embodiments of the instant invention.

FIGS. 13-36 are screenshots illustrating certain aspects of some embodiments of the instant invention.

FIGS. 37-80 are charts illustrating certain aspects of some embodiments of the instant invention.

FIGS. 82-86B are charts illustrating certain aspects of some embodiments of the instant invention.

FIGS. 88-89B are charts illustrating certain aspects of some embodiments of the instant invention.

Figure 1:
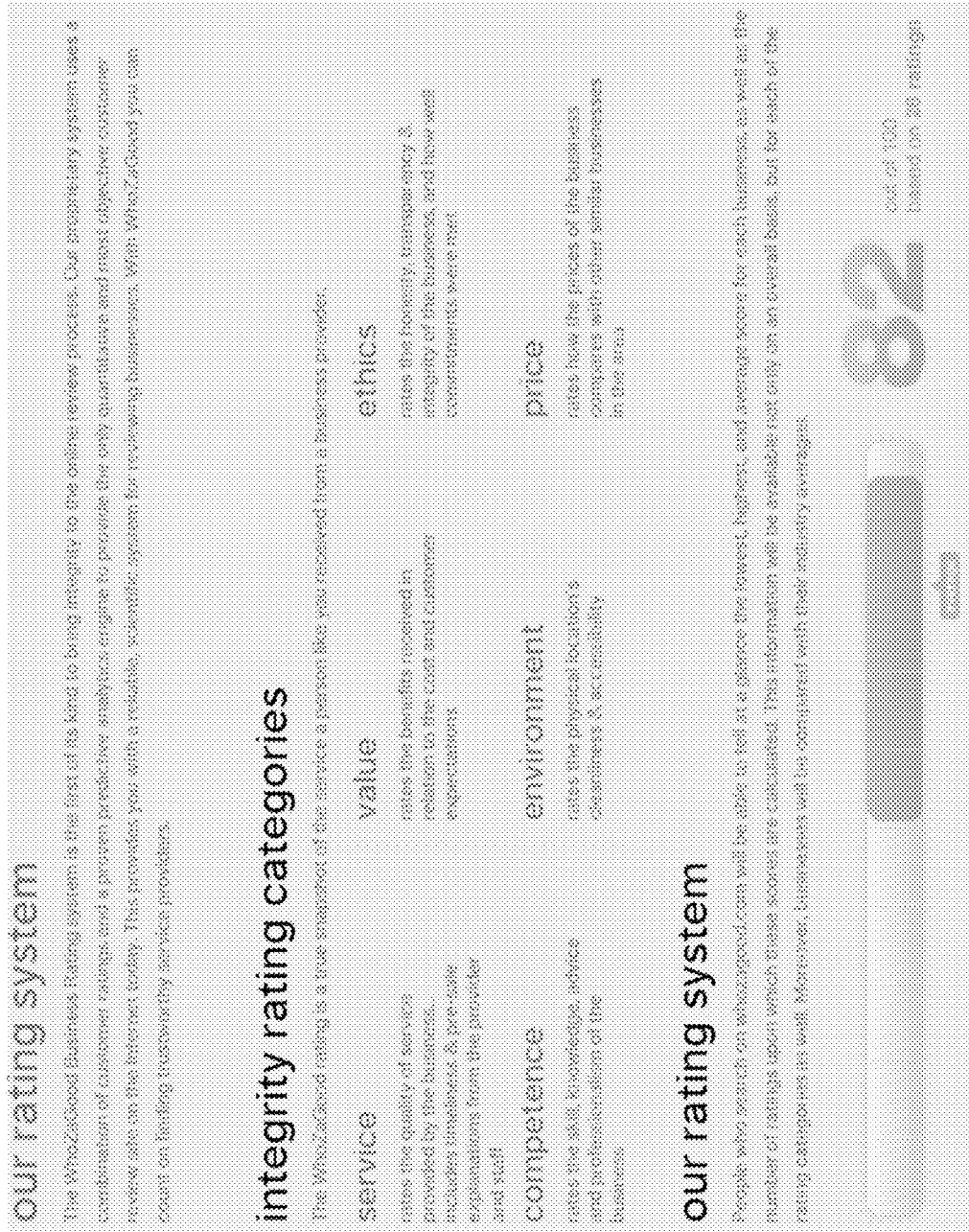
Figure 2:

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive. Any alterations and further modifications of the inventive feature illustrated herein, and any additional applications of the principles of the invention as illustrated herein, which can normally occur to one skilled in the relevant art and having possession of this disclosure, are to be considered within the scope of the invention.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action can occur instantaneously or almost instantaneously in time when another event/action has occurred. In some embodiments, the terms "instantaneous," "instantaneously," "instantly," and "in real time" refer to a condition where a time difference between a first time when a search request is transmitted and a second time when a response to the request is received is no more than 1 second. In some embodiments, the time difference between the request and the response is between less than 1 second and 1 minute. As used herein, the term "dynamic(ly)" is directed to an event/action that can occur without any human intervention. In some embodiments, the dynamic event/action may be in real-time, hourly, daily, weekly, monthly, etc.

In some embodiments, the present invention relates to a matching computer-programmed engine that allows an individual and/or entity (e.g. customer and/or consumer) to: a) provide analytical rating; b) search for; c) match; and then d) identify trustworthy businesses (referred to as "service providers"). It is understood that a "service provider" may include, but is not limited to, a provider of services, merchant selling products or services and/or any other individual and/or entity that provides or sells services and/or products. As such, a "service provider" may include, but is not limited to, an individual, plurality of individuals and/or entity that is a: a) business-to-business (B2B) describing commerce transactions between businesses, such as between a manufacturer and retailer, or between a wholesaler and a retailer; b) business-to-consumer (B2C); and/or c) business-to-government (B2G). As such, the service provider may be an individual, company and/or other legal entity. It is also understood that "WZG" means the entity that performs the system and/or method of the present invention, as detailed below.

Figure 5:
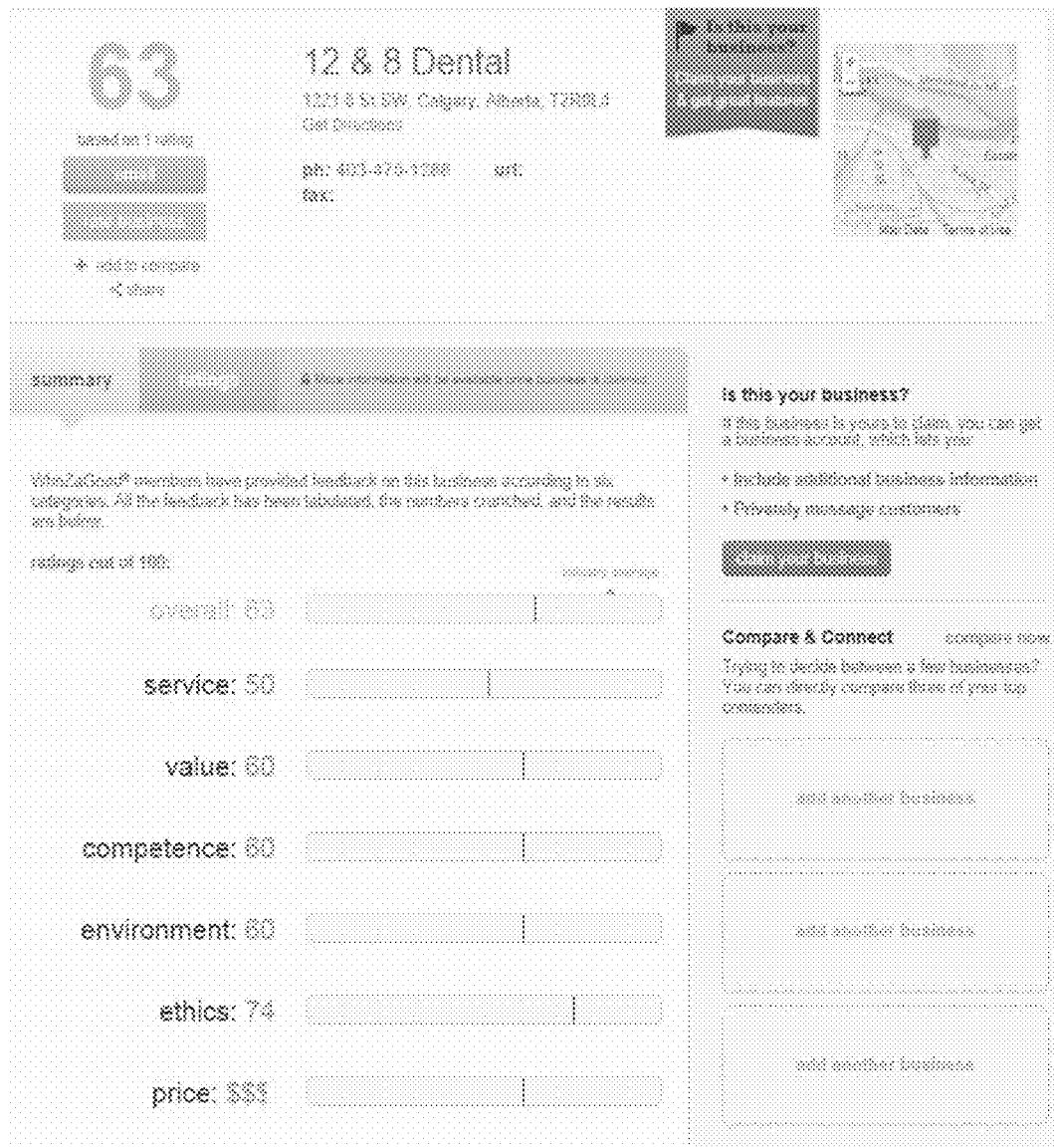
FIGS. 5-8 are screenshots illustrate certain aspects of some embodiments of the instant invention.
Figure 6:
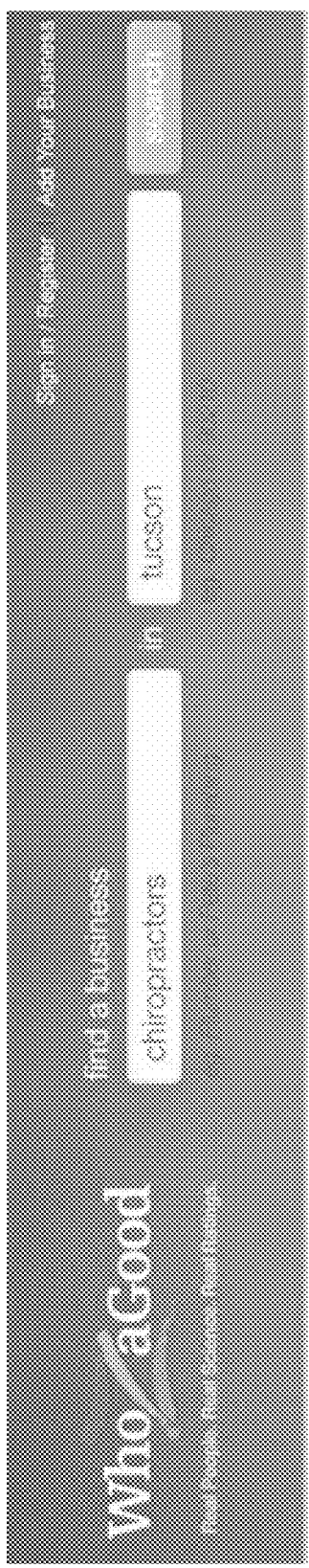
Figure 7:
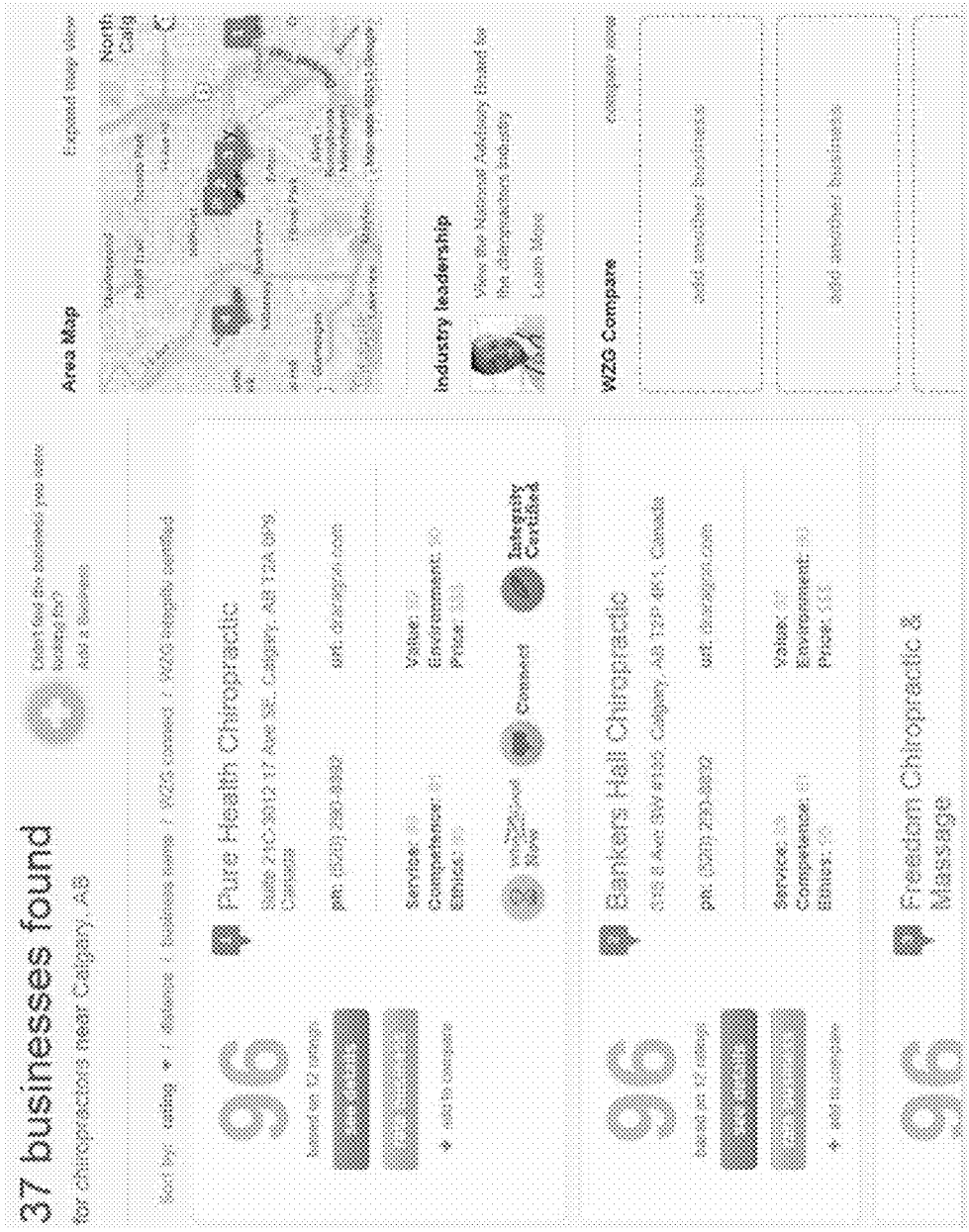
Figure 8:
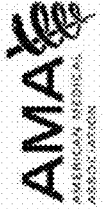
Figure 9:
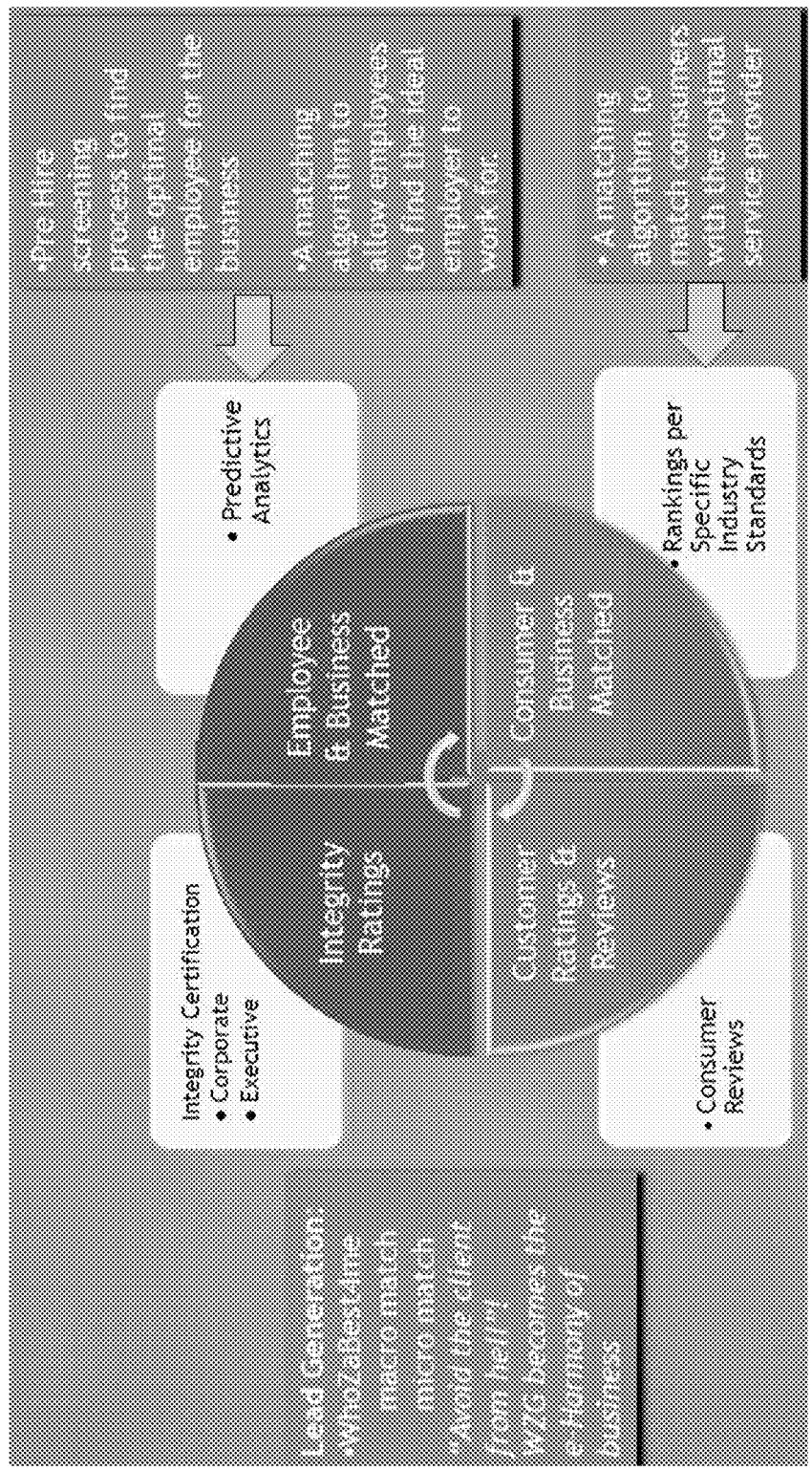
FIG. 9 is a screenshot illustrating certain aspects of some embodiments of the instant invention.
Figure 10:
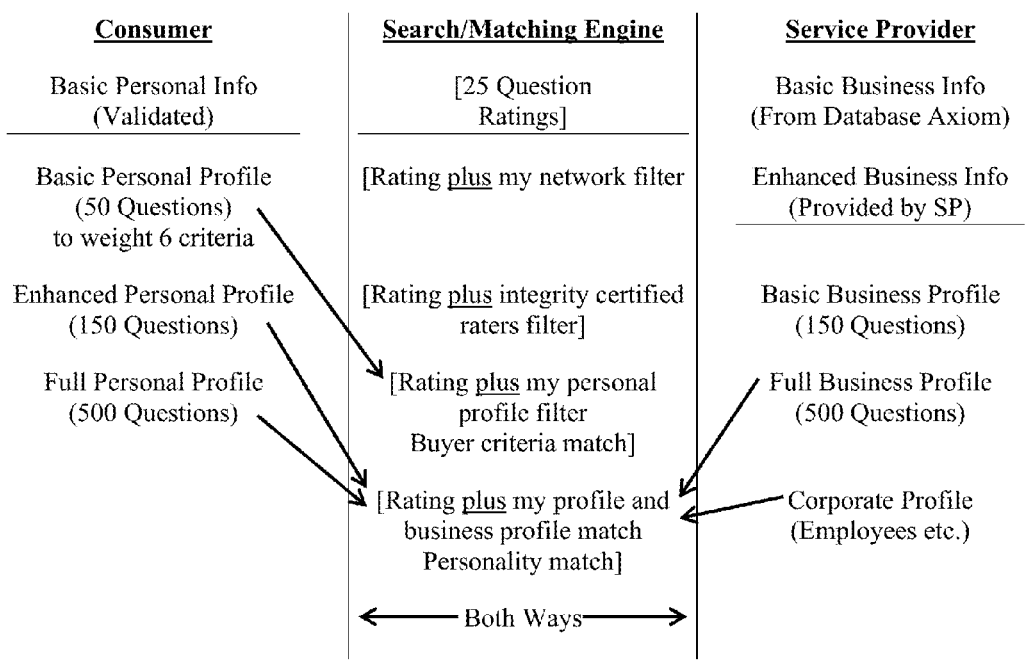
FIGS. 10-12 are flowcharts illustrating certain aspects of some embodiments of the instant invention.

In some embodiments, the present invention is an integrity-based rating process based on a reliable rating of one or more service providers using one or more predictive analytics. In some embodiments, the present invention allows to promote ethical commerce and provide a trustworthy vehicle to enable an individual and/or entity (e.g. customer and/or consumer) to identify one or more service providers that operate with integrity. In some embodiments, the present invention allows for complete transparency by requiring one or more service providers to publicly disclose important information (e.g. shown in FIGS. 1, 5 and 9) about themselves as a condition to registering with the present invention. In some embodiment, such important information may be obtained by, but not limited to: a) questionnaire to service providers and/or individual or entity (e.g. customer and/or consumer); b) third party sources; and/or c) other trustworthy sources. In some embodiments, the present invention does not sell advertising to service providers, does not include paid advertising on the site; and/or allow service providers to "purchase" their way to higher ratings. In some embodiments, the present invention allows service providers to improve their rankings by improving customer satisfaction through, for example, coaching, enhanced feedback and/or other methods that result reliable increase customer satisfaction. In another embodiment, the number of service providers are 5, 10, 100, 1000, 10,000 or more. In yet another embodiment, the number of individuals and/or entities evaluating one service providers that results in the analytical rating are 10, 100, 1000 10,000 or more.

In some embodiments, the present invention allows an individual and/or entity (e.g. customer and/or consumer) to match and to identify the relative rankings of a plurality of service provider within an industry (e.g. 2, 3, 4, 5, 6, 7, 8, 9, 10 and more). In some embodiments, the present invention allows an individual and/or entity (e.g. customer and/or consumer) free matching (which have limited functionality and/or geographic scope of coverage) and/or paid matching (pricing varies depending on the features and/or geographic scope of coverage of the desired match). In some embodiments, an individual and/or entity (e.g. customer and/or consumer) may also participate in a "matching program" where an individual and/or entity (e.g. customer and/or consumer) can request that up to, for example but not limited to, X selected service (e.g. 1, 2, 3, 4, 5, 6 and/or any pre-determined number) providers to contact the consumer to provide additional information (e.g. quote, price or additional details).

In some embodiments, each evaluation of a service provider requires the individual and/or entity (e.g. customer) to rate the service provider based on a series of quality and integrity standards that are customized for the industry by a designated Vertical Director. In some embodiments, service providers, who register with the WZG, can monitor customer ratings and interact with customers (unless the customer has chosen to utilize a protected identity—e.g. anonymity) to improve their rankings and level of customer satisfaction. In some embodiments, service providers do not pay any fees to register with WGZ. In some embodiments, service providers must disclose certain information about their business that will be available to an individual and/or entity (e.g. customer and/or consumer) searching the present invention integrity matching engine. In some embodiments, the specific information that must be disclosed by service providers within a given industry will be pre-determined by the Vertical Director.

In some embodiments, the present invention allows registered service providers to purchase various business support products and/or services to improve their operations, such as, but is not limited to, business coaching and predictive analytics. In one embodiment, a "registered" service provider is a service provider that agrees to publicly disclose important information (e.g. shown in FIGS. 1, 5 and 9) about themselves as a condition to registering with the present invention. In some embodiment, such important information may be obtained by, but not limited to: a) questionnaire to service providers and/or individual or entity (e.g. customer and/or consumer); b) third party sources; and/or c) other trustworthy sources.

As the company's business operations improve, the customer ratings should also improve, thereby providing the company with a higher ranking on the present invention integrity search engine and driving more business to the company. In some embodiments, the present invention allows service providers to purchase subscriptions which will provide them with access to increasing levels of business tips, tools, resources, training, industry data and/or competitive analysis reports. In some embodiments, a subscription may also entitle the service provider to discounts on some of the business support products and services.

In some embodiments, the present invention allows to support ethical commerce through integrity, authenticity, fairness and transparency.

In some embodiments, each rating is a result of statistical analysis using e.g. predictive analytics. In some embodiments, this process ensures ratings are qualified and objective. In some embodiments, the present invention relies on that an individual (e.g. customer and/or consumer) cannot misrepresent who she/he is, impersonate another person, or rate on behalf of someone you personally know. In some embodiments, each individual (e.g. customer and/or consumer) fills in a profile that clearly identifies the individual (e.g. customer and/or consumer) as a real person. In some embodiments, each individual (e.g. customer and/or consumer) promises to give honest answers to the present invention. For example, as shown in the figures below, each individual (e.g. customer and/or consumer) is required to first to answer a "terms and conditions" questionnaire prior to be allowed to participate in the rating system.

In some embodiments, the present invention allows an individual (e.g. customer and/or consumer) to rate a service provider at any time, whether the service provider is "registered" or not. In some embodiments, the present invention allows the service provider to "register", so the service provider can then get rating notices, track rating trends and/or obtain leads. In some embodiments, to participate, the service provider agrees to: not misrepresent who you are, impersonate another person or business; not rate a competitor negatively; not pay anyone to rate specific business; post only truthful and accurate information; understand that transparency is of the utmost important to all participants who register. For example, as shown in the figures below, each service provider is required to first answer a "term and conditions" questionnaire prior to being allowed to register. In some embodiments, the present invention allows for authenticity, fairness and transparency.

In some embodiments, the present invention offers online service provider search based on merit alone. In some embodiments, the present invention enables an individual and/or entity (e.g. customer and/or consumer) to quickly search for, match and/or identify trustworthy service provider listed in the order of their customer ratings. In some embodiments, the present invention provides no legal opportunity for a service provider to buy its way to the top of ranking.

In some embodiments, the present invention allows for a Vertical Director opportunity to qualify a service provider who have or will recruit substantial expertise in their vertical industry and who demonstrate the highest standards of integrity, ethics and professionalism. In some embodiments, the Vertical Director must provide WZG with references, complete the present invention's Personal Information Form (PIF), complete the WZ character assessment process and/or provide WZG with other background information. In some embodiments, the Vertical Director must be an individual/ entity of excellent moral character and integrity who has sufficient skill, aptitude, industry qualifications and experience, service provider ability and financial resources to serve as a Vertical Director and represent WGZ. Such a determination may be made through predictive analytics using questionnaires and other third party information. In some embodiments, there are approximately 180 vertical industries (for example, the plumbing industry, legal industry, chiropractic industry, etc.). In some embodiments, a Vertical Director is responsible for developing a vertical industry, such as:

Increase the number of service providers in the specific industry who become registered service providers;
Promote WGZ service provider support products and services to registered service providers in specific industry;
Develop and define the integrity standards and qualifications that must be satisfied by registered service providers in specific industry;
Monitor registered service providers in specific industry to ensure compliance with these transparency and integrity standards;
Increase public awareness of the WGZ integrity search engine; and/or
Increase the number of consumers using the WGZ search engine.

In some embodiments, at least one of the above Vertical Director's responsibilities forms "present invention Project".

In some embodiments, the Vertical Director gets a commission based, at least in part, on the gross revenues (less any applicable taxes) that it generates from at least one of:

Paid searches within the specific industry;
Subscriptions by service providers in the specific industry; and/or
Sales of WGZ business support products and services to service providers within specific industry.

In some embodiments, the Vertical Director receives revenues only from purchases made by: (i) service providers in specific industry who have registered with WGZ using a service provider address located within the United States or Canada (i.e., "qualifying" registered service providers); and/ or (ii) consumers who conduct searches (or utilize other features) pertaining to qualifying registered service providers.

In some embodiments, the Vertical Director's target market includes: (i) members of the general public who seek goods or services from service providers within specific industry; and/ or (ii) service providers within specific industry. In some embodiments, the present invention returns search results having service provider organized in the order of their rating as a default search setting, and combines it with a numerical scale that simplifies the search.

In some embodiments, the present invention local searches are free to consumers. In some embodiments, rating system is numerical, e.g. 1-100, plus an optional comment field. In some embodiments, service provider are listed & rated on the present invention site for free. In some embodiments, the present invention provides a listing of X service provider per page (e.g. 5, 10, 15, 20, 25 and/or more) in response to a category search; service providers are listed in customer rated order, highest to lowest (default). In some embodiments, other sorts available: by distance, # of ratings, filtered by claimed service provider, etc. In some embodiments, the present invention offers no sponsored ads, nor any way for the service provider to get listed above another service provider with a higher rating. In some embodiments, the service provider' rating alone determines the order in which it will appear. In some embodiments, service providers have the option of participating in a leads program, where a "quick connect" option is provided to the searching consumer, allowing the consumer to easily contact the selected service provider a default lead fee. In some embodiments, the present invention can charge for additional analytics reports & service provider improvement programs.

In some embodiments, the present invention does not even allow discounts coupons, which may change the perception of a service provider.

In some embodiments, the present invention utilizes scientific rating system. The present invention is a numeric, scientific rating system (e.g. 1-100, 1-50, 1-25 and a lower number above 0). This is in contrast to any 5 star rating system, and/or to A-F system. In some embodiments, the present invention allows to eliminate a confusion that results when service providers are sorted in rated order, it becomes very difficult to differentiate between all the A's /5 star ratings utilized by methodologies other than the instant invention's. Consequently, in some embodiments, the present invention's combination of a default listing by rating, along with a numerical scale of e.g. 1-100 makes the consumers search find a trusted service provider.

Advisory Council

In some embodiments, the WGZ allows for creation of a franchise advisory council(s) to provide suggestions to improve the Vertical Director system, including matters such as marketing, operations and new present invention product or service suggestions. In some embodiments, the franchise advisory council(s) can have the exclusive right to develop a selected industry within a selected territory. In some embodiments, the Vertical Director can have the exclusive right to receive commissions from the gross revenues (less any applicable taxes) that WZD generates within the United States and Canada from:

Paid searches within specific industry;

Subscriptions by service providers in specific industry; and/or

Sales of WGZ business support products and services to service providers within specific industry.

Examples of Illustrative Features in Accordance with Some Embodiments of the Present Invention "Mentoring" Service In some embodiments, the inventive systems and methods of the instant invention allow the "Top Rated" service providers to:

host webinars/seminars (e.g., not necessarily the franchisee); and/or raise overall industry ratings.

Coaching

In one embodiment, the inventive systems and methods of the instant invention provide consumer rated information that guides coaching. In another embodiment, based on questionnaire analytics of service provider, a coach, who also has been analyzed based on questionnaire analytics, is matched.

Price Charged to Service Providers

In one embodiment, the pricing is established based on number of "leads" that are generated (e.g. individual or entity that request to contact the service provider), such as, but not limited to:

a) email—direct links, and b) phone—direct links.

Various Examples of Illustrative Payment Plans Set-up For Charging Service Providers a) "Gold": 5 free leads/month—cost x dollars b) Platinum: —cost y dollars i) 10 free leads/month;

ii) advance analytics; and iii) CRM System

In some embodiments, the inventive systems and methods of the instant invention (e.g., WZG) can offer one or more of the following functionalities:

1) feedback;

2) statistical analysis;

3) objective analysis;

4) ratings are objective;

5) take responsibility;

6) service providers are coached on improve their rating; and/or any combination thereof.

Illustrative Matching System(s)

In some embodiments, the inventive systems and methods of the instant invention provide an ability to do a national score at a pricing model such as, but not limited to:

compare feature with X parameters (e.g., services, products)

WZG "NOW"

Pay a premium: available immediately

WGZ "Compare":

Pay: "buyer criteria match":

Matches X (e.g. 2, 3, 4, 5, and 6) consumer criteria (e.g., a basic personal profile (e.g., information generated based on questionnaire having twenty of less questions)) with one or more service providers;

WGZ "personality match":

additional consumer profile matching.

In some embodiments, the present invention can offer an up-sale by utilizing recommend functionality such as a feature of "other products you may be interested" (e.g. individual and/or entity request for a match for service X & present invention recommends to purchase other products.

In another embodiment, the present invention relates to the inventive systems and methods of the instant invention that notify individuals and/or entities that regularly/periodically and/or ad hoc-basis provides updated ratings of service providers.

Exemplary Information about a Service Provider

Background Information of a service provider:

provided by Service provider and/or provided by individual and/or entity provided by third party source.

Exemplary Enhanced Business Information

In some embodiments, only business can edit/add the enhanced business information (e.g., information that is not publicly available about the business).

"Two Way" Matching Engine

In one embodiment, a service provider can use the matching engine(s) programmed in accordance with the inventive systems and methods of the instant invention to determine whether the proper individual and/or entity is matched—for example, allowing the service provider to minimize a chance of having a "client from hell."

In another embodiment, the matching engine(s) programmed in accordance with the inventive systems and methods of the instant invention can use information from social networks as additional input.

Illustrative Examples of Rules-Based Systems and Methods of the Instant Invention:

"Overall Rating" (e.g., aggregate of all ratings)—following illustrative examples:

a) Range (from lowest to highest)

b) average (e.g. weighted average, arithmetic average)

c) individual scores: —low and high.

Illustrative Examples of Verification

In one embodiment, the individual and/or entity must be verified in order to evaluate the service provider (e.g., to minimize a chance of "gaming the system"). In one embodiment, the individual and/or entity is verified by the individual and/or entity agreeing to the terms and conditions. In another example, the individual and/or entity is verified using social media verification. In some embodiments, the inventive systems and methods of the instant invention can utilize the verification that includes, but are not limited to:

Text mail verification email address verification

QR code {Trusted site}
Bar code {Trusted site}
Address {Trusted site}
Fax number {Trusted site}
Fingerprint {Trusted site}

Illustrative Examples of Anonymity

In some embodiments, the inventive systems and methods of the instant invention can utilize an encrypted site (e.g., encrypting every page). In one embodiment, although the individual and/or entity must be verified, the individual and/or entity can select the degree of anonymity (e.g. a user name, a real name (first and/or last), an email, or other identifications).

Illustrative Examples of how Information can Inputted in Accordance with Some Embodiments of the Instant Invntion Input to the system and method may include, but is not limited to, text, pictures, figures or video. For example, video and pictures may include: images of work performed by the service provider; images of the place of the service provider; images of the product of the service provider; and/or images of the service provider. Such a video may include 2D or 3D images.

Individual and/or entity (e.g. customer and/or consumer) is asked X questions (e.g. 10, 15, 20, 25 and/or more) before individual and/or entity can evaluate a service provider—also known as the pre-qualification step (e.g. by a text or video questionnaire).

In one embodiment, these X questions are generic for all individuals and/or entities.

In another embodiment, at least a portion of these X questions are customized based on the service provider segment.

Illustrative Examples of a Rating System in Accordance with Some Embodiments of the Instant Invention In some embodiments, the inventive systems and methods of the instant invention provide an objective rating system, using a statistical score based on a plurality of individuals and/or entities (e.g. customers and/or consumers), being determined by asking X questions and then applying predictive analytics.

In one embodiment, the rule base system allows the individual and/or entity to evaluate Y service providers (e.g. 1, 2, 3, 4, 5 and/or more) per time period (e.g., day, month and/or year).

In another embodiment, the inventive systems and methods of the instant invention can utilize rules that allow an individual and/or entity to provide a remedial review (e.g., the remedial review can replace the previously provided review, or being given more weight (in total score or per rating category) to Y service providers (e.g. 1, 2, 3, 4, 5 and/or more) per time period (e.g. day, month and/or year).

As shown in the below figures, in addition to an overall rating, X additional criteria are displayed (e.g. 4, 5, 6, 7, 8, 9 or more criteria)—for example, service, value, ethics, competence, environment, price, any other suitable criteria, and any combination thereof.

FIGS. 1-36 illustrate features in accordance with some embodiments of the instant invention.

Illustrative Examples of Service Provider (SP) and Consumer Offerings in Accordance with Some Embodiments of the Instant Invention Geographic categories:
Local:
SP's within a 20 mile (32 km) radius
Regional:
SP's within a 200 mile (322 km) radius
National:
All SP's within the U.S. & Canada WZG "Search"

In some embodiments, the term "WZG Search" is directed to the scope of Service Providers to be searched and presented in search results:

WZG Search (local)—default: search results based on all SP's listed in the category within a 20 mile radius;

WZG Search (regional): search results based on all SP's listed in the category within a 200 mile radius;

WZG Search (national): search results based on all SP's listed in the category within the US & Canada.

WZG "Now":

In some embodiments, the term "WZG Search" is directed to, for example, "Immediate Service" or "Jump to the front of the line," where SP's who have the "Now"/"Priority"/"First" designator, agreed to accept WZG consumers on an emergency basis (definition of emergency basis may vary by industry (e.g., 2 hours, 2 days, or 2 weeks).

In some embodiments, Service Providers (SPs) who participate in the "WZG Now" program will have a special emblem with their listing.

In some embodiments, a functionality of "WZG Now Sort" can be utilized by consumer to also request a list of WZG SPs who offer "Now" service.

WZG "Deal":

In some embodiments, can be utilized for a coupon offering/special price "deal"—SP's who participate in the Gold or Platinum plan have the option of offering a discount or special offer coupon.

In some embodiments, Service Providers who participate in the WZG Deal program can have a special emblem with their listing.

In some embodiments, WZG engine(s) in accordance with some embodiments of the instant invention can automatically take X % commission.

WZG Deal Sort

In some embodiments, consumers may also request a list of WZG SPs who offer "Deal" service.

WZG "Leads/Compare":

there can be at least two sources of providing leads to SPs, both initiated when the consumer's search does not provide an obvious choice. In some embodiments, the consumer may then either select:

i. A match based on the consumer's buying criteria; or ii. To have up to 3 SP's to compare, and to be contacted by/receive a quote from those 3 SP's.

Buyer Criteria Match

In some embodiments, the inventive electronic matching engine systems in accordance with the instant invention can match consumer to SP based on the buyer's ranked criteria; and does not require consumer or SP to complete any type of assessment or profile. For example, but not limited to, matching based on price, proximity, competence, provider's background, certifications, years of experience, biographic data (preferred SP gender, age, ethnicity, etc.).

In some embodiments, the consumer can be forced to really prioritize their criteria (i.e., to complete their Buyer's Profile)

In some embodiments, Buyer's Criteria can vary by vertical. For example, for some services, the buyer may be price sensitive, for others, proximity might be most important or environment (ambiance) & service might be the highest priority.

In some embodiments, different definitions of the criteria can be varied based on industry type. Example, the term "environment" for a restaurant has many nuances (some like noisy, raucous environments, some want quiet with white table cloths); likewise competence mean for a restaurant can identify food quality, taste, etc.

In some embodiments, the rating systems in accordance with some embodiments of the instant invention utilize the SP background data collection (e.g., gender, etc.), depending on what criteria we allow. In some embodiments, the rating systems in accordance with some embodiments of the instant invention are able to continuously and automatically learn/update the "Buyer's Criteria" searching/ranking as more specific information about the service providers has been received.

In some embodiments, WZG's "Compare" functionality requires a SP to opt in electronically to the WZG's "Leads" program. In some embodiments, whether using the WZGs "Compare" or WZG's "Buyer Criteria" match option, the consumer is automatically presented with a list of WZG's SPs who participate in the WZG's "Leads" Leads program; which requires that they pay a "lead fee" for the lead. In some embodiments, the matching engines of the instant inventions automatically notify SP(s) that the consumer has either specifically selected them or been matched to them, and agree(s) to pay a lead fee ($XX typical) for the consumer's contact information & project description, which can vary by category.

In some embodiments, SPs who participate in the Buyer Criteria Match program can be charged $X-$Y lead fee. In some embodiments, there can be a maximum of 3 matches provided as a result of this matching algorithm.

In some embodiments, consumers also pay $XX.XX for a Buyer Criteria match search.

Compare Functionality

Figure 81:
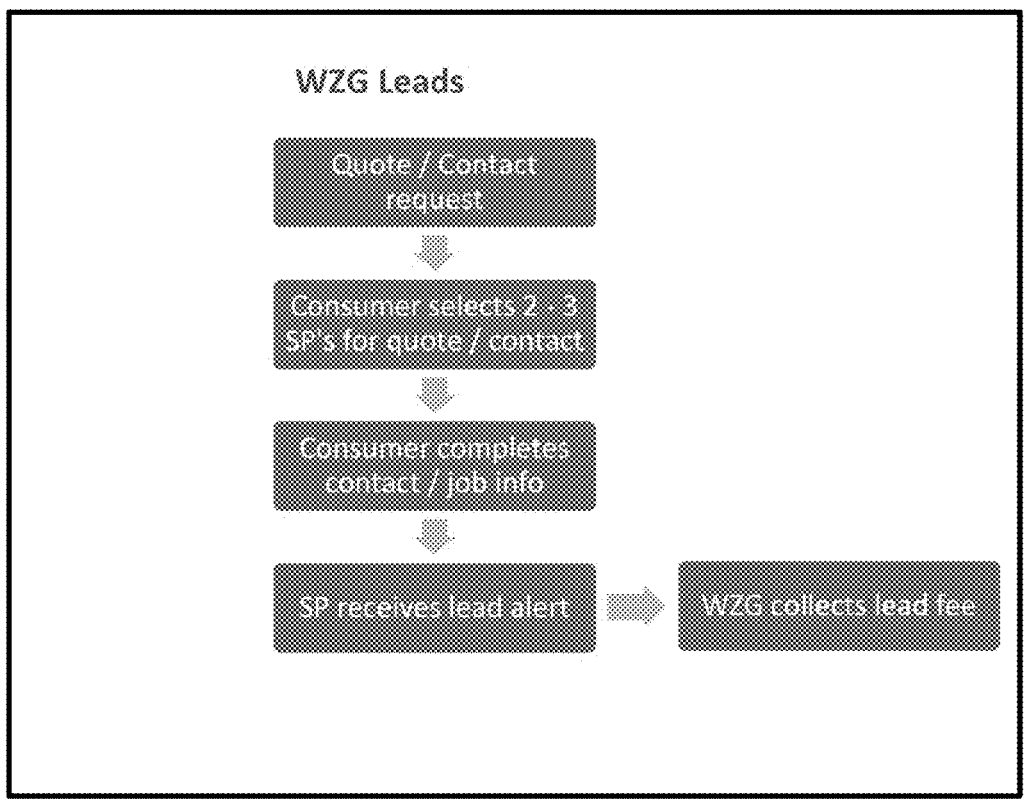
FIG. 81 is a flowchart illustrating certain aspects of some embodiments of the instant invention.
Figure 87:
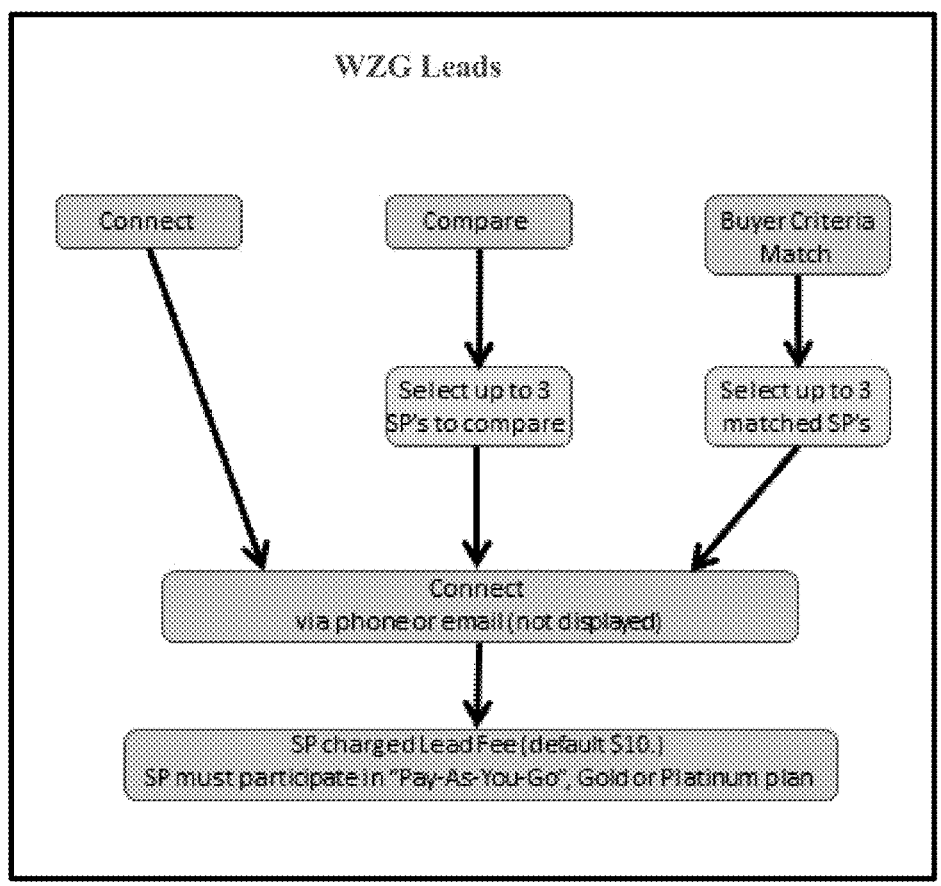
FIG. 87 is a flowchart illustrating certain aspects of some embodiments of the instant invention.

In some embodiments, as illustrated in FIGS. 81 and 87, the Compare Functionality refers to a specific consumer request for contact or a quote from multiple SPs (e.g., up to 3, 5, 10). In some embodiments, SPs who participate in the Gold or Platinum plan have the option of participating in the "Leads" program, and have to respond to consumer requests.

In some embodiments, Service Providers who participate in the WZG Leads program can have a special emblem with their listing.

In some embodiments, the inventive engines/systems of the instant invention (e.g., WZG) can charges a flat fee for the lead ($X-$XX.). In some embodiments, the charges per lead can vary based at least in part on a type of industry (e.g., higher for Health/Medical category). In some embodiments, fee can also vary by category.

WZG "Match" . . . "WhoZaBest4me"

In some embodiments, "WhoZaBest4me" identifies the matching process(es) in accordance with the instant invention. In some embodiments, the "WhoZaBest4me" functionality can refer to matching consumers with SPs. In some embodiments, there can be two levels of personality matching algorithms under the WhoZabest4me umbrella. In some embodiments, the consumer can choose one or the other, not both.

In some embodiments, the levels of personality matching can match a consumer to a SP based on personality fit. In some embodiments, the personality matching requires both consumer and SP to have completed a personality psychometric assessment. In some embodiments, there can be at least two types of personality matching: coarse and fine match options:

"Coarse match" is based on a personality "mini-assessment" (e.g., 10 to 30 questions, 10 to 100 questions, etc.)

"Fine match" is based on a full psychometric profile (e.g., 11-500 questions, 31-500 questions, 101-500 questions, etc.).

In some embodiments, the Consumer's Screen and/or Profile Assessments could be used/may be required in other suitable situations (e.g., employee matching to Employers).

In some embodiments, the SP's Screen and/or Profile Assessments could be used/may be required in other situations (Coaching, Recruiting, Promoting, etc.).

WZG "Integrity Certified"

In some embodiments, WZG Integrity Certified refers to Service Providers who have completed and passed the WZG Integrity Certification process which can entail at least:

WZG Executive Integrity assessment—an individual self-assessment for business owners/company executives;

WZG Organization Integrity assessment—designed for all employees to complete anonymously reports rating for following 6 company levels:

Executive/Management

Sales

Office Admin/Staff

Technical

Other

All.

In some embodiments, the inventive computer systems of instant invention automatically establish a policy for who has to complete which assessments:

a sole proprietor—WZG Executive Integrity Assessment for large companies (>x employees)—Organizational Integrity assessment and/or Executive Integrity assessment For mid-sized companies (>1, <x employees).

In some embodiments, those SP's who complete and pass the required assessments will be "Integrity Certified" and receive a special emblem wherever their listing appears.

In some embodiments, the inventive computer systems of instant invention can give a preference for the integrity certified SP's. In some embodiments, the inventive computer systems of instant invention offer "Integrity Certified" as an option for the "Provider Profile" class of match.

Additional Analytics

Business Analytics—Basic: refers to a report provided to SP's which reports # of views & # of leads generated in their category, along with the # of clicks they received: "Lost Opportunity Report."

Competitive Analysis/Industry Segment Reports: Gold & platinum participants have access to analysis of how they compare with the other companies in their category, as well as how their customer ratings are trending.

Advanced Market Research Data: in some embodiments, the inventive computer engines of instant invention can accumulate and compile information relative to buyer's search and/or shopping patterns, as well as performance data on successful offerings. In some embodiments, the inventive computer systems of instant invention allow to share this data with platinum members.

Mobile App Access: In some embodiments, the inventive computer systems of instant invention can provide a mobile app to gold & platinum members which will notify them of new ratings and new Request for Contact/Quote (WZG Leads).

Webinars Types

Generic (Included in the Platinum Package and/or Gold Packages): Businesses will have access to a variety of webinars on business success from dealing with existing customers to finding new customers.

Industry Specific: These will be vertical specific on best practices for a particular vertical e.g. Chiropractic or Auto Industry. In some embodiments, Vertical Directors may assist in developing these best practices webinars for their industry or provide WZG with access to existing premium quality webinars for their industry. In some embodiments, price may include a discount for platinum members.

FIGS. 82 and 88 show an illustrative pricing plan for SPs in accordance with some embodiments of the instant invention.

FIGS. 83-84 show illustrative pricing plans for Customers in accordance with some embodiments of the instant invention.

FIG. 85 shows an illustrative sample of Service Provider's questionnaire in the medical/healthcare industry.

FIG. 89A-89B show an illustrative sample of Consumer's prequalification and rating questionnaires.

Illustrative Rating Questions and Exemplary Rating Engine's Rules

In some embodiments, the inventive electronic engine systems and methods of the instant invention can utilize at least the following prequalifying questions for consumers as a condition for rating a Service Provider:

Have you done business with this provider within the last 3 years?

When was the last service provided?

What service was provided?

Standard Rating Questions will cover the following categories:

Service Quality
Competence
Environment
Value
Ethics
Price
Review of Criteria

In some embodiments, the inventive electronic engine systems and methods of the instant invention can require the consumer to agree to at least the following terms or their substantively similar versions:

"You are expected to understand the standards of performance most important within your industry. You are responsible for reviewing and modifying/customizing the rating questions to better fit the industry needs."

Illustrative Activities Associated with Franchisees and Advisory Boards Utilized by the Inventive Electronic Engine/Computer Systems and Computer-Implemented Methods of the Instant Invention In some embodiments, FIGS. 37-80

Financial Projections

FIGS. 86A-86B show illustrative financial projections for operations of an exemplary franchisee. In some embodiments, the inventive electronic engine/computer systems and computer-implemented methods of the instant invention calculate, update, and/or track in real-time franchisee's goals and/or performance by franchisee of those financial projections.

In some embodiments, the inventive engines of the instant invention can operate as a subscription service to which both customers and service providers subscribe to. In some embodiments, there can be various subscription levels that can be based on, but not limited to: usage and/or price. In some embodiments, there can be various subscription levels that are not non-usage/non-price based, but based on charging for access during a predetermined time period which can be periodic (e.g., monthly, annual, etc.). In some embodiments, the inventive engines of the instant invention can operate a subscription service based on a plurality of membership rules such as, but not limited to, identified in Table 1.

TABLE 1

Membership

Before posting any content on WhoZaGood.com, you must register as either a consumer member or a service provider member. While basic search features of the Website are available to the public without registration, certain enhanced search features require membership and payment of the applicable fee. Business membership is free. In addition to free basic membership for service providers, WhoZaGood offers a Pay-As-You-Go Plan, Gold Plan and a Platinum Plan for a fee. If you register as a service provider, whether under the basic plan or a paid upgrade, you are required to provide complete and accurate disclosure of the information requested in the application form. To create or update a business membership account, you must be the owner or an authorized employee or representative of the business. A business may not have more than one listing unless expressly authorized by WhoZaGood.
If WhoZaGood determines, in its sole discretion, that you have violated any provision of these Terms, it will terminate your membership. Membership fees are non-refundable even if membership is terminated before the end of the paid-for term. Membership fees are non-refundable even if you discontinue your membership before the period that you paid for has expired. WhoZaGood reserves the right to increase membership fees at any time with no advance notice.
When creating your account, you must provide accurate and complete information. You are solely responsible for the activity that occurs on your account, whether expressly authorized by you or not. You are responsible for keeping your account password secure. You may change your password at any time by updating your Account Profile. In addition, you agree to immediately notify WhoZaGood of any unauthorized use of your password or account or any other breach of security. WhoZaGood cannot and will not be liable for any loss or damage arising from your failure to secure your account and password, including but not limited to selecting a password that is easily compromised. You are not allowed to use another customer's account without that customer's permission. Unless previously notified otherwise, we will assume that anyone visiting the Website with a correct account and password combination is an authorized user of that account.
By registering with WhoZaGood, you represent that you are of legal age and capacity to enter into a binding contract and are not a person barred by any laws from using the Website. You agree to provide true, accurate, current and complete information about yourself in all required fields of the registration form. If any of your information changes, you agree to update your registration information as soon as possible. If we have reason to suspect that your registration information is not complete, current, or accurate, or that you have otherwise violated this Agreement, your account will be subject to suspension or termination, in our sole discretion, and you may be barred from using the Website.

In some embodiments, the inventive electronic engine systems and methods of the instant invention can require to receive input and/or regular reviews by an Advisory Board.

In some embodiments, the inventive electronic engine systems and methods of the instant invention can allow a franchisee to create a board of advisers from among the leaders within a particular industry. In some embodiments, the inventive electronic engine systems and methods of the instant invention can require a franchisee to establish a strategic advisory board within a predetermined time period (e.g., 90 days) after becoming the franchisee. In some embodiments, the inventive electronic engine systems and methods of the instant invention, the advisory board can include between 2 to 10 individuals that hold positions of respect and influence in your industry (e.g., each has one of highest mentioning in industry publications, each has one of most number of speaking invitations, each has one of the highest income, etc.)

In some embodiments, the inventive electronic engine systems and methods of the instant invention, the advisory board can include between 4 and 6 individuals that hold positions of respect and influence in your industry.

In some embodiments, the inventive electronic engine systems and methods of the instant invention screen candidates from advisory board based on particular requirements such as, but not limited to:

1) one board member must be a Social Media Marketing expert, and 2) one board member must be selected by the inventive engines of the instant invention.

In some embodiments, the inventive electronic engine systems and methods of the instant invention are configured to confirm that Advisory Boards are targeted to specific markets and/or industries, and track how Advisory Boards' performance of a plurality of the following objectives, but not limited to:
- develop and define the integrity standards for the service providers in an industry;
- establish/finalize SP profile;
- establish/finalize consumer rating questions;
- establish/finalize consumer profile;
- review/Approve WZG paid search pricing recommendations;
- review/Support financial projections;
- review decisions for SP removal from WZG site (e.g., violations, appeals, etc); and
- develop and execute a marketing plan to build the WZG brand within the industry.

In some embodiments, the inventive electronic engine systems and methods of the instant invention are configured to quantifiably confirm, based on pre-determined metrics, that Advisory Boards' members meet a plurality of characteristics/Traits such as, but not limited to:

1) integrity—not only possess, but motivated to bring it back to industry (e.g., metrics—peer review rating, etc.), 2) leadership skills (e.g., metrics—a number of senior management positions held, etc.), 3) transparency (e.g., metrics—a number of consumer complaints, criminal investigations, etc.), 4) communication skills (e.g., metrics—a number of public speaking engagements per a time period), 5) results orientation (e.g., metrics—a number of times reached announced goals), 6) multi-tasking (e.g., metrics—how many positions engaged at the same time), 7) time management (e.g., metrics—how many positions engaged at the same time), 8) persuasiveness (e.g., metrics—conducting/analyzing peer questionnaires, etc.), 9) strategic thinking (e.g., metrics—a number of industry trends forecasted/participated in), and 10) influence—well-connected in the industry (e.g., metrics—a number of industry connections on Linkedin, etc).

Illustrative Examples of Screening of Franchisees in Accordance with the Instant Invention In some embodiments, the inventive electronic engine systems and methods of the instant invention are configured to screen franchisees based on at least the following information, but not limited to, which they obtain/received from franchisees and/or independently from third party sources:

1) Personal Identifying Information
- background information (e.g., name, social security#, residential history, financial history, educational history, employment history, other business activities (e.g., #hours engaged, duties, non-compete restrictions, employment eligibility in a particular locality, etc.)
- criminal history
- prior regulatory issues
- bankruptcy.

In some embodiments, the inventive electronic engine systems and methods of the instant invention are configured to obtain from a potential franchisee candidate a declaration that all information provided is truthful and/or to the best on the knowledge.

In some embodiments, the instant invention provides for a method being implemented by an improved computer system programmed for searching in accordance with the method, including at least steps of: obtaining, by a specially programmed computer matching system, business information regarding a plurality of businesses and a plurality of offerings offered by the plurality of businesses; where: 1) the plurality of offerings comprises services, products, or both; 2) the business information comprises: i) information about each business being submitted by such business in accordance with at least the following conditions agreed to by each business: a) the information being submitted is complete, b) the information being submitted is truthful, and c) the information being submitted is accurate; ii) business profile information corresponding to one of the following business profile information tier: a) a first business profile information tier having responses to a Y(1) number of psychometric questions displayed to at least one representative of such business, b) a second business profile information tier having responses to a Y(2) number of psychometric questions displayed to the at least one representative of such business, c) a third tier personal consumer profile information tier having responses to a Y(3) number of psychometric questions displayed to the at least one representative of such business, and where the Y(1) number being less than the Y(2) number and the Y(2) number being less than the Y(3) number; where the plurality of business comprises at least one thousand business; storing, by the specially programmed computer matching system, in at least one database, the business information regarding the plurality of businesses and the plurality of offerings offered by the plurality of businesses; generating, by the specially programmed computer matching system, a rating score for each business based on consumer ratings submitted by a plurality of consumers, where the consumer ratings evaluate each business in at least the following rating categories: 1) service, 2) value, 3) ethics, 4) competence, 5) environment, and 6) price; associating, by the specially programmed computer matching system, in the at least one database, each business with the rating score; causing, by the specially programmed computer matching system, to concurrently display at least one first graphical user interface from a plurality of first graphical user interfaces to the plurality of consumers, where the at least one first graphical user interface of the plurality of first graphical user interfaces is configured to obtain from each consumer from the plurality of consumers at least: i) personal identifying information of such consumer to be validated prior to conducting matching for such consumer; ii) personal consumer profile information corresponding to one of the following personal consumer profile information tiers: a) a first personal consumer profile information tier having responses to a X(1) number of personality psychometric questions displayed to such consumer, b) a second personal consumer profile information tier having responses to a X(2) number of personality psychometric questions displayed to such consumer, c) a third personal consumer profile information tier having responses to a X(3) number of personality psychometric questions displayed to such consumer, and d) a tier personal consumer profile information fourth having responses to a X(4) number of personality psychometric questions displayed to such consumer, where the X(1) number being less than the X(2) number, the X(2) number being less than the X(3) number, and the X(3) number being less than the X(4) number; (iii) at least one business identifying matching parameter, identifying at least one identifying characteristic associated with at least one of: 1) at least one business, offering at least one service, at least one product, or both, being desired by such consumer, 2) the at least one service, the at least one product, or both, being desired by such consumer, and 3) a combination of thereof; iv) at least one geographic indication, identifying at least one geographic location associated with the at least one business offering at least one service, at least one product, or both, desired by such consumer; v) a plurality of ranked filtering criteria, where the ranked filtering criteria being: 1) selected from a plurality of evaluation criteria that are associated with one of: the at least one business, the at least one service, the at least one product, an any combination thereof, and are configured to allow such consumer to select the at least one business, the at least one service, the at least one product, an any combination thereof; and 2) ranked by such consumer from in an predetermined ranking order; vi) at least one rating score filtering parameter, identifying a particular rating score or a plurality of rating scores to be associated with the at least one business desired by such consumer; where the plurality of consumers comprises at least one thousand consumers; prior to conducting matching for a plurality of particular consumers, validating, by the specially programmed computer matching system, each particular consumer of the plurality of particular consumers based on the personal identifying information of such particular consumer; based on an outcome of the validating, concurrently matching, by the specially programmed computer matching system, each particular consumer of the plurality of particular consumers with at least one business based at least in part on: 1) the at least one business identifying matching parameter obtained from each particular consumer of the plurality of particular consumers, 2) the at least one geographic indication obtained from each particular consumer of the plurality of particular consumers, 3) the plurality of ranked filtering criteria obtained from each particular consumer of the plurality of particular consumers, 4) the personal consumer profile information, 5) the business profile information, and 6) the at least one rating score filtering parameter; and causing, by the specially programmed matching computer system, to concurrently output, utilizing at least one second graphical user interface from a plurality of second graphical user interfaces, each matching result of a plurality of matching results to each respective particular consumer of the plurality of particular consumers.

In some embodiments, the at least one second graphical user interface of the plurality of second graphical user interfaces is further configured to display: at least one urgency indication, identifying when a particular business, a particular service, a particular product, or any combination thereof, is available.

In some embodiments, the plurality of evaluation criteria comprise evaluation criteria selected from the group consisting of: 1) price, 2) geographic proximity to a particular location associated with such consumer, 3) professional competence of the at least one business, 4) background information of the at least one business, 5) certification of the at least one business, 6) experience of the at least one business, and 7) environment associated with the at least one business.

In some embodiments, the at least one second graphical user interface of the plurality of second graphical user interfaces is further configured to allow each respective particular consumer of the plurality of particular consumers to give a consent to at least one particular business identified in a particular match result to contact such respective particular consumer.

In some embodiments, the method further includes at least the steps of: upon each consent received each particular consumer, automatically and in-real time generating, by the specially programmed computer matching system, at least one lead to be transmitted to the least one particular business.

In some embodiments, the at least one second graphical user interface of the plurality of second graphical user interfaces is further configured to allow each respective particular consumer of the plurality of particular consumers to select, with the consent, an anonymity level, identifying how much of the personal information of such respective particular consumer to be disclosed to the at least one particular business.

In some embodiments, the business information further includes: iii) integrity certification status, identifying businesses that have passed at least one integrity certification assessment, where the at least one integrity certification assessment varies based at least in part on a size of each business; and where the at least one second graphical user interface of the plurality of second graphical user interfaces is further configured to display the integrity certification status associated with a particular business.

In some embodiments, the business information further includes: iii) integrity certification status, identifying businesses that have passed at least one integrity certification assessment, where the at least one integrity certification assessment varies based at least in part on a size of each business; and automatically notifying, by the specially programmed computer matching system, the at least one particular business about an obligation of the at least one particular business to respond the at least one lead.

In some embodiments, the concurrently matching each particular consumer of the plurality of particular consumers with the at least one business further includes: matching based on a plurality of matching levels; where the plurality of matching levels are selected from the group consisting of: 1) a first matching level, where the personal consumer profile corresponds to the first personal consumer profile information tier and the business profile information corresponds to the first business profile information tier; 2) a second matching level, where the personal consumer profile corresponds to one of: the second personal consumer profile information tier, the third personal consumer profile information tier, or the fourth personal consumer profile information tier; and the business profile information corresponds to one of the second business profile information tier and the third business profile information tier.

In some embodiments, the method can further includes: obtaining, by the specially programmed computer matching system, updated business information regarding one of the plurality of businesses, the plurality of offerings offered by the plurality of businesses, or both; and based at least in part on the updated business information, periodically modifying, by the specially programmed computer matching system, at least one of: 1) the plurality of ranked filtering criteria, 2) the plurality of evaluation criteria, 3) the rating score, and 4) any combination thereof.

In some embodiments, at least one consumer of the plurality of consumers is one of: i) an individual, and ii) a business that desires to obtain at least one service, at least one product, or both, from another business. In some embodiments, at least one business is an individual who offers for sale at least one service, at least one product, or both.

In some embodiments, the instant invention provides an improved computer system programmed for searching which includes at least the following components: at least one specialized computer machine, having: a non-transient memory having at least one region for storing particular computer executable program code; and at least one processor for executing the particular program code stored in the memory, where the particular program code is configured to at least perform the following operations upon the execution: obtaining business information regarding a plurality of businesses and a plurality of offerings offered by the plurality of businesses; where: 1) the plurality of offerings comprises services, products, or both; 2) the business information comprises: i) information about each business being submitted by such business in accordance with at least the following conditions agreed to by each business: a) the information being submitted is complete, b) the information being submitted is truthful, and c) the information being submitted is accurate; ii) business profile information corresponding to one of the following business profile information tier: a) a first business profile information tier having responses to a Y(1) number of psychometric questions displayed to at least one representative of such business, b) a second business profile information tier having responses to a Y(2) number of psychometric questions displayed to the at least one representative of such business, c) a third tier personal consumer profile information tier having responses to a Y(3) number of psychometric questions displayed to the at least one representative of such business, and where the Y(1) number being less than the Y(2) number and the Y(2) number being less than the Y(3) number; where the plurality of business comprises at least one thousand business; storing, in at least one database, the business information regarding the plurality of businesses and the plurality of offerings offered by the plurality of businesses; generating a rating score for each business based on consumer ratings submitted by a plurality of consumers, where the consumer ratings evaluate each business in at least the following rating categories: 1) service, 2) value, 3) ethics, 4) competence, 5) environment, and 6) price; associating in the at least one database, each business with the rating score; causing to concurrently display at least one first graphical user interface from a plurality of first graphical user interfaces to the plurality of consumers, where the at least one first graphical user interface of the plurality of first graphical user interfaces is configured to obtain from each consumer from the plurality of consumers at least: i) personal identifying information of such consumer to be validated prior to conducting matching for such consumer; ii) personal consumer profile information corresponding to one of the following personal consumer profile information tiers: a) a first personal consumer profile information tier having responses to a X(1) number of personality psychometric questions displayed to such consumer, b) a second personal consumer profile information tier having responses to a X(2) number of personality psychometric questions displayed to such consumer, c) a third personal consumer profile information tier having responses to a X(3) number of personality psychometric questions displayed to such consumer, and d) a tier personal consumer profile information fourth having responses to a X(4) number of personality psychometric questions displayed to such consumer, where the X(1) number being less than the X(2) number, the X(2) number being less than the X(3) number, and the X(3) number being less than the X(4) number; (iii) at least one business identifying matching parameter, identifying at least one identifying characteristic associated with at least one of: 1) at least one business, offering at least one service, at least one product, or both, being desired by such consumer, 2) the at least one service, the at least one product, or both, being desired by such consumer, and 3) a combination of thereof; iv) at least one geographic indication, identifying at least one geographic location associated with the at least one business offering at least one service, at least one product, or both, desired by such consumer; v) a plurality of ranked filtering criteria, where the ranked filtering criteria being: 1) selected from a plurality of evaluation criteria that are associated with one of: the at least one business, the at least one service, the at least one product, an any combination thereof, and are configured to allow such consumer to select the at least one business, the at least one service, the at least one product, an any combination thereof; and 2) ranked by such consumer from in an predetermined ranking order; vi) at least one rating score filtering parameter, identifying a particular rating score or a plurality of rating scores to be associated with the at least one business desired by such consumer; where the plurality of consumers comprises at least one thousand consumers; prior to conducting matching for a plurality of particular consumers, validating each particular consumer of the plurality of particular consumers based on the personal identifying information of such particular consumer; based on an outcome of the validating, concurrently matching each particular consumer of the plurality of particular consumers with at least one business based at least in part on: 1) the at least one business identifying matching parameter obtained from each particular consumer of the plurality of particular consumers, 2) the at least one geographic indication obtained from each particular consumer of the plurality of particular consumers, 3) the plurality of ranked filtering criteria obtained from each particular consumer of the plurality of particular consumers, 4) the personal consumer profile information, 5) the business profile information, and 6) the at least one rating score filtering parameter; and causing to concurrently output, utilizing at least one second graphical user interface from a plurality of second graphical user interfaces, each matching result of a plurality of matching results to each respective particular consumer of the plurality of particular consumers.

Illustrative Operating Environments

In some embodiments, the innovative programmed systems can be operated over other operating systems, such as, but not limited to, iOS and Android. In some embodiments, the innovative programmed systems can be native to a software platform and/or incorporate programming modules based at least in part on HTML5-based tools like PhoneGap or Sencha. In some embodiments, the innovative programmed systems can include modules that are programmed to provide intelligent dynamic promotion and advertising, mobile payments, augmented reality, etc.

Figure 11:
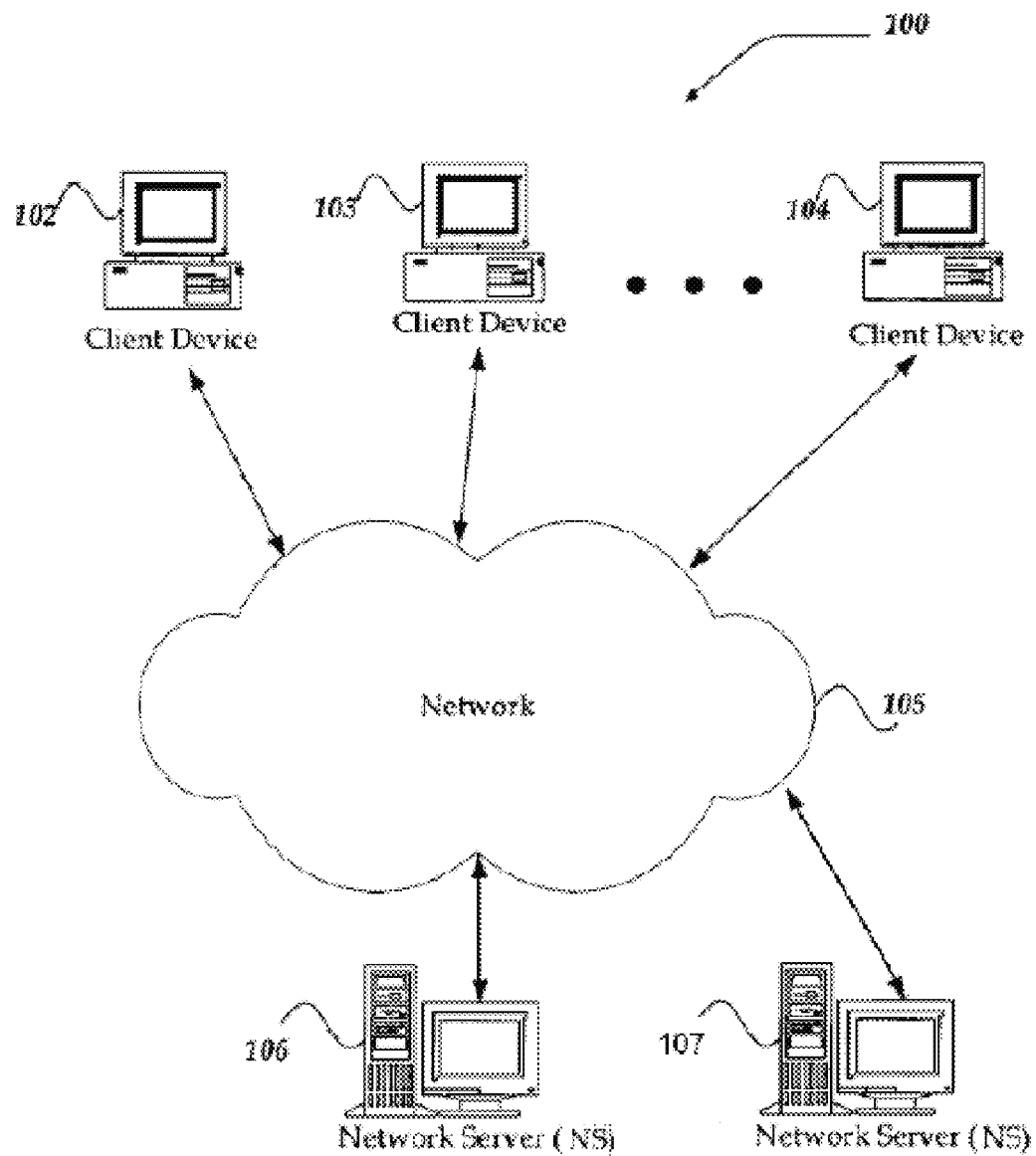

FIG. 11 illustrates one embodiment of an environment in which the present invention may operate. However, not all of these components may be required to practice the invention, and variations in the arrangement and type of the components may be made without departing from the spirit or scope of the invention. In some embodiment, the inventive systems can host a large number of members (e.g., at least 1,000, at least 10,000; at least 100,000; at least 1,000,000) and/or concurrent transactions (e.g., at least 1,000; at least 10,000; at least 100,000; at least 1,000,000). In other embodiments, the inventive systems are based on a scalable computer and network architecture that incorporates varies strategies for assessing the data, caching, searching, and database connection pooling. An example of the scalable architecture is an architecture that is capable of operating multiple servers.

In some embodiments, members of the inventive computer system 102-104 (e.g. user (e.g., individuals, businesses, etc.) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java or .Net.

In embodiments, member devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 may be configured to couple one computing device to another computing device to enable them to communicate. In embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 12:
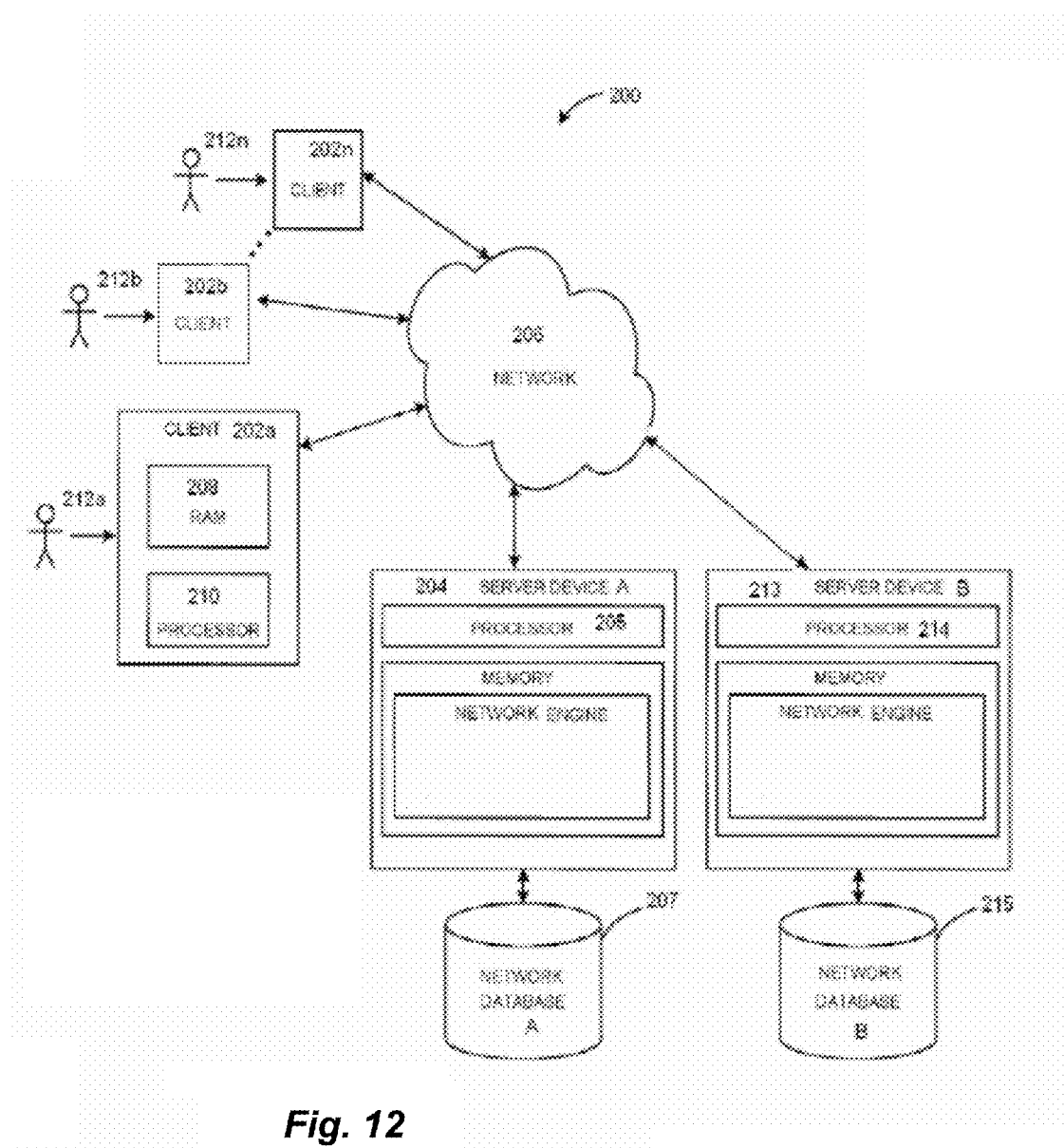
Figure 13:
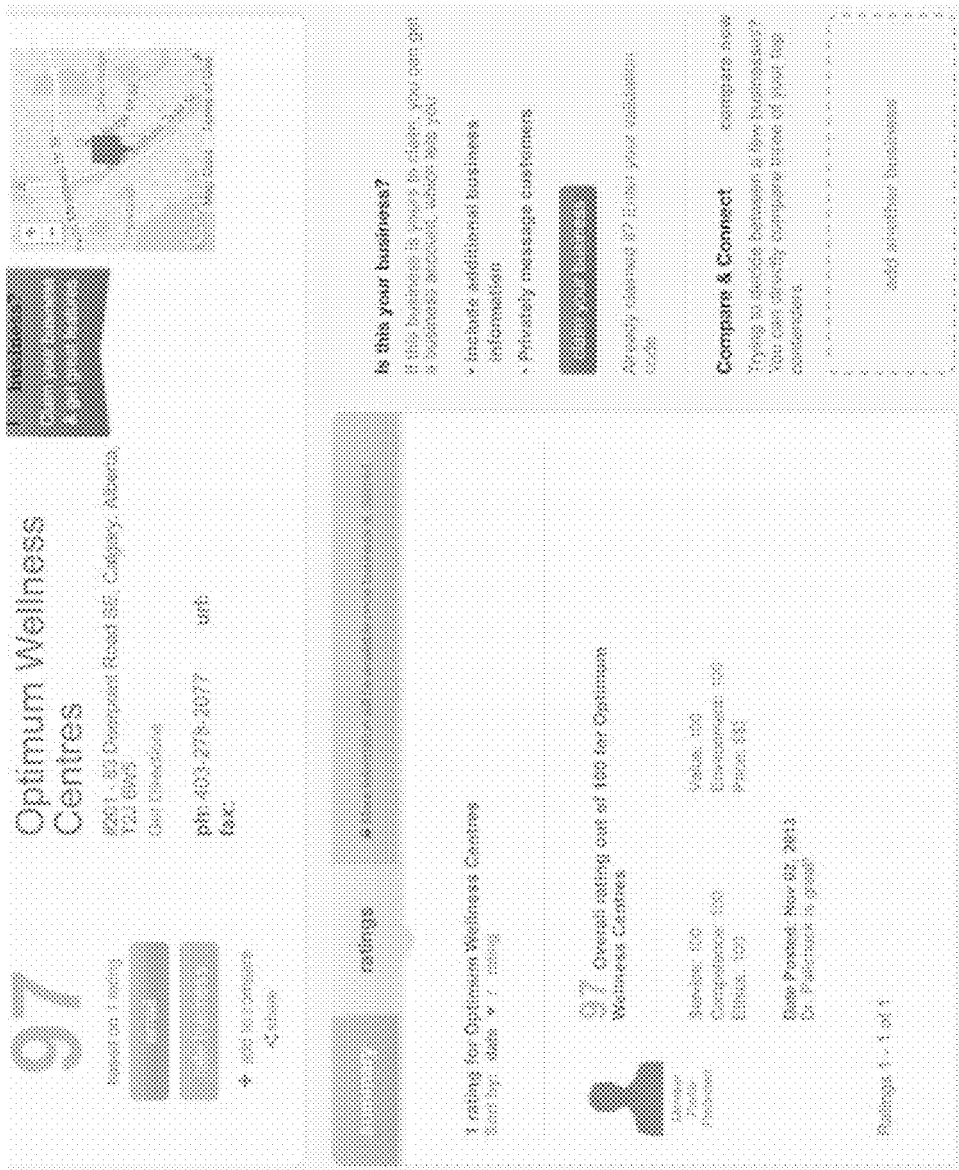
Figure 14:
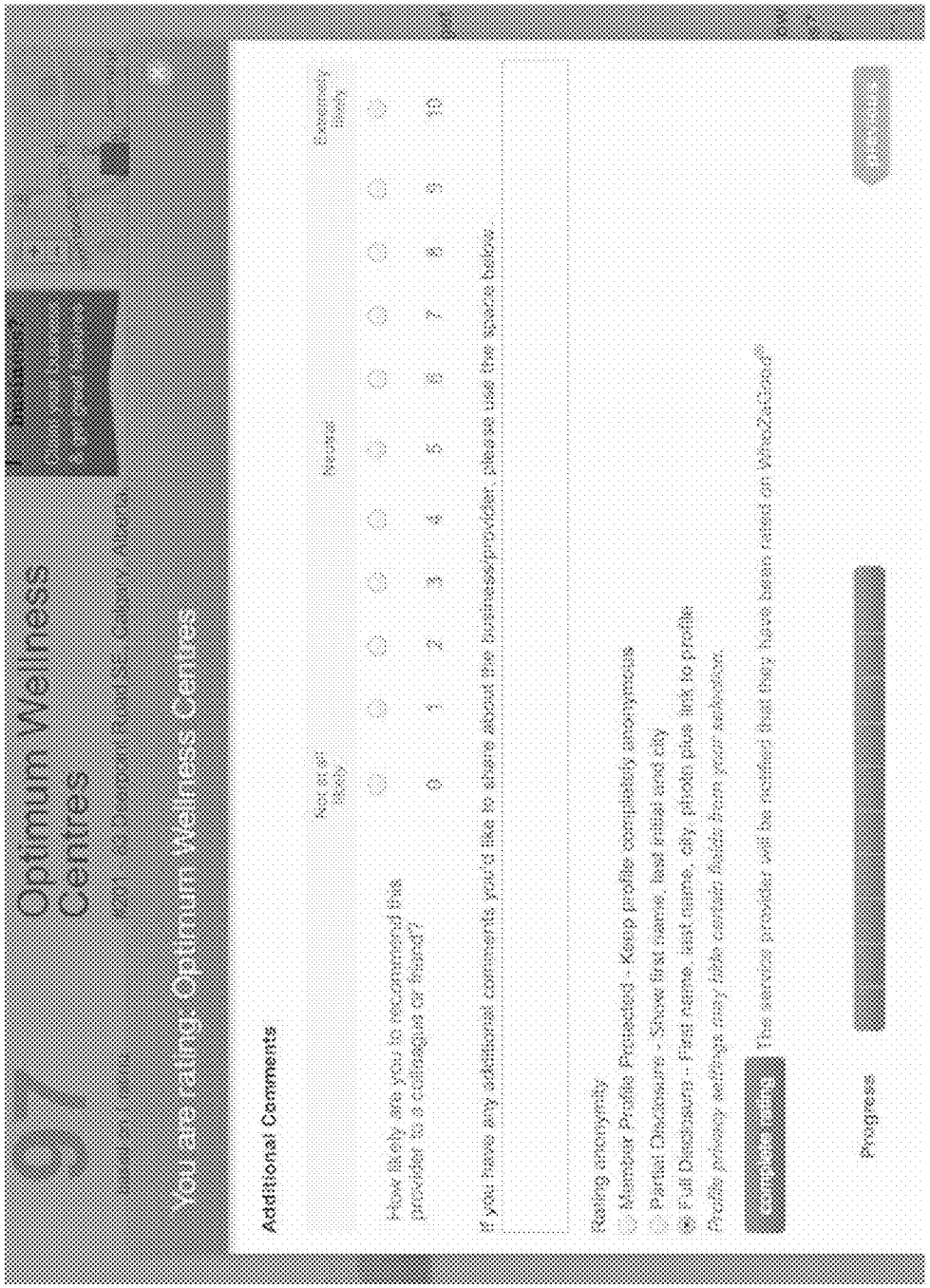
Figure 15:
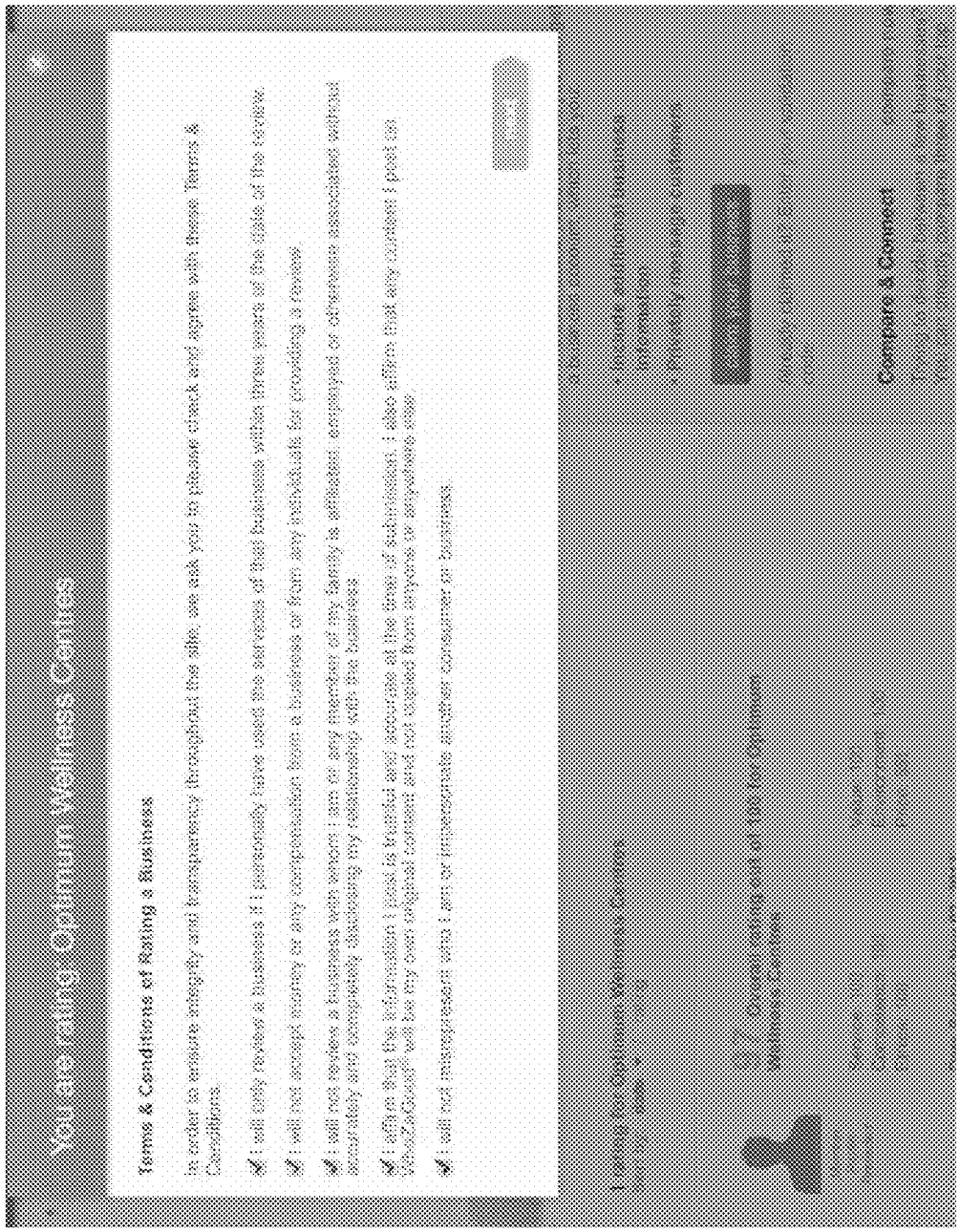
Figure 16:
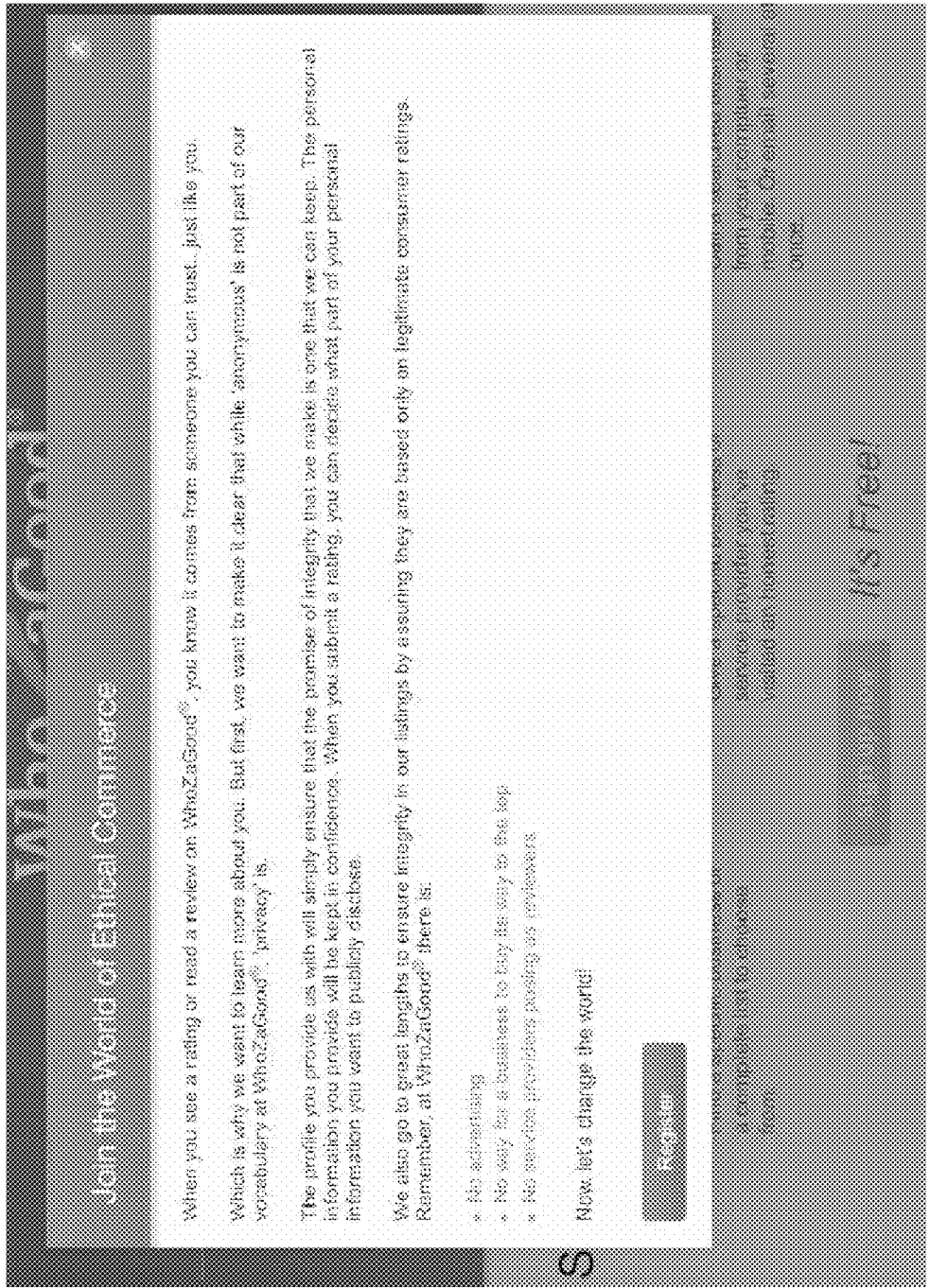
Figure 18:
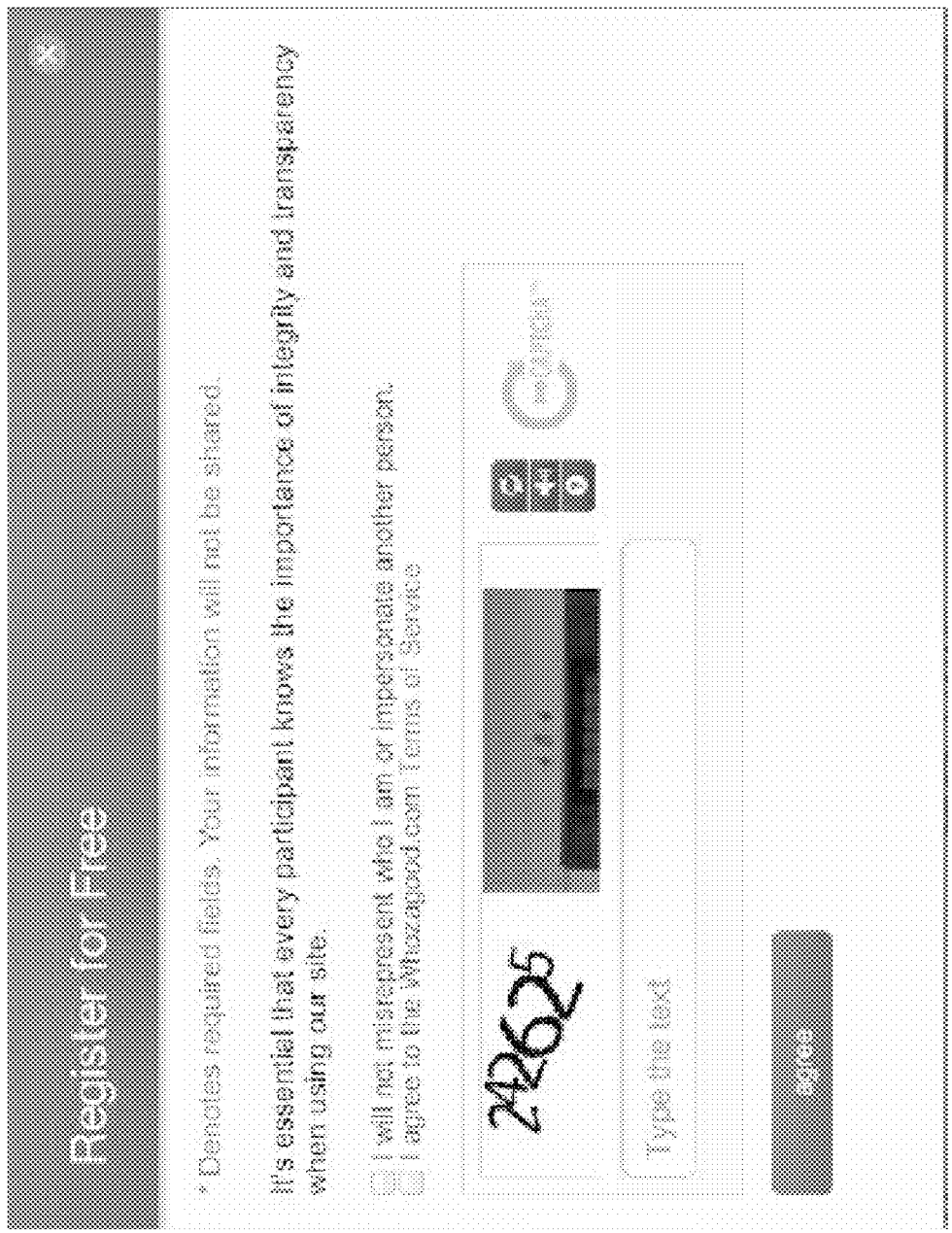
Figure 19:
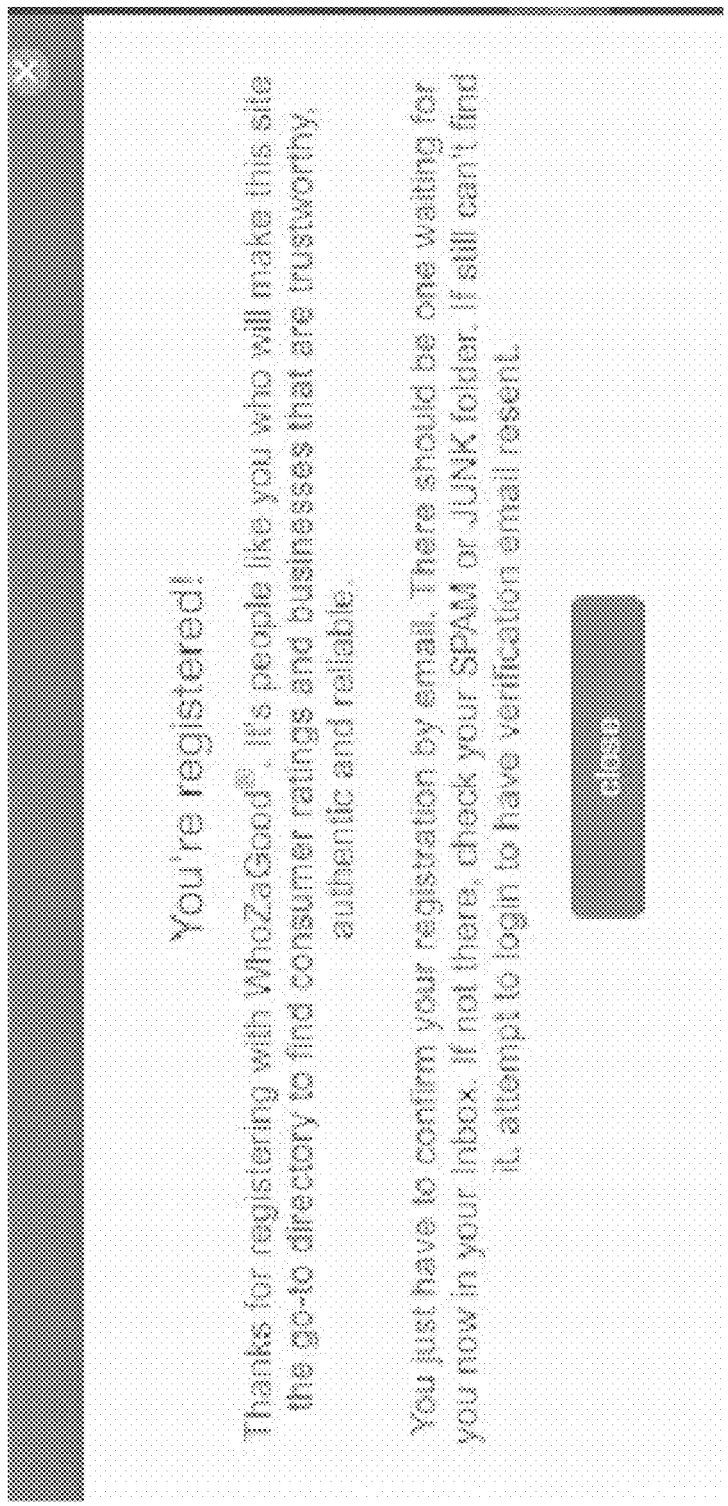
Figure 20:
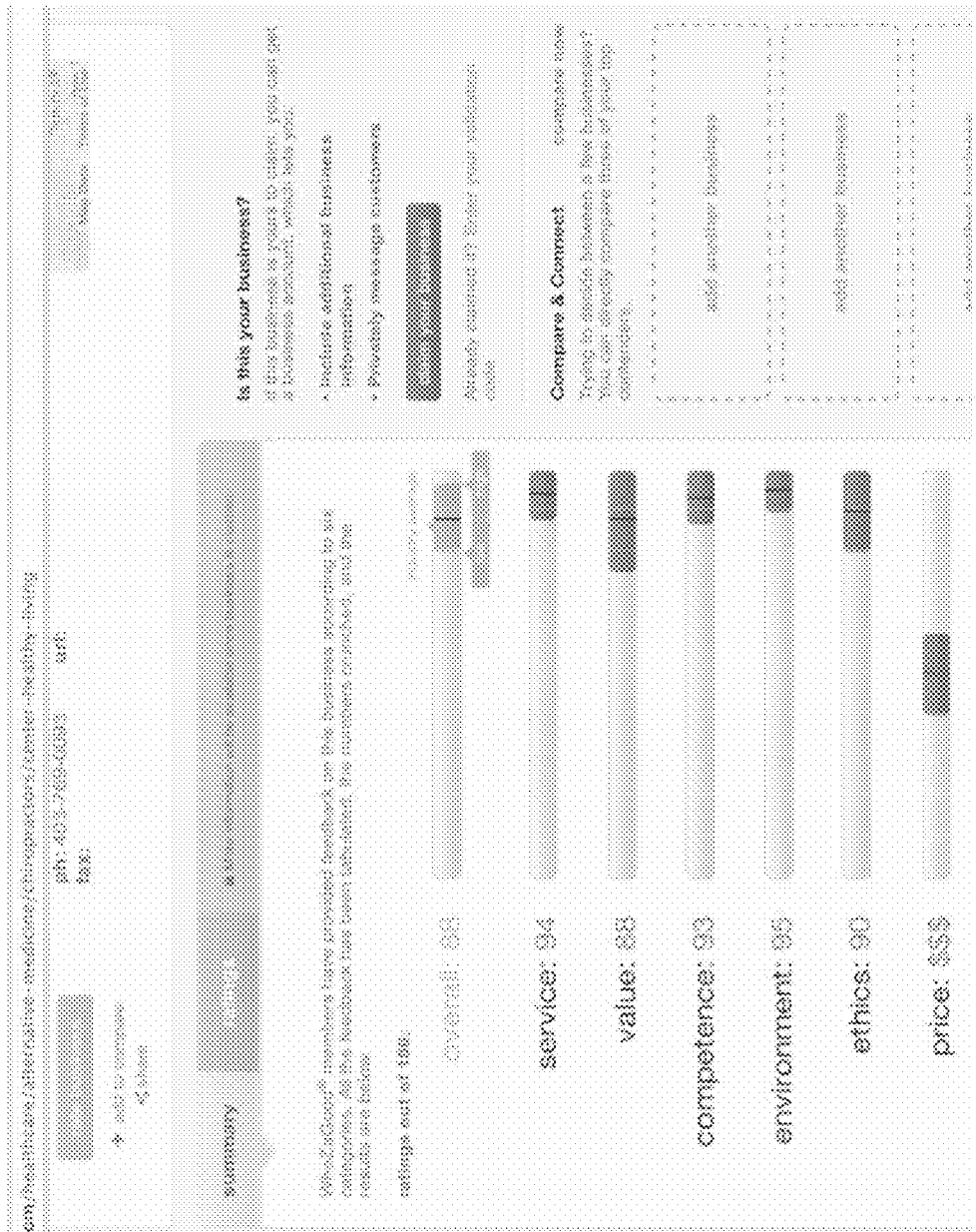
Figure 21:
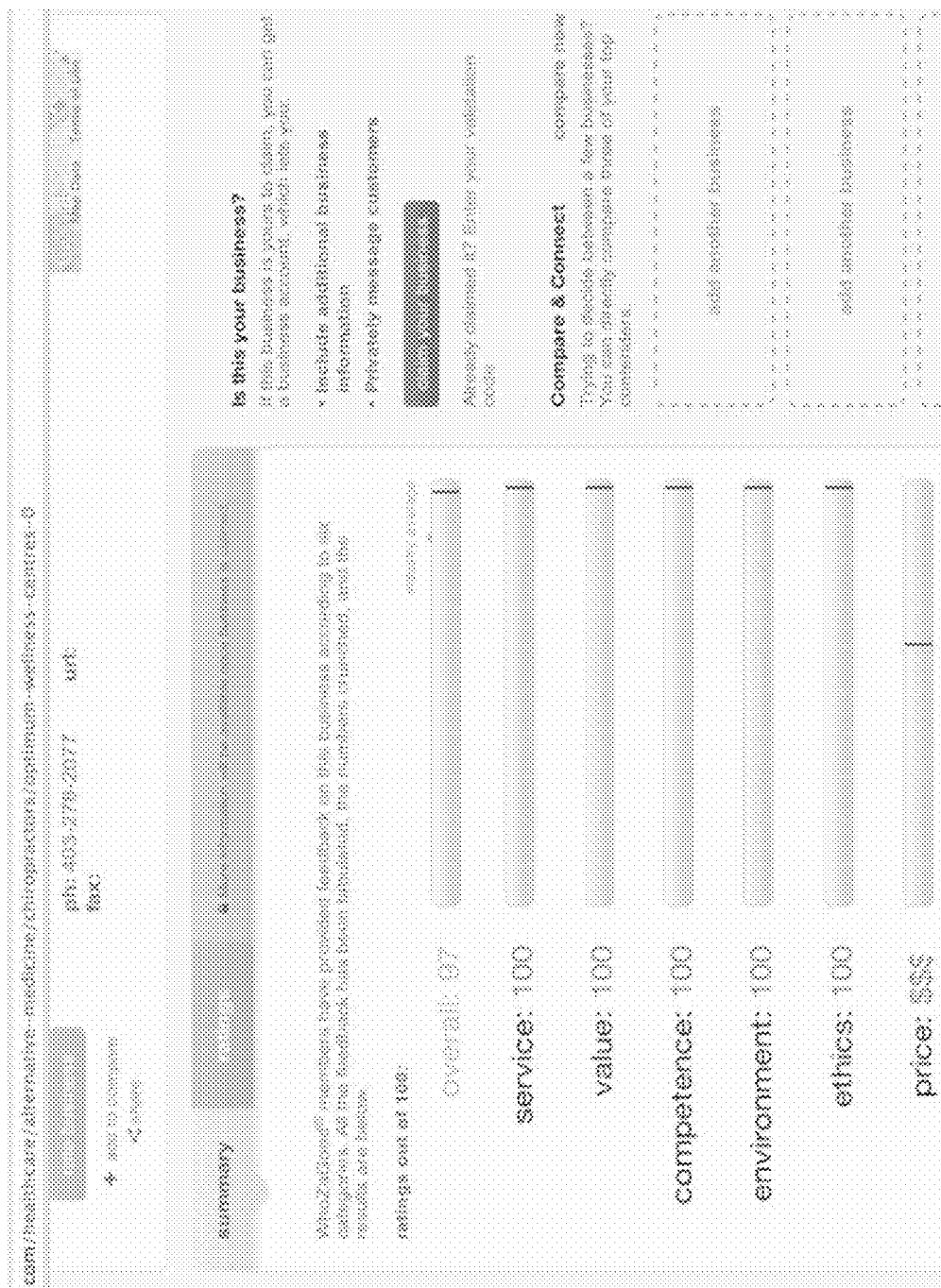
Figure 22:
Figure 23:
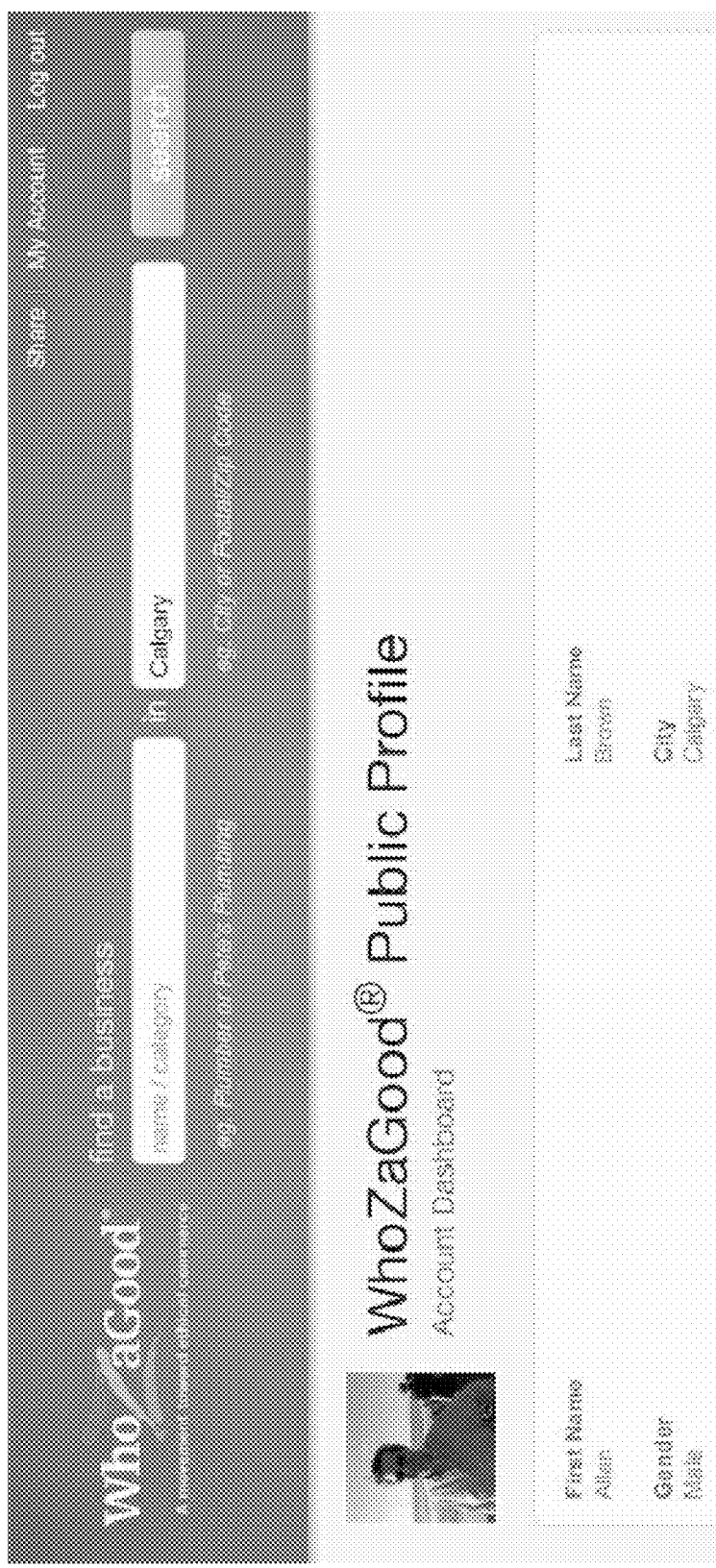
Figure 24:
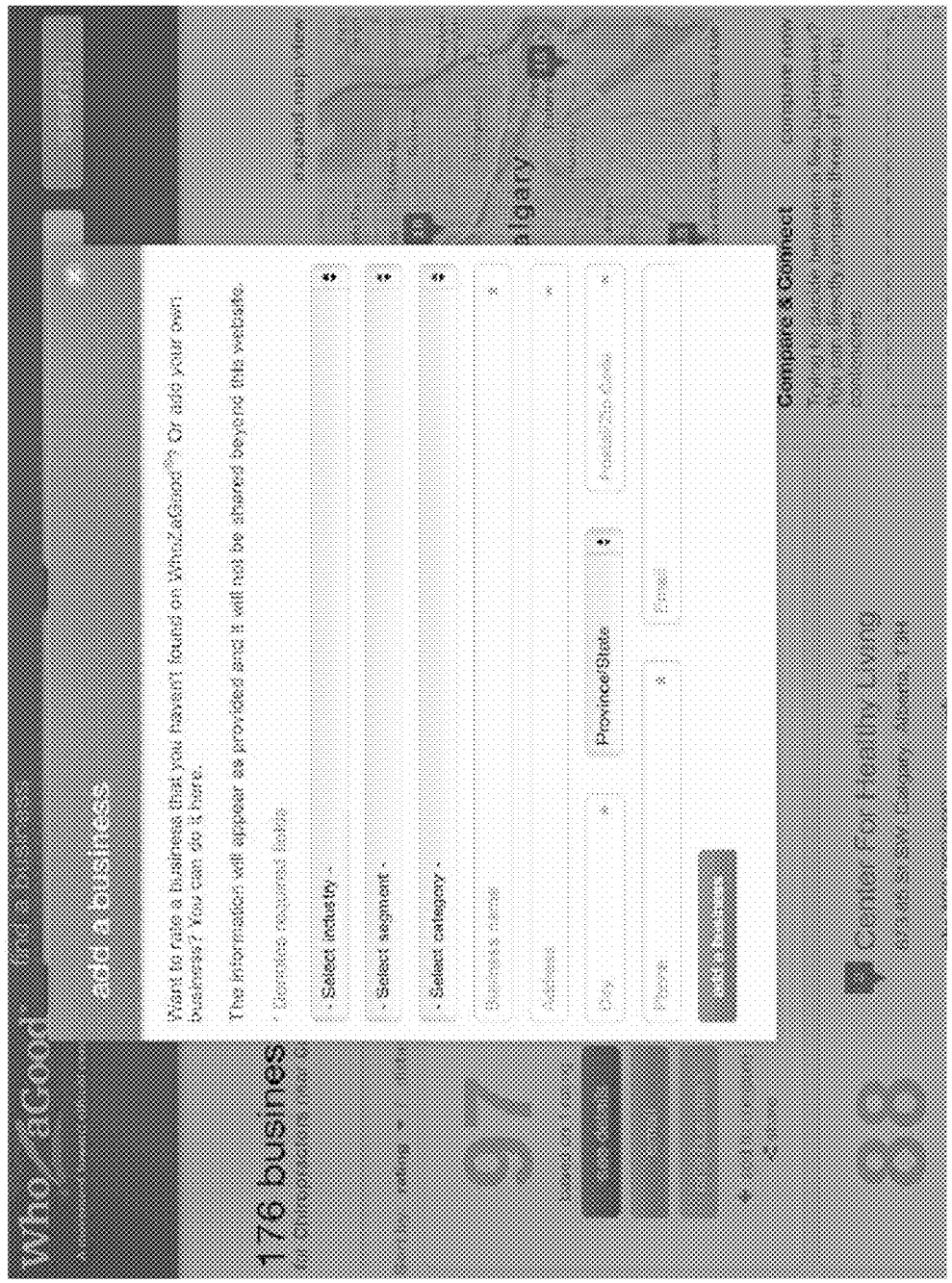
Figure 25:
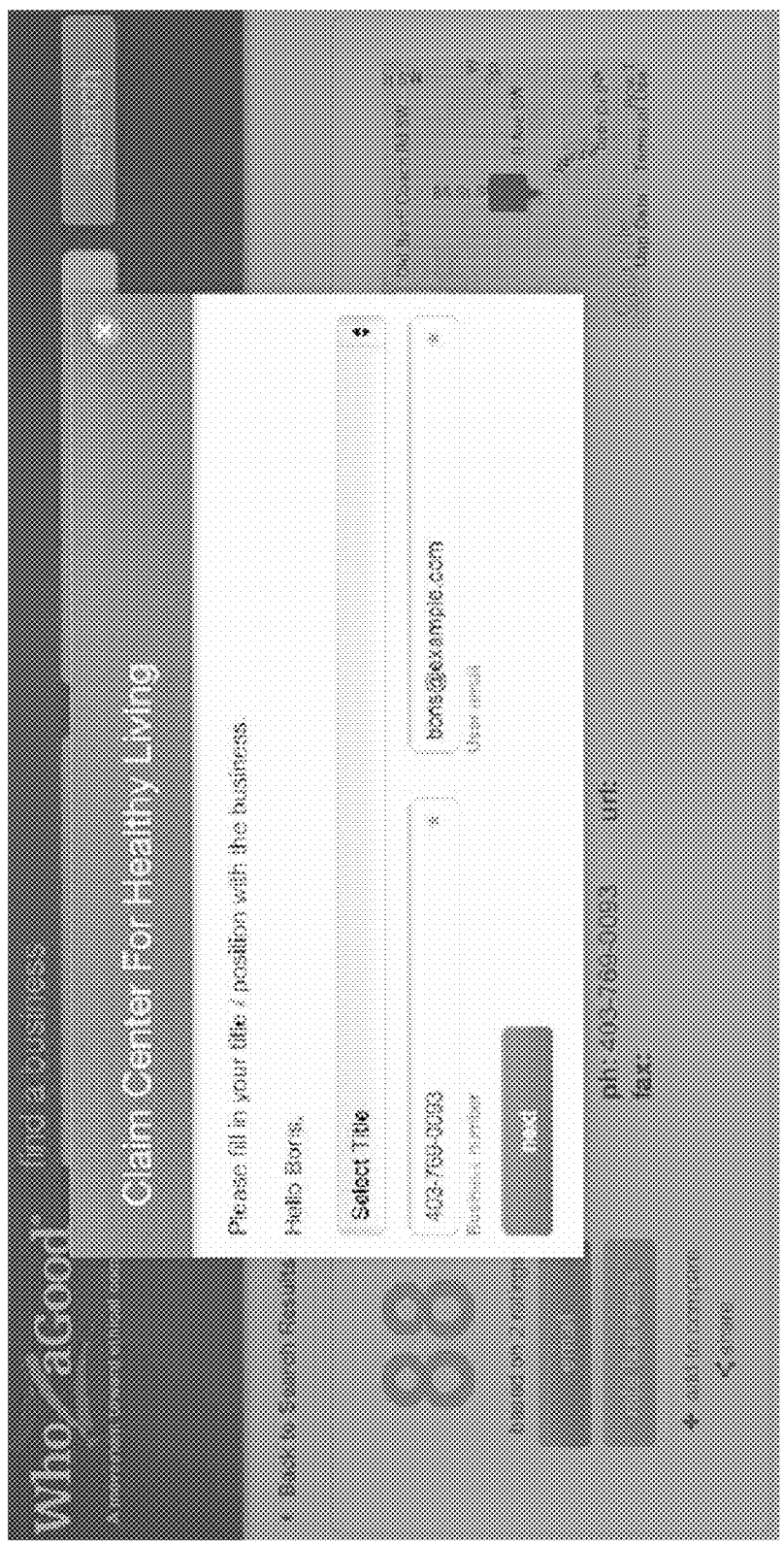
Figure 26:
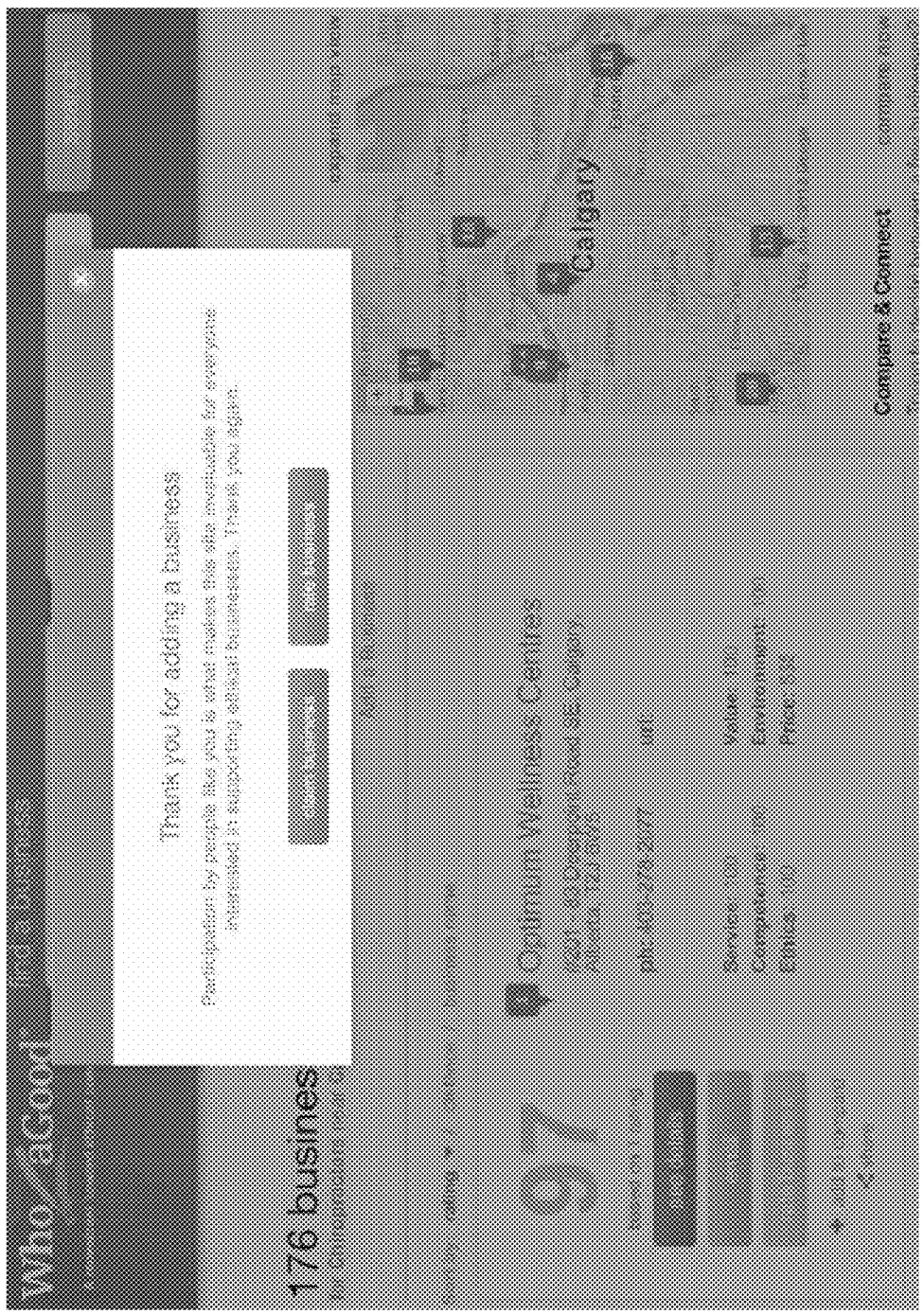
Figure 28:
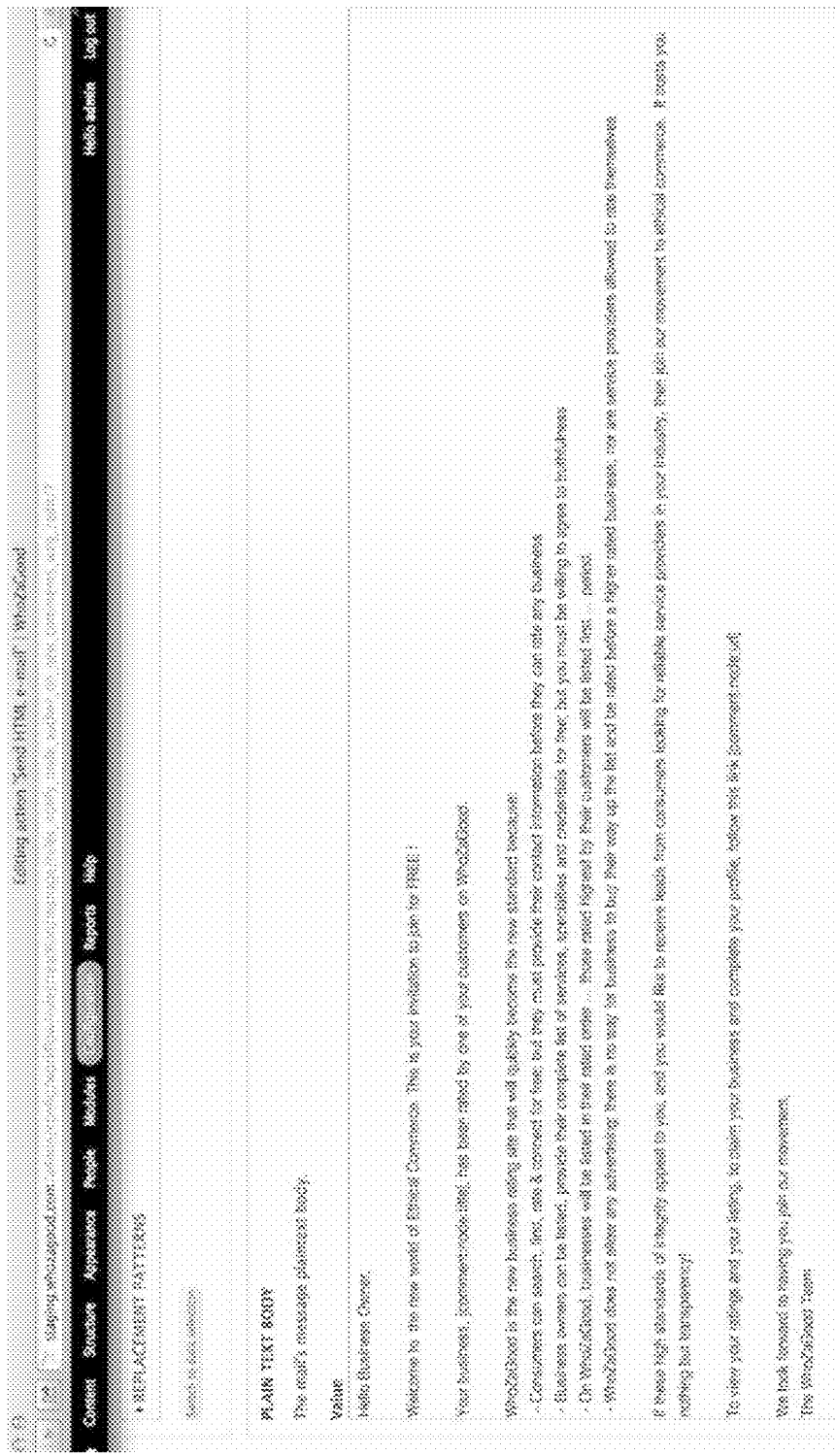
Figure 29:
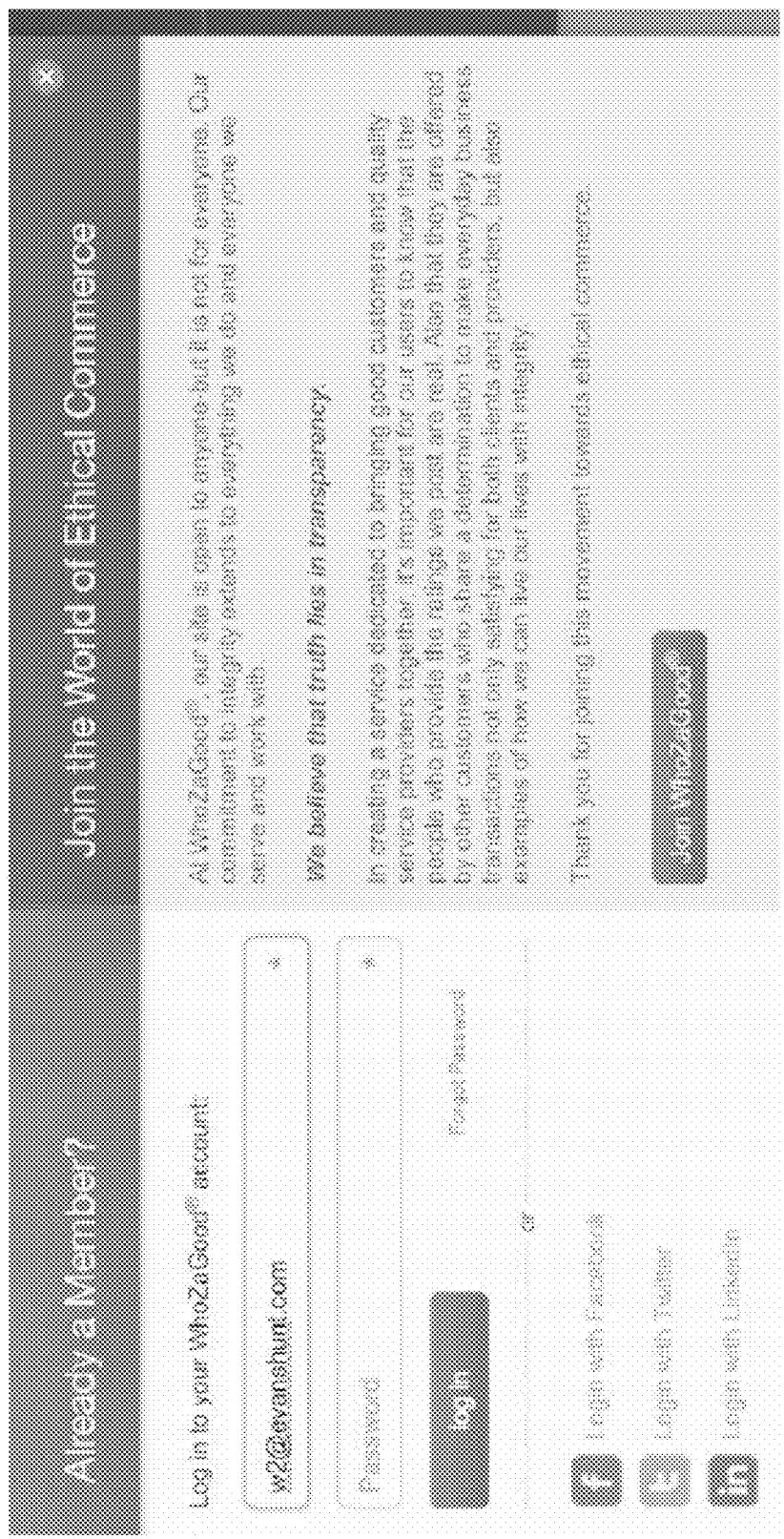
Figure 31:
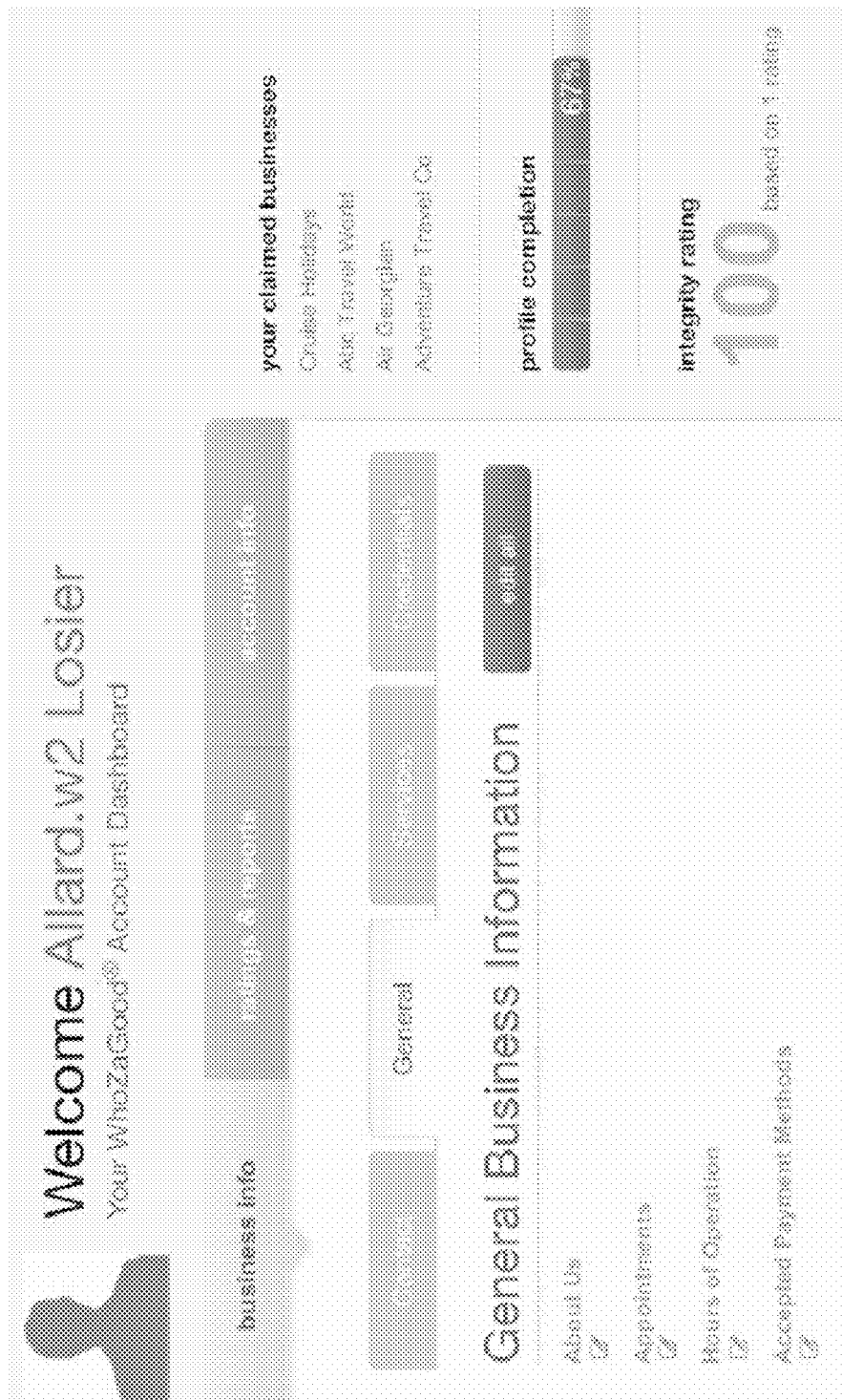
Figure 32:
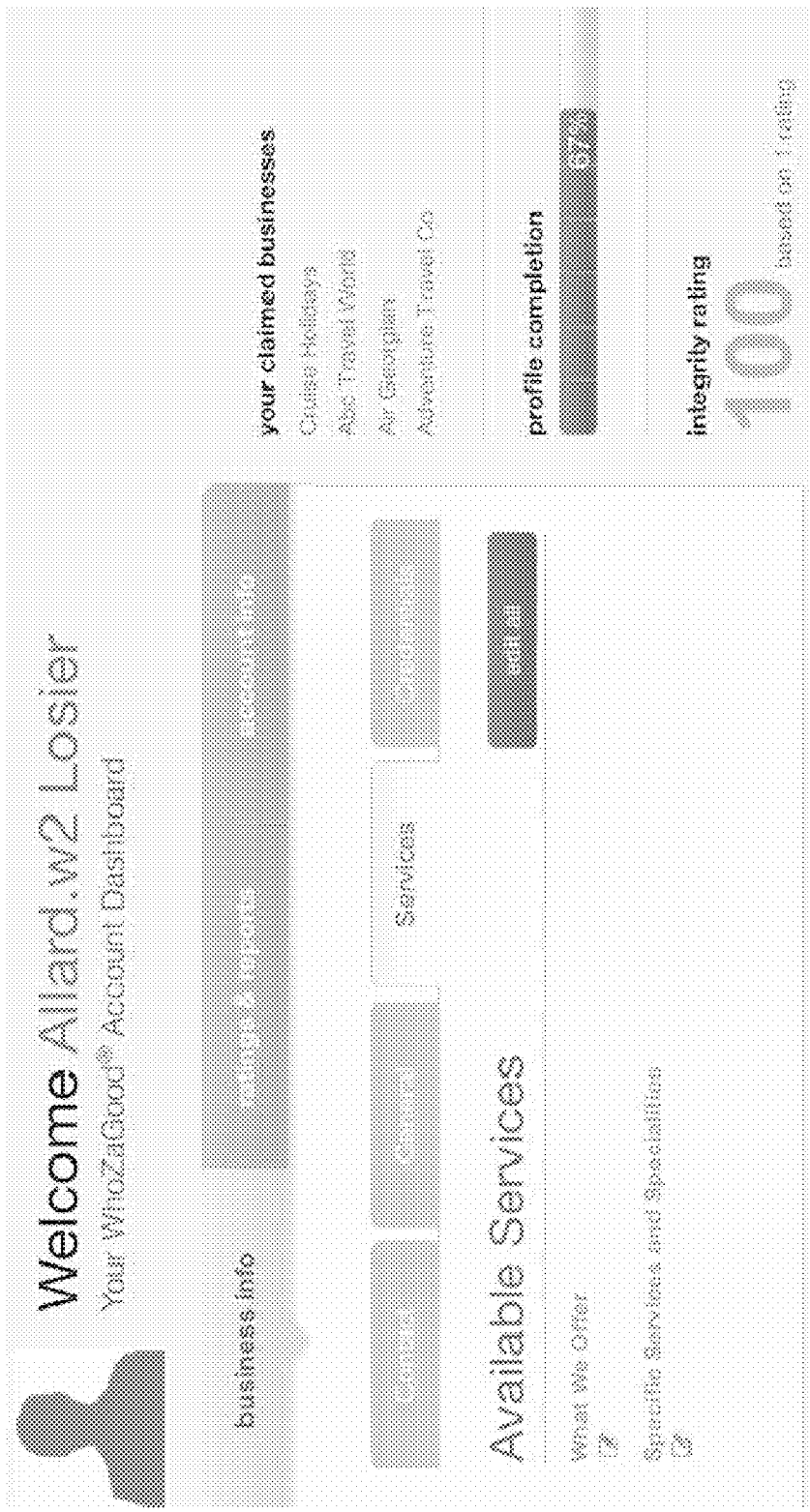
Figure 34:
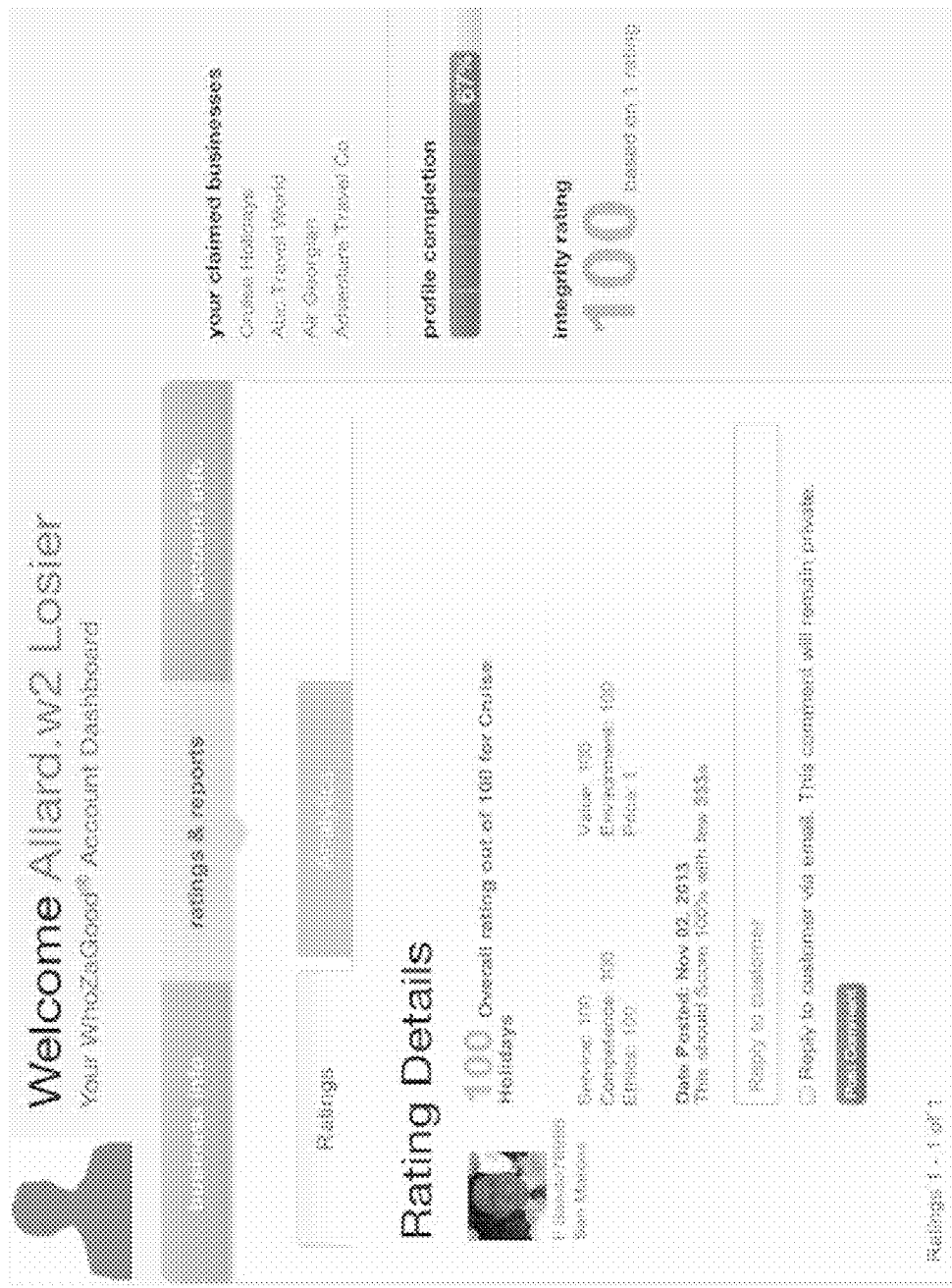
Figure 35:
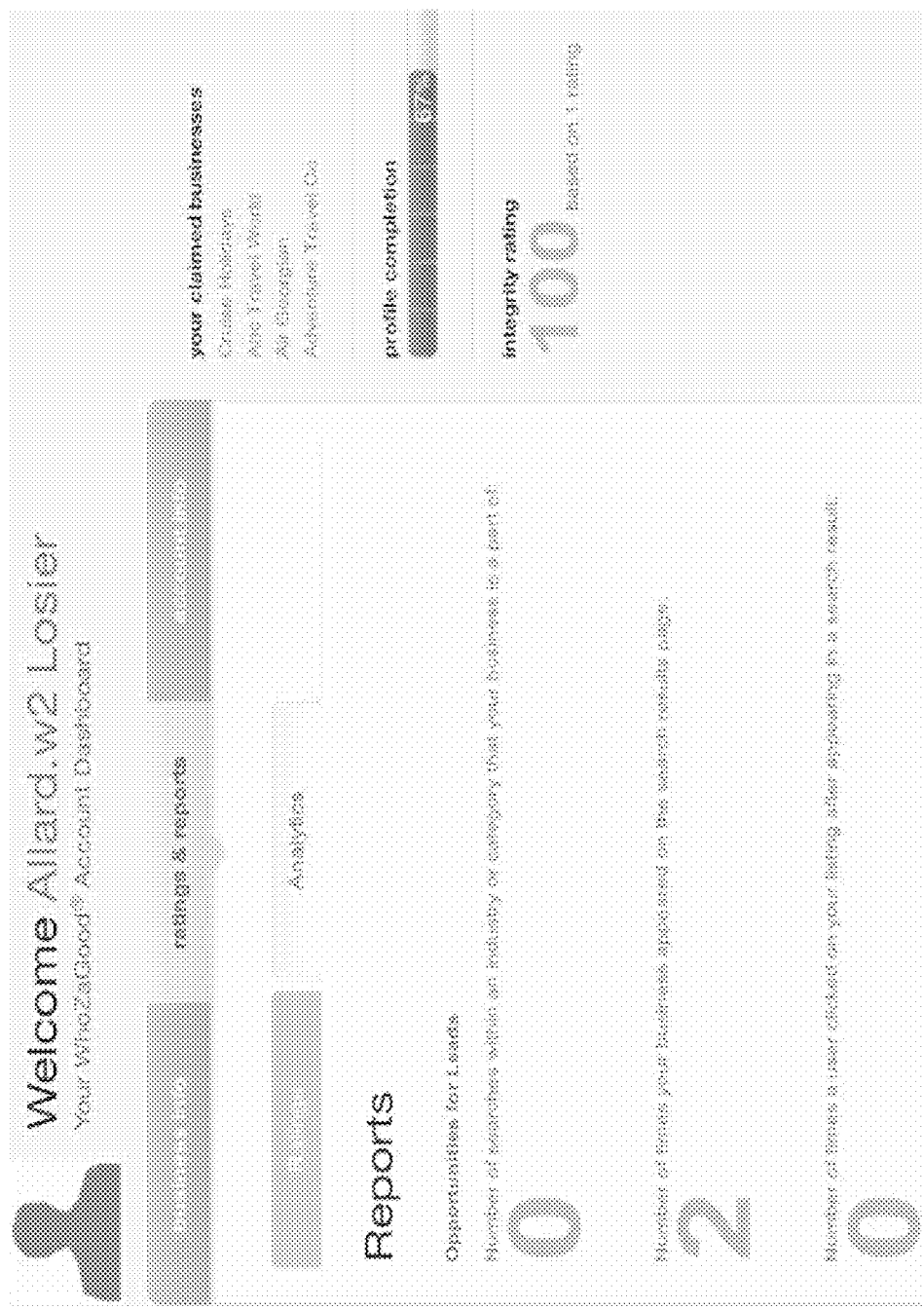
Figure 36:
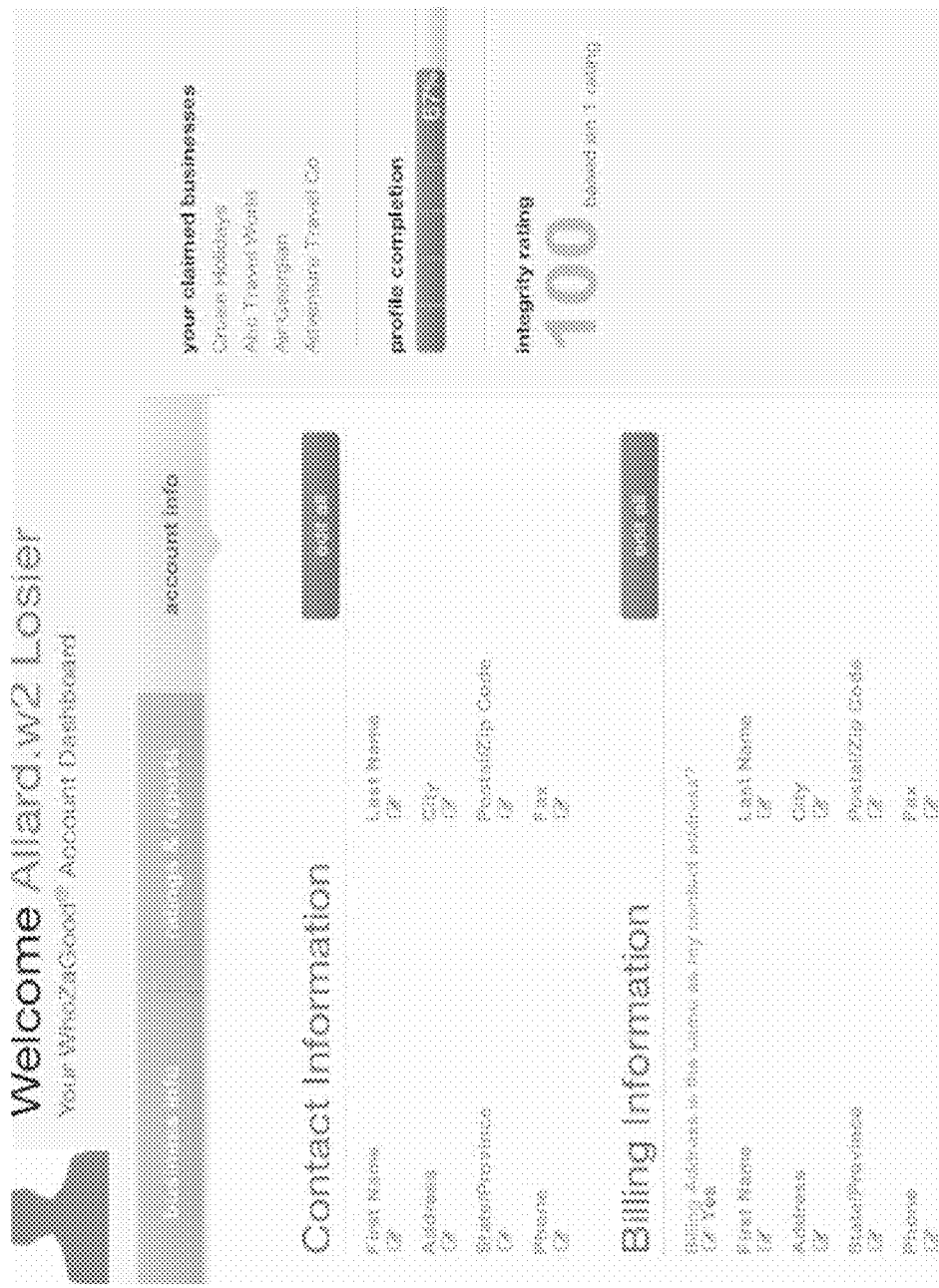

FIG. 12 shows another exemplary embodiment of the computer and network architecture that can support the instant invention. The member devices 202a, 202b thru 202n shown (e.g., electronic devices of customers/service providers) each at least includes a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a are be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera. Through the client devices 202a-n, users (e.g. players, agents, etc.) 212a-n communicate over the network 206 with each other and with other systems and devices coupled to the network 206. As shown in FIG. 12, server devices 204 and 213 may be also coupled to the network 206.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, NFC can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiment, NFC can operates at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable device within close proximity of each other.

In some embodiments, NFC tags can contain data and be read-only or rewriteable. In some embodiment, NFC tags can be custom-encoded. In some embodiments, NFC tags and/or NFC-enabled device (e.g., smart phones with NFC capabilities) can securely store personal data such as debit and credit card information, loyalty program data, PINS and networking contacts, among other information.

In some embodiments, data may also be communicated using any wireless means of communication, such as 4G, 3G, GSM, GPRS, WiFi, WiMax, and other remote local or remote wireless communication using information obtained via the interfacing of a wireless NFC enabled mobile device to a smart poster. In some embodiments, the term "wireless communications" includes communications conducted at ISO 14443 and ISO 18092 interfaces. In some embodiments, the communications between user's NFC-enabled smart device and the a service provider's equipment (e.g., terminals, POS, POE, Hosts) is performed, for example, in accordance with the ISO 14443A/B standard and/or the ISO 18092 standard.

In some embodiments, user's NFC-enabled smart device and/or service provider's equipment (e.g., terminals, POS, POE, Hosts) can include one or more additional transceivers (e.g., radio, Bluetooth, and/or WiFi transceivers) and associated antennas, and enabled to communicate with each other by way of one or more mobile and/or wireless protocols.

In some embodiments, NFC tags can include one or more integrated circuits. In some embodiments, user's NFC-enabled smart device may include a cellular transceiver coupled to the processor and receiving a cellular network timing signal. In some embodiments, user's NFC-enabled smart device may further include a satellite positioning receiver coupled to the processor and receiving a satellite positioning system timing signal, and the processor may accordingly be configured to synchronize the internal timing signal to the satellite positioning system timing signal as the external timing signal. In some embodiments, the processor of user's NFC-enabled smart device may be configured to synchronize the internal timing signal to the common external system timing signal via the NFC circuit.

In some embodiments, user's NFC-enabled smart device may include a power source, an NFC circuit configured to wirelessly communicate using an NFC communications protocol, and a processor coupled to the power source and the NFC circuit. In some embodiments, the processor of user's NFC-enabled smart device may be configured to synchronize an internal timing signal to an external timing signal, cycle power to the NFC circuit to periodically switch the NFC circuit between a peer-to-peer recognition state and a low power state based upon the synchronized internal timing signal, and initiate peer-to-peer NFC communications with another NFC device when in range thereof and upon being simultaneously switched to the peer-to-peer recognition state therewith.

In some embodiments, user's NFC-enabled smart device may include a related physical computer-readable medium and may have computer-executable instructions for causing user's NFC-enabled smart device to initiating peer-to-peer NFC communications with another NFC device when in range thereof and upon being simultaneously switched to the peer-to-peer recognition state therewith.

In some embodiments, the processor of user's NFC-enabled smart device may be configured for communicating wireless voice and data via a cellular transceiver via a cellular communications network. By way of example, the data communications may include, but not limited to, email messages, Web data, etc. In some embodiments, user's NFC-enabled smart device may in addition (or instead) include other types of wireless communications circuits capable of transmitting voice or other data, such as a wireless LAN, WiMAX, etc., circuit. In some embodiments, the processor of user's NFC-enabled smart device may proceed directly to communicate with the trusted NFC device, and in the case of a "smart poster" NFC device (e.g., SLP/SLS), such as one configured to pass a Uniform Resource Locator (URL), the processor may automatically direct a browser application thereof to the URL without prompting for permission to proceed to the designated location.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A method being implemented by an improved computer system programmed for matching in accordance with the method, comprising:
   electronically obtaining, by a specially programmed computer matching system, via a computer network, business information regarding a plurality of businesses and a plurality of offerings offered by the plurality of businesses;
   wherein:
   1) the plurality of offerings comprises services, products, or both;
   2) the business information comprises:
      i) information about each business being submitted by such business in accordance with at least the following conditions agreed to by each business:

a) the information being submitted is complete,
b) the information being submitted is truthful, and
c) the information being submitted is accurate;
ii) business profile information corresponding to at least one of business profile personality tiers, comprising:
a) a first business profile personality tier comprising responses to a Y(1) number of psychometric questions displayed to at least one representative of such business,
b) a second business profile personality tier comprising responses to a Y(2) number of psychometric questions displayed to the at least one representative of such business, and
wherein the Y(1) number being less than the Y(2) number;
wherein the plurality of businesses comprises at least one thousand business;
storing, by the specially programmed computer matching system, in at least one database, the business information regarding the plurality of businesses and the plurality of offerings offered by the plurality of businesses;
electronically receiving, for each business of the plurality of businesses, by the specially programmed computer matching system, via the computer network, from at least one first consumer of a plurality of consumers, utilizing at least one first computing device, responses to at least one consumer rating survey having a predetermined number of questions, wherein the predetermined number of questions are divided into a plurality of groups, wherein each group of questions is correlated to a respective rating category of a plurality of rating categories, comprising at least the following rating categories:
1) service,
2) value,
3) ethics,
4) competence,
5) environment, and
6) price;
analyzing, for each business of the plurality of businesses, by the specially programmed computer matching system, the responses based, at least in part, on predictive analytics to calculate or recalculate a respective rating category score for each of the respective rating category of the plurality of rating categories, comprising at least the following rating categories:
1) service,
2) value,
3) ethics,
4) competence,
5) environment, and
6) price;
causing, by the specially programmed computer matching system, via the computer network, to concurrently display at least one first graphical user interface to at least one first group of consumers of the plurality of consumers on respective computing devices of the at least one first group of consumers, wherein the at least one first graphical user interface is configured to electronically obtain from each consumer of the at least one first group of consumers at least:
i) personal identifying information of such consumer to be validated prior to conducting a personalized two-way personality matching of such consumer to at least one business;
ii) personal consumer psychometric profile information comprising responses to at least ten personality psychometric questions displayed to such consumer;
(iii) at least one business identifying matching parameter, identifying at least one identifying characteristic associated with at least one of:
1) at least one business, offering at least one service, at least one product, or both, being desired by such consumer,
2) the at least one service, the at least one product, or both, being desired by such consumer, and
3) a combination of thereof;
iv) at least one geographic indication, identifying at least one geographic location associated with the at least one business, offering the at least one service, the at least one product, or both, desired by such consumer;
v) ranked filtering criteria, wherein the ranked filtering criteria are ranked categories of the plurality of rating categories, comprising at least the following rating categories:
1) service,
2) value,
3) ethics,
4) competence,
5) environment, and
6) price;
wherein the plurality of consumers comprises at least one thousand consumers;
prior to conducting the personalized two-way personality matching for the respective consumer of the at least one first group of consumers, validating, by the specially programmed computer matching system, each consumer of the at least one first group of consumers based on the personal identifying information of such consumer;
based on an outcome of the validating, concurrently conducting the personalized two-way personality matching, by the specially programmed computer matching system, between each consumer of the at least one first group of consumers and at least one business,
i) wherein the at least one business has been selected based at least in part on:
1) the at least one business identifying matching parameter respectively obtained from each consumer of the at least one first group of consumers,
2) the at least one geographic indication respectively obtained from each consumer of the at least one first group of consumers,
3) the ranked filtering criteria respectively obtained from each consumer of the at least one first group of consumers, and
4) the plurality of rating category scores,
ii) wherein the personalized two-way personality matching between each consumer of the at least one first group of consumers and the at least one business is based on:
1) the personal consumer psychometric profile information of such consumer, and
2) respective responses to psychometric questions from at least one of the business profile personality tiers associated with the at least one business; and
causing, by the specially programmed matching computer system, to concurrently output, via the computer network, utilizing at least one second graphical user interface at the respective computing device of each consumer of the at least one first group of consumers, a respective personalized two-way personality matching result to each consumer of the at least one first group of consumers, wherein the respective personalized two-way personality matching result identifies an existence of a respective personalized two-way personality match between such consumer and the at least one business.

2. The method of claim 1, wherein the at least one second graphical user interface is further configured to display:
   at least one urgency indication, identifying when the at least one business, a particular service, a particular product, or any combination thereof, is available.

3. The method of claim 1, wherein the at least one business has been selected based at least in part on:
   certification of the at least one business.

4. The method of claim 1, wherein the at least one second graphical user interface is further configured to allow each consumer of the at least one first group of consumers to give a consent to the at least one business to contact such consumer.

5. The method of claim 4, the method further comprises:
   upon each consent received from each consumer, automatically and in-real time, generating, by the specially programmed computer matching system, at least one electronic lead notification to be transmitted to the at least one business.

6. The method of claim 4, wherein the at least one second graphical user interface is further configured to allow each consumer of the at least one first group of consumers to select an anonymity level, identifying how much of the personal identifying information of such consumer to be disclosed to the at least one business.

7. The method of claim 1,
   wherein the business information further comprises:
      iii) integrity certification status, identifying businesses that have passed at least one integrity certification assessment, wherein the at least one integrity certification assessment varies based at least in part on a size of each business; and
   wherein the at least one second graphical user interface is further configured to display the integrity certification status associated with the at least one business.

8. The method of claim 5, the business information further comprises:
   iii) integrity certification status, identifying businesses that have passed at least one integrity certification assessment, wherein the at least one integrity certification assessment varies based at least in part on a size of each business;
   automatically notifying, by the specially programmed computer matching system, the at least one business about an obligation of the at least one business to respond the at least one electronic lead notification.

9. The method of claim 1, wherein the Y(1) number is between 10 and 100; and wherein the Y(2) number is between 101 and 500.

10. The method of claim 1, wherein at least one consumer of the at least one first group of consumers of the plurality of consumers is one of:
   i) an individual, and
   ii) a business that desires to obtain the at least one service, the at least one product, or both, from the at least one business.

11. The method of claim 1, wherein the at least one business is an individual who offers for sale the at least one service, the at least one product, or both.

12. An improved computer system programmed for matching, comprising:
   at least one specialized computer machine, comprising:
      a non-transient memory having at least one region for storing particular computer executable program code; and
      at least one processor for executing the particular program code stored in the memory, wherein the particular program code is configured to at least perform the following operations upon the execution:
   electronically obtaining, via a computer network, business information regarding a plurality of businesses and a plurality of offerings offered by the plurality of businesses;
   wherein:
      1) the plurality of offerings comprises services, products, or both;
      2) the business information comprises:
         i) information about each business being submitted by such business in accordance with at least the following conditions agreed to by each business:
            a) the information being submitted is complete,
            b) the information being submitted is truthful, and
            c) the information being submitted is accurate;
         ii) business profile information corresponding to one of business profile personality tiers, comprising:
            a) a first business profile personality tier comprising responses to a Y(1) number of psychometric questions displayed to at least one representative of such business,
            b) a second business profile personality tier comprising responses to a Y(2) number of psychometric questions displayed to the at least one representative of such business,
            wherein the Y(1) number being less than the Y(2) number;
   wherein the plurality of businesses comprises at least one thousand business;
   storing, in at least one database, the business information regarding the plurality of businesses and the plurality of offerings offered by the plurality of businesses;
   electronically receiving, for each business of the plurality of businesses, via the computer network, from at least one first consumer of a plurality of consumers, utilizing at least one first computing device, responses to at least one consumer rating survey having a predetermined number of questions, wherein the predetermined number of questions are divided into a plurality of groups, wherein each group of questions is correlated to a respective rating category of a plurality of rating categories, comprising at least the following rating categories:
   1) service,
   2) value,
   3) ethics,
   4) competence,
   5) environment, and
   6) price;
   analyzing, for each business of the plurality of businesses, the responses based, at least in part, on predictive analytics to calculate or recalculate a respective rating category score for each of the respective rating category of the plurality of rating categories, comprising at least the following rating categories:
   1) service,
   2) value,
   3) ethics,
   4) competence,
   5) environment, and
   6) price;

causing, via the computer network, to concurrently display at least one first graphical user interface to at least one first group of consumers of the plurality of consumers on respective computing devices of the at least one first group of consumers, wherein the at least one first graphical user interface is configured to electronically obtain from each consumer of the at least one first group of consumers at least:
  i) personal identifying information of such consumer to be validated prior to conducting a personalized two-way personality matching of such consumer to at least one business;
  ii) personal consumer psychometric profile information comprising responses to at least ten personality psychometric questions displayed to such consumer;
  (iii) at least one business identifying matching parameter, identifying at least one identifying characteristic associated with at least one of:
    1) at least one business, offering at least one service, at least one product, or both, being desired by such consumer,
    2) the at least one service, the at least one product, or both, being desired by such consumer, and
    3) a combination of thereof;
  iv) at least one geographic indication, identifying at least one geographic location associated with the at least one business, offering the at least one service, the at least one product, or both, desired by such consumer;
  v) ranked filtering criteria, wherein the ranked filtering criteria are ranked categories of the plurality of rating categories, comprising at least the following rating categories:
    1) service,
    2) value,
    3) ethics,
    4) competence,
    5) environment, and
    6) price;
wherein the plurality of consumers comprises at least one thousand consumers;
prior to conducting the personalized two-way personality matching for the respective consumer of the at least one first group of consumers, validating each consumer of the at least one first group of consumers based on the personal identifying information of such particular consumer;
based on an outcome of the validating, concurrently conducting the personalized two-way personality matching between each consumer of the at least one first group of consumers and at least one business,
  i) wherein the at least one business has been selected based at least in part on:
    1) the at least one business identifying matching parameter respectively obtained from each consumer of the at least one first group of consumers,
    2) the at least one geographic indication respectively obtained from each consumer of the at least one first group of consumers,
    3) the ranked filtering criteria respectively obtained from each consumer of the at least one first group of consumers, and
    4) the plurality of rating category scores the at least one rating score filtering parameter,
  ii) wherein the personalized two-way personality matching between each consumer of the at least one first group of consumers and the at least one business is based on:
    1) the personal consumer psychometric profile information of such consumer, and
    2) respective responses to psychometric questions from at least one of the business profile personality tiers associated with the at least one business; and
causing to concurrently output, via the computer network, utilizing at least one second graphical user interface at the respective computing device of each consumer of the at least one first group of consumers, a respective personalized two-way personality matching result to each consumer of the at least one first group of consumers, wherein the respective personalized two-way personality matching result identifies an existence of a respective personalized two-way personality match between such consumer and the at least one business.

13. The improved computer system of claim 12, wherein the at least one second graphical user interface is further configured to display:
at least one urgency indication, identifying when the at least one business, a particular service, a particular product, or any combination thereof, is available.

14. The improved computer system of claim 12, wherein the at least one business has been selected based at least in part on:
certification of the at least one business.

15. The improved computer system of claim 12, wherein the at least one second graphical user interface is further configured to allow each consumer of the at least one first group of consumers to give a consent to the at least one business to contact such consumer.

16. The improved computer system of claim 15, wherein the particular program code is further configured to at least perform the following operations upon the execution:
upon each consent received from each consumer, automatically and in-real time, generating at least one electronic lead notification to be transmitted to the at least one business.

17. The improved computer system of claim 15, wherein the at least one second graphical user interface is further configured to allow each consumer of the at least one first group of consumers to select an anonymity level, identifying how much of the personal identifying information of such consumer to be disclosed to the at least one business.

18. The improved computer system of claim 12, wherein the business information further comprises:
  iii) integrity certification status, identifying businesses that have passed at least one integrity certification assessment, wherein the at least one integrity certification assessment varies based at least in part on a size of each business; and
wherein the at least one second graphical user interface is further configured to display the integrity certification status associated with the at least one business.

19. The improved computer system of claim 16, the business information further comprises:
  iii) integrity certification status, identifying businesses that have passed at least one integrity certification assessment, wherein the at least one integrity certification assessment varies based at least in part on a size of each business;
automatically notifying the at least one business about an obligation of the at least one business to respond the at least one electronic lead notification.

20. The improved computer system of claim 12, wherein the Y(1) number is between 10 and 100; and wherein the Y(2) number is between 101 and 500.

21. The improved computer system of claim 12, wherein at least one consumer of the at least one first group of consumers of the plurality of consumers is one of:
  i) an individual, and
  ii) a business that desires to obtain the at least one service, the at least one product, or both, from the at least one business.

22. The improved computer system of claim 12, wherein the at least one business is an individual who offers for sale the at least one service, the at least one product, or both.

* * * * *